United States Patent
Kawakatsu et al.

[11] Patent Number: 6,101,873
[45] Date of Patent: Aug. 15, 2000

[54] LEVEL SENSOR

[75] Inventors: Hiroshi Kawakatsu; Kouichi Tanaka, both of Osaka; Hiroshi Uematsu, Hyogo, all of Japan

[73] Assignee: Nohken Inc., Osaka, Japan

[21] Appl. No.: 08/649,203

[22] Filed: May 17, 1996

[51] Int. Cl.[7] .................................................. G01F 23/26
[52] U.S. Cl. ........................................................ 73/304 C
[58] Field of Search ........................................... 73/304 C

[56] References Cited

U.S. PATENT DOCUMENTS

| | | | |
|---|---|---|---|
| 4,003,259 | 1/1977 | Hope | 73/304 C |
| 4,589,077 | 5/1986 | Pope | 364/509 |
| 4,601,201 | 7/1986 | Oota et al. | 73/304 C |
| 4,611,489 | 9/1986 | Spaargaren et al. | 73/304 |
| 4,716,536 | 12/1987 | Blanchard | 364/571 |
| 5,103,368 | 4/1992 | Hart | 361/284 |
| 5,406,843 | 4/1995 | Hannan et al. | 73/304 C |
| 5,423,214 | 6/1995 | Lee | 73/304 C |
| 5,613,399 | 3/1997 | Hannan et al. | 73/304 C |

FOREIGN PATENT DOCUMENTS

| | | | |
|---|---|---|---|
| 3-65617 | 3/1991 | Japan | 73/304 C |
| 4-53245 B2 | 8/1992 | Japan . | |
| 4-359122 | 12/1992 | Japan | 73/304 C |
| 5-272182 | 10/1993 | Japan . | |
| 5-272555 | 10/1993 | Japan . | |
| 6-147955 | 5/1994 | Japan | 73/304 C |
| WO 92/21944 | 12/1992 | WIPO . | |

*Primary Examiner*—Hezron Williams
*Assistant Examiner*—Willie Morris Worth
*Attorney, Agent, or Firm*—Armstrong, Westerman Hattori, McLeland & Naughton

[57] ABSTRACT

Switching member SW20 which receives detection signals for detecting capacitance outputted from a control part 35, controls each of switches so as to measure capacitance between electrodes positioned adjacently (an electrode TE1 and an electrode TE2, and so on) before measuring capacitance of measuring object. Capacitance initially measured between the adjacent electrodes are stored in a storing circuit 30. The initial capacitance are averaged to calculate an averaged initial value. Upon calculating the averaged initial value, correction values which represent difference between the averaged initial value and the initial capacitance are calculated. Actual measured values are corrected using the correction values when level of measuring object is measured. It is therefore possible to measure level of measuring object without influence of floating items or the like with stability, because level measurement is conducted by utilizing capacitance measured between adjacent electrodes. Also, actual measured values are corrected with the corrected value after measuring initial values. Therefore, level measurement of the measuring object can be conducted with high stability and accuracy.

15 Claims, 41 Drawing Sheets

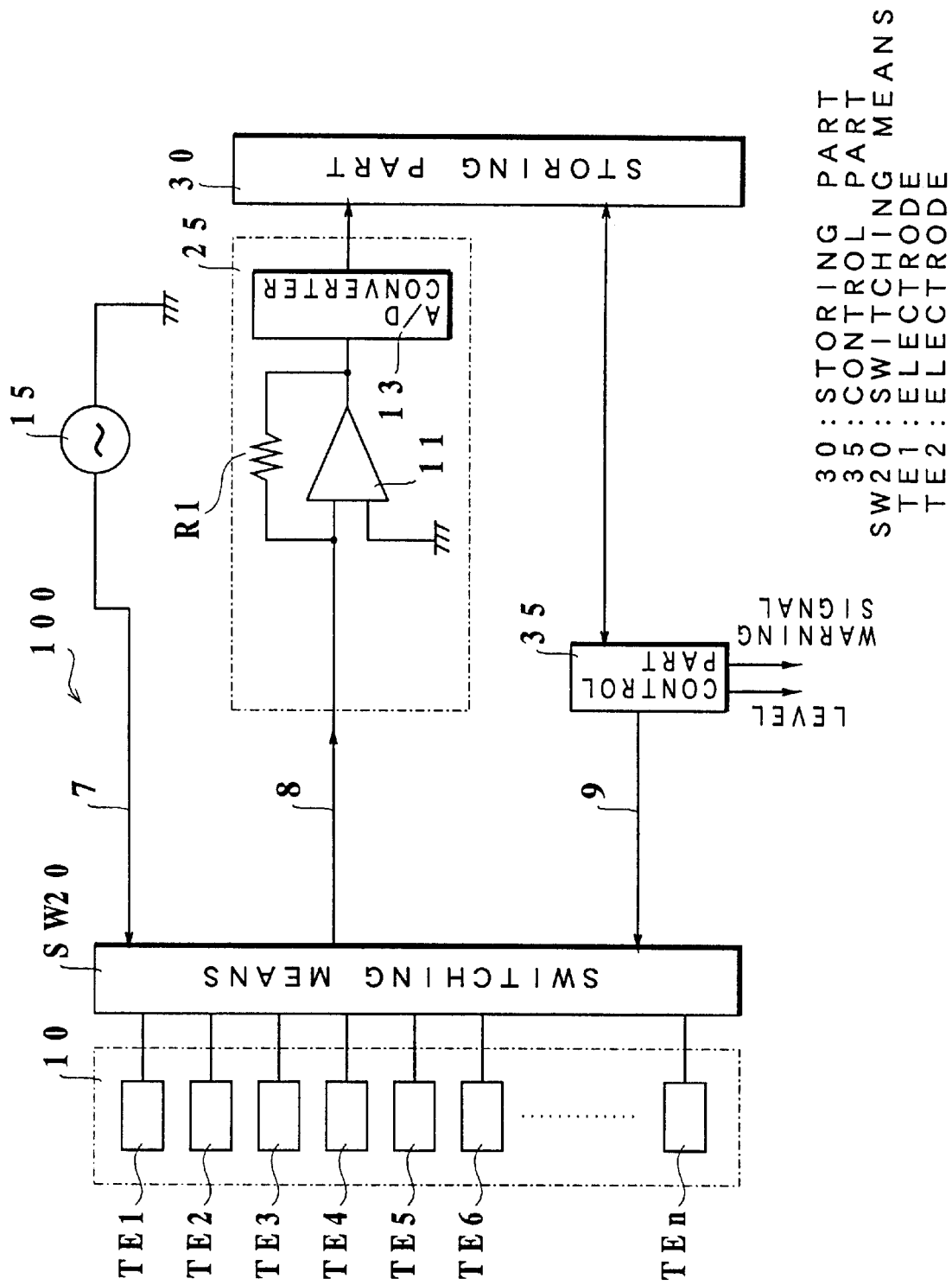

| INITIAL VALUE | CORRECTION VALUE | ACTUAL VALUE | CORRECTED ACTUAL VALUE |
|---|---|---|---|
| A1  500 | +5 | B1  502 | 507 |
| A2  508 | -3 | B2  506 | 503 |
| A3  507 | -2 | B3  507 | 505 |
| A4  505 | 0 | B4  506 | 506 |
| A5  504 | +1 | B5  503 | 504 |
| A6  503 | +2 | B6  505 | 507 |
| A7  510 | -5 | B7  511 | 506 |
| A8  500 | +5 | B8  499 | 504 |
| A9  501 | +4 | B9  515 | 519 |
| A10  505 | 0 | B10  580 | 580 |
| A11  506 | -1 | B11  901 | 900 |

~30

| INITIAL VALUE | ACTUAL VALUE | VARIED VALUE |
|---|---|---|
| A1  500 | B1  502 | +2 |
| A2  508 | B2  506 | −2 |
| A3  507 | B3  507 | 0 |
| A4  505 | B4  506 | +1 |
| A5  504 | B5  503 | −1 |
| A6  503 | B6  505 | +2 |
| ⋮ | ⋮ | ⋮ |
| A10  505 | B10  580 | +75 |
| A11  506 | B11  901 | +395 |

A

B

LS4　COMBINATION OF ELECTRODES

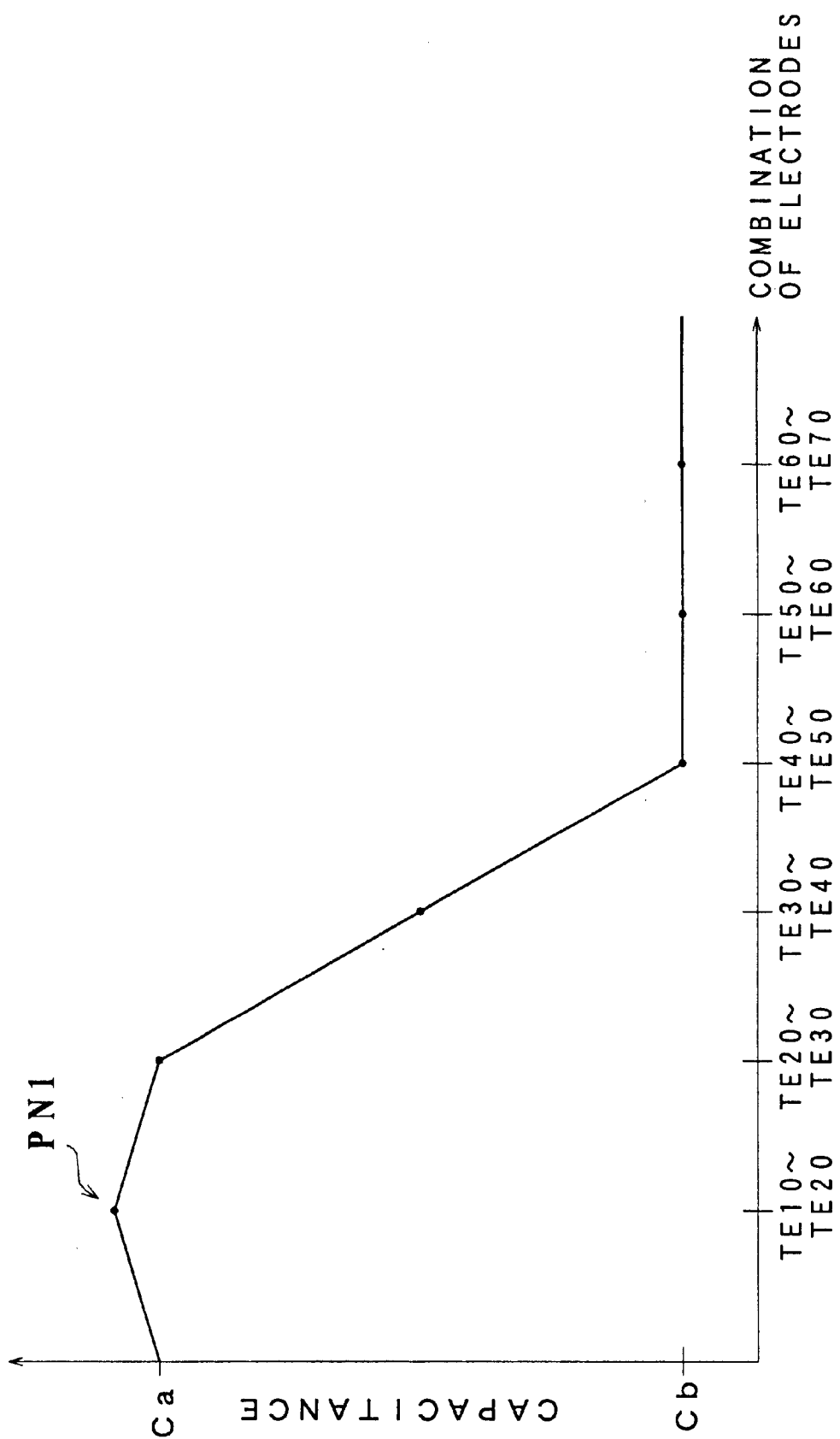

| INITIAL VALUE | CORRECTION VALUE | ACTUAL VALUE | CORRECTED ACTUAL VALUE |
|---|---|---|---|
| P1    500 | +5 | Q1    502 | 507 |
| P2    508 | -3 | Q2    506 | 503 |
| P3    507 | -2 | Q3    507 | 505 |
| P4    505 | 0 | Q4    506 | 506 |
| P5    504 | +1 | Q5    503 | 504 |
| P6    503 | +2 | Q6    505 | 507 |
| P7    510 | -5 | Q7    511 | 506 |
| P8    500 | +5 | Q8    499 | 504 |
| P9    501 | +4 | Q9    515 | 519 |
| P10   505 | 0 | Q10   580 | 580 |
| P11   506 | -1 | Q11   901 | 900 |

~30

| INITIAL VALUE | ACTUAL VALUE | VARIED VALUE |
|---|---|---|
| P1  500 | Q1  502 | +2 |
| P2  508 | Q2  506 | −2 |
| P3  507 | Q3  507 | 0 |
| P4  505 | Q4  506 | +1 |
| P5  504 | Q5  503 | −1 |
| P6  503 | Q6  505 | +2 |
| ⋮ | ⋮ | ⋮ |
| P10  505 | Q10  580 | +75 |
| P11  506 | Q11  901 | +395 |

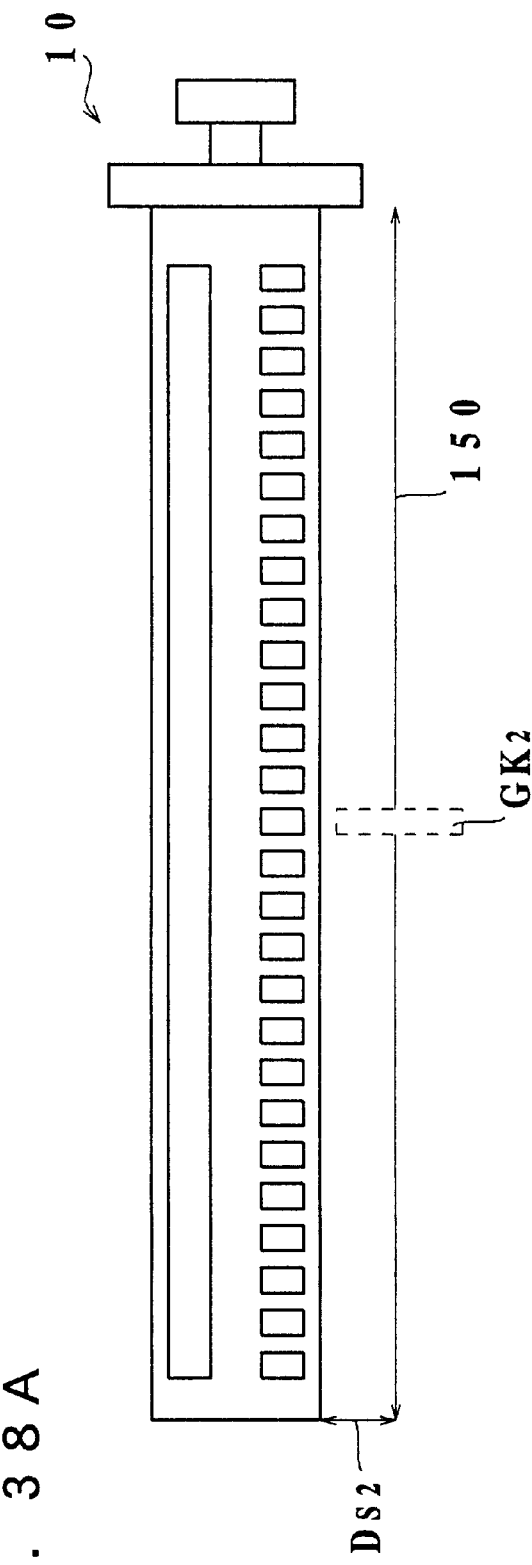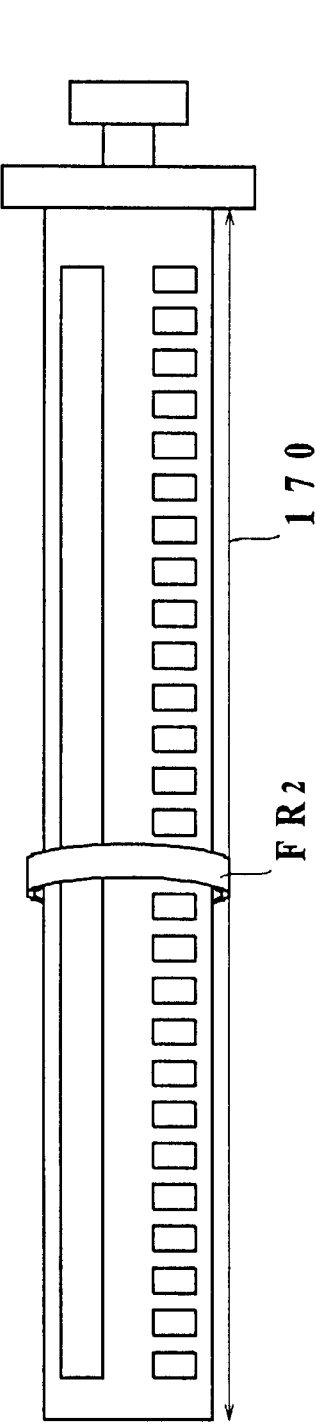
FIG. 38A
FIG. 38B

LEVEL SENSOR

BACKGROUND OF INVENTION

1. Field of the Invention

This invention relates to a method for measuring level of measuring objects and an apparatus thereof, more specifically, a method and an apparatus for improving stability and accuracy of the measurement.

2. Description of the Prior Art

There are various sensors or apparatuses which used for measuring level of measuring objects such as liquid or the like stored in a tank. In these sensors, a capacitance type level sensor is available. The capacitance type level sensor is a sensor which measures level of measuring object such as liquid stored in the tank using measured capacitance.

FIG. 1A shows a diagram illustrating a typical diagram of the capacitance type level sensor which measures liquid 33 stored in the tank 40. The capacitance type level sensor comprises electrodes 10 which has a plurality of electrode 50 in vertical direction to the surface of liquid 33 stored in the tank 40, a power source 2 connected to the electrodes 10 and a controller (not shown).

Capacitance between the tank 40 and the electrodes 50 Is measured with the capacitance type level sensor by applying power supplied from the power supply 2 to the tank 40 and to each electrode 50 provided in the electrodes 10 successively. In other words, the capacitance of a dummy capacitor formed electrically between the tank 40 and the electrode 50 is measured. Value of capacitance between the tank 40 and the electrode 50 is relatively high when the electrode 50 is covered with the liquid 33. On the other hand, value of capacitance between the tank 40 and the electrode 50 is relatively low when the electrode 50 is not covered with the liquid 33.

FIG. 2A shows a relationship between capacitance thus measured and each of the electrodes. According to the graph, center part of a sharp drop LS of the axis of abscissas is detected as the level of the liquid (liquid level).

Also, a typical diagram of another type of the capacitance type level sensor in the prior art is shown in FIG. 1B. The capacitance type level sensor comprises a measuring (long) electrode 50 located in a tank 40, a reference (short) electrode 51 positioned in vicinity of bottom part of the tank 40, a power source 2 connected with both the measuring electrode 50 and the reference electrode 51 and a controller (not shown).

Another type of the capacitance type level sensor is not a level sensor which measure capacitance between each of the electrodes and the tank 40. That is, the principle between these level sensors are different from each other. The capacitance type level sensor measures capacitance between entire of measuring (long) electrode 50 and the tank 40, so that, the level of liquid stored in the tank 40 can be measured directly in accordance with capacitance value. In other words, the level of liquid stored in the tank 40 is measured in accordance with variety of capacitance between the measuring electrode 50 and the tank 40 based on quantity of the liquid. Dielectric constant varies when different kind of liquids 33 are stored in the tank, so that, capacitance measured by the level sensor is changed in accordance with the liquid. Therefore, reference capacitance for each kind of liquids are measured by the reference (short) electrode 51 positioned in vicinity of bottom part of the tank 40, in order to detect level of different kind of liquids. Further, capacitance of the liquid measured by both the measuring electrode and the reference electrode is corrected in accordance with the reference capacitance measured by the reference electrode.

FIG. 2B shows a relationship between capacitance thus measured and level of liquid. The level of liquid is detected in accordance with the relationship.

However, the capacitance type level sensors in the prior art have following problems to resolve. In the capacitance type level sensor shown in FIG. 1A (nonlinear capacitance type level sensor), the level of liquid is detected by measuring the capacitance between the tank 40 and each electrode 50. So that, it is not possible to conduct detection of liquid level accurately, when extraneous objects are adhere on the electrodes.

Also, correction of the capacitance measured by both the measuring electrode and the reference electrode is carried out utilizing the capacitance measured by the reference electrode 51 positioned in vicinity of bottom part of the tank 40. Dielectric constant of the liquid depends on its temperature, even when the liquid stored in the tank is the same kind. So that, there is a temperature difference between a liquid stored in an upper part and a lower part of the tank. In that case, it is not possible to conduct detection of liquid level accurately by correcting the capacitance measured by the reference electrode 51. So that, stability of the level detection can not be maintained. Further, there is a case that the level detection is influenced by moisture contained in a gas accumulated in the upper part of the tank and variation of gas density in the tank.

Still further, the capacitance can not be measured accurately when oil etc. is mixed with the measuring object (liquid) 33 stored in the tank 40 and the oil adheres on the measuring (long) electrode 50, because detected capacitance varies by the oil. In neither of the above described level sensors, level of the measuring object can not be measured when the tank 40 is not formed by conducting materials.

OBJECT AND SUMMARY OF THE INVENTION

An object of the present invention is to provide a level sensor and a method for measuring level which improves stability and accuracy of the measurement.

In accordance with characteristics of the present invention, a level sensor comprises:

an electrode assembly having a plurality of electrodes positioned substantially vertically from surface of a measuring object, and a part of the electrode assembly being dipped into the measuring object, a measuring circuit for measuring capacitance between two adjacent electrodes or a couple of electrodes apart from each other in more than one electrode consecutively, and a level detection circuit for detecting level of the measuring object in accordance with variations of the capacitance measured between each electrodes by the measuring circuit.

Also, in accordance with characteristics of the present invention, a level sensor comprises:

an electrode assembly having a plurality of electrodes positioned substantially vertically from surface of a measuring object, and a part of the electrode assembly being dipped into the measuring object, a measuring circuit for measuring capacitance between a first electrode group having at least one electrode in the electrode assembly and a second electrode group having at least one electrode excluding from the first electrode group consecutively, and a level detection circuit for detecting level of the measuring object in accordance with variations of the capacitance measured between each electrodes by the measuring circuit.

Further, in accordance with characteristics of the present invention, a method for measuring level comprises steps of:

- a step for dipping a part of an electrode assembly having a plurality of electrodes into a measuring object,
- a step for measuring capacitance between two adjacent electrodes or a couple of electrodes apart from each other in more than one electrode consecutively, and
- a step for measuring level of the measuring object in accordance with variations of the capacitance measured between each electrodes.

Still further, in accordance with characteristics of the present invention, a method for measuring level comprises steps of:

- a step for dipping a part of an electrode assembly having a plurality of electrodes into a measuring object,
- a step for measuring capacitance between a first electrode group having at least one electrode in the electrode assembly and a second electrode group having at least one electrode excluding from the first electrode group in the electrode assembly consecutively, and
- a step for measuring level of the measuring object in accordance with variations of the capacitance measured between each electrodes.

In accordance with characteristics of the present invention, a level sensor comprises:

- a ground electrode,
- an electrode assembly having a plurality of measuring electrodes positioned opposite to the ground electrode and substantially vertically from surface of a measuring object, and a part of the electrode assembly being dipped into the measuring object,
- a measuring circuit for measuring capacitance between the measuring electrode of the electrode assembly and the ground electrode consecutively, and
- a level detection circuit for detecting level of the measuring object in accordance with variations of the capacitance measured between the measuring electrode and the ground electrode by the measuring circuit.

Further, in accordance with characteristics of the present invention, a method for measuring level comprises steps of:

- a step for providing a ground electrode in an electrode assembly,
- a step for dipping a part of the electrode assembly having a plurality of measuring electrodes positioned opposite to the ground electrode and substantially vertically from surface of a measuring object into the measuring object,
- a step for measuring capacitance between the measuring electrode and the ground electrode consecutively, and
- a step for measuring level of the measuring object in accordance with variations of the capacitance measured between all the measuring electrode and the ground electrode.

While the novel features of the invention are set forth in a general fashion, both as to organization and content, it will be better understood and appreciated, along with other objections and features thereof, from the following detailed description taken in conjunction with the drawings.

BRIEF DESCRIPTION OF THE DRAWINGS

FIG. 3 is a block diagram of a level sensor in the present invention.

FIG. 8 is a view illustrating a storing condition of capacitance in a storing part.

FIG. 13C is attached to a side wall of the tank.

FIG. 19 shows a graph illustrating variety of capacitance measured between each of the electrodes to both positive and negative direction caused by adherence of extraneous objects on the electrodes.

FIG. 27 is a view illustrating a storing condition of capacitance in the storing part shown in FIG. 22.

FIG. 31C is attached to a side wall of the tank.

FIG. 38A and FIG. 38B show side views illustrating measurement of both provisional and actual capacitance using a dummy measuring object and a ring shaped dummy measuring object.

DETAILED DESCRIPTION OF THE PREFERRED EMBODIMENT

The First Embodiment

Figure 1A:
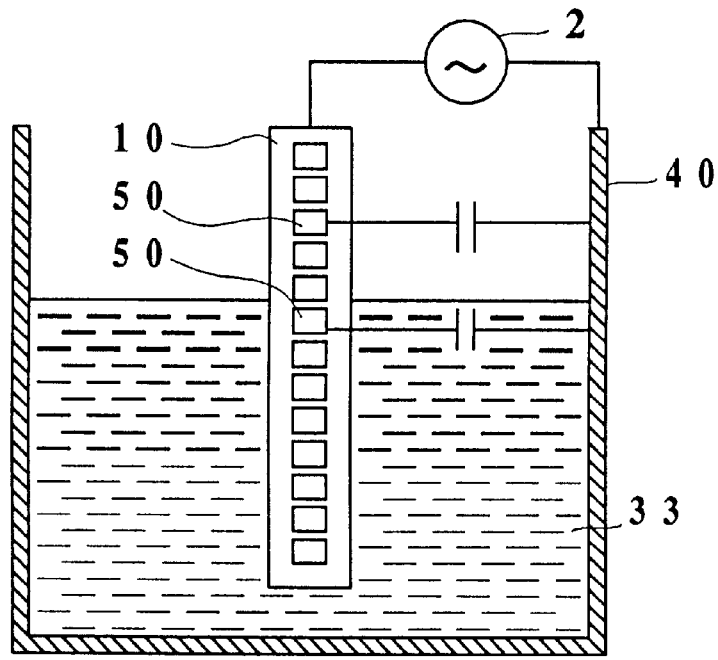
FIG. 1A and FIG. 1B show typical diagrams of the capacitance type level sensors in the prior art.
Figure 1B:
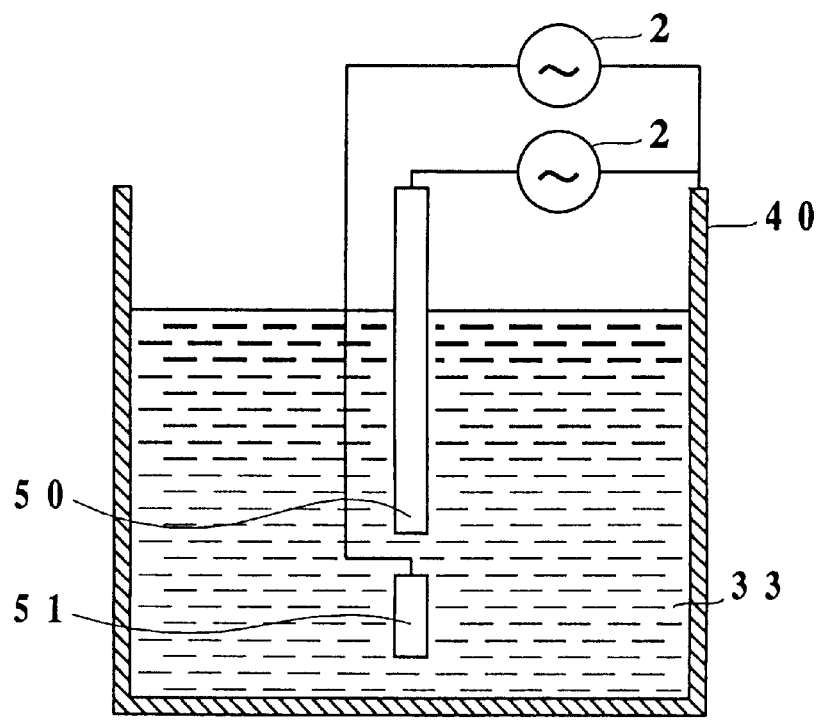
Figure 2A:
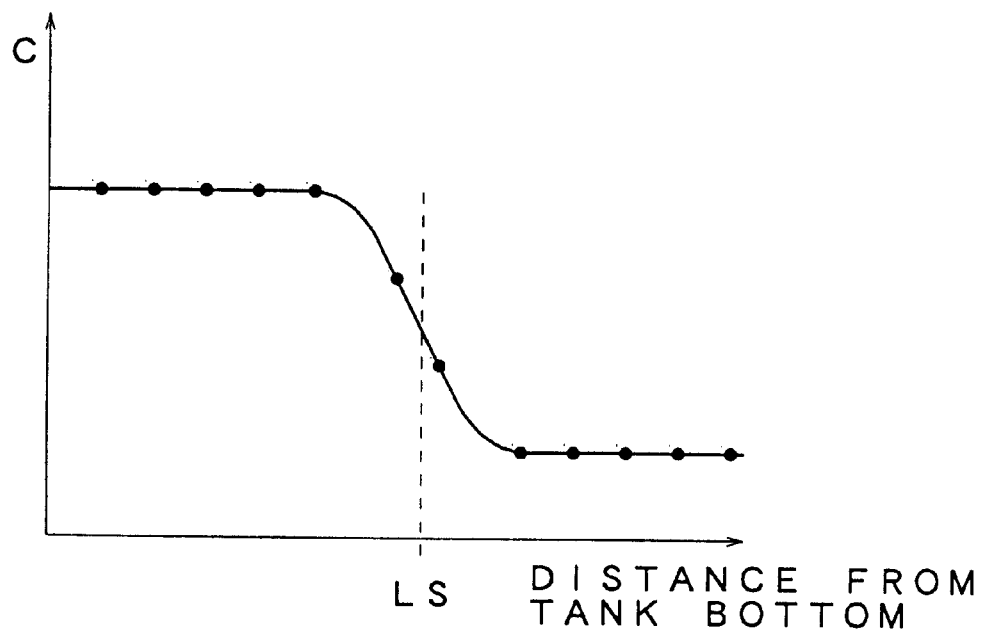
FIG. 2A and FIG. 2B show a relationship between capacitance and each of the electrodes of the capacitance type level sensors in the prior art.
Figure 2B:
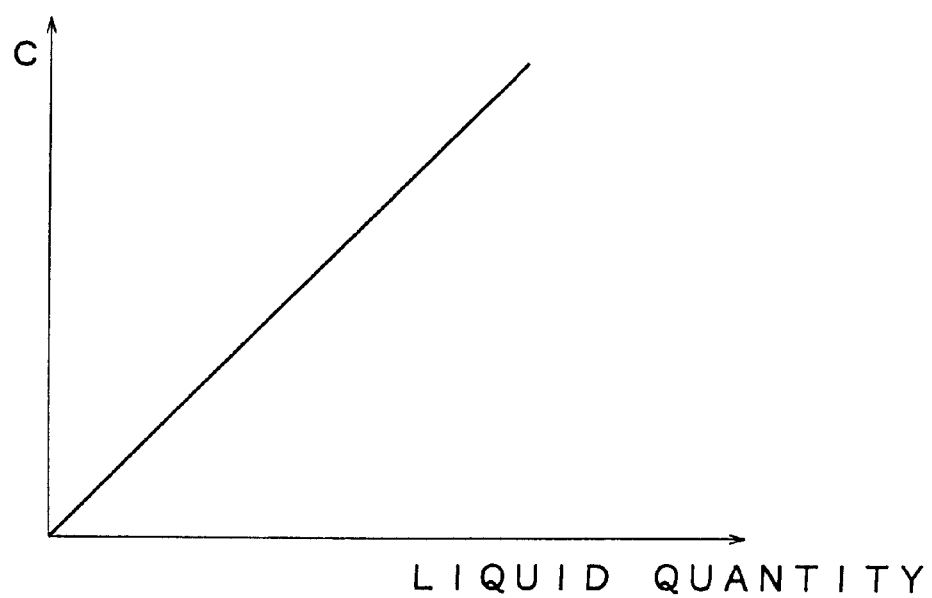

An embodiment of a level sensor in the present invention will be described as below with reference to figures. FIG. 3 is a block diagram of the level sensor in the present invention. The level sensor 100 comprises a sensing part 10 act as an electrode assembly, an oscillator 15, switching means SW20, a receiver 25, a storing part 30 and a control part act as judging means and warning signal outputting part.

A total of n pieces electrodes such as an electrode TE1 to an electrode TEn are provided vertically in the sensing part 10. A plurality of switches are installed into the switching means SW20 and each of the switches are connected to each of the electrodes. Also, the switching means SW20 is connected to the oscillator 15 via a measurement signal line 7, and connected to the receiver 25 through a receiving signal line 8. Further, the switching means SW20 is connected with the control part 35 via a control signal line 9. Also, the receiver 25 comprises an operational amplifier 11, a resistor R1 and an analog/digital converter 13. In the FIG. 3, the control signal line 9 is drawn in single line for reason of convenience, actual control signal line consist of a plurality of lines.

Figure 4A:
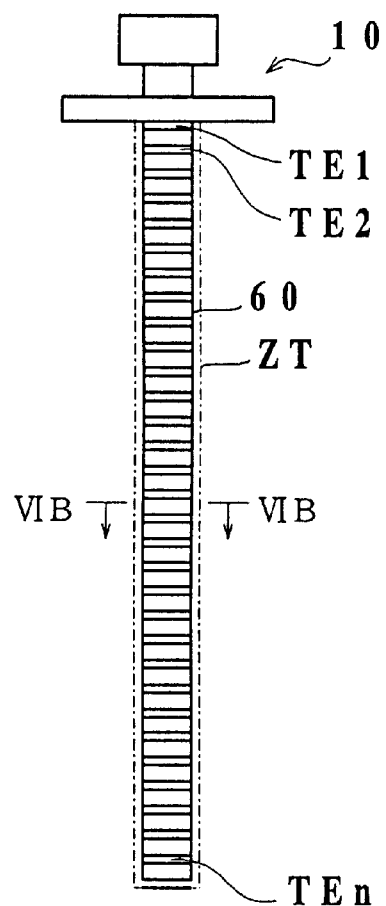
FIG. 4A is a view illustrating exterior of a sensing part shown in FIG. 3.
Figure 5A:
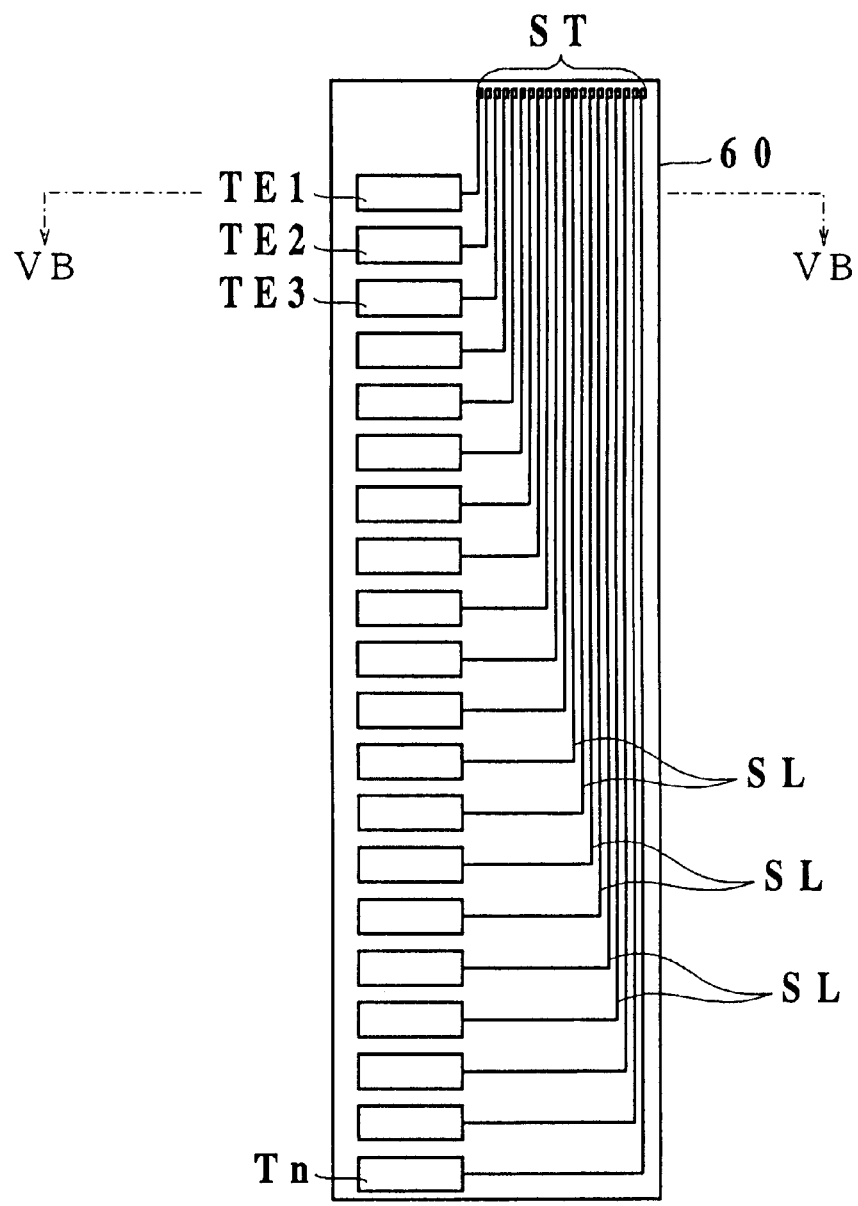
FIG. 5A and FIG. 5B are detailed views of the electrode and a flexible board for the sensing part shown in FIG. 4A, FIG. 4B and FIG. 4C.
Figure 5B:
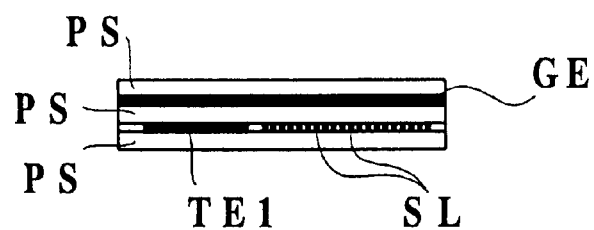

FIG. 4A is a view illustrating exterior of the sensing part 10 in this embodiment. The sensing part 10 is formed in a cylinder shape with a flexible board 60 which comprises a total n pieces of electrodes from the electrode TE1, the electrode TE2, the electrode TE3 to the electrode TEn provided on insulating tube Zt, each at a different height in the vertical direction, and covered with an insulation tube ZT. FIG. 5A and FIG. 5B show detailed expansion views of the flexible board 60. FIG. 5A shows a relationship between each of electrodes and signal lines patterned on the flexible board 60. The electrode TE1, the electrode TE2, the electrode TE3, the electrode TEn are arranged with predetermined space as patterns on the flexible board 60. Also, signal lines SL are wired from the electrode TE1, the electrode TE2, the electrode TE3 the electrode TEn respectively. FIG. 5B shows a sectional view of a portion of the flexible board 60 taken on the line VB—VB of FIG. 5A. The flexible board 60 consists of a total of n pieces of electrodes, the signal lines SL a polyimide insulation sheet PS having three layered structure and a ground electrode GE. The ground electrode GE is connected a ground line GL. Terminals ST are provided to each of the signal lines SL, and the terminals ST are connected to the switching means SW20.

Figure 4B:
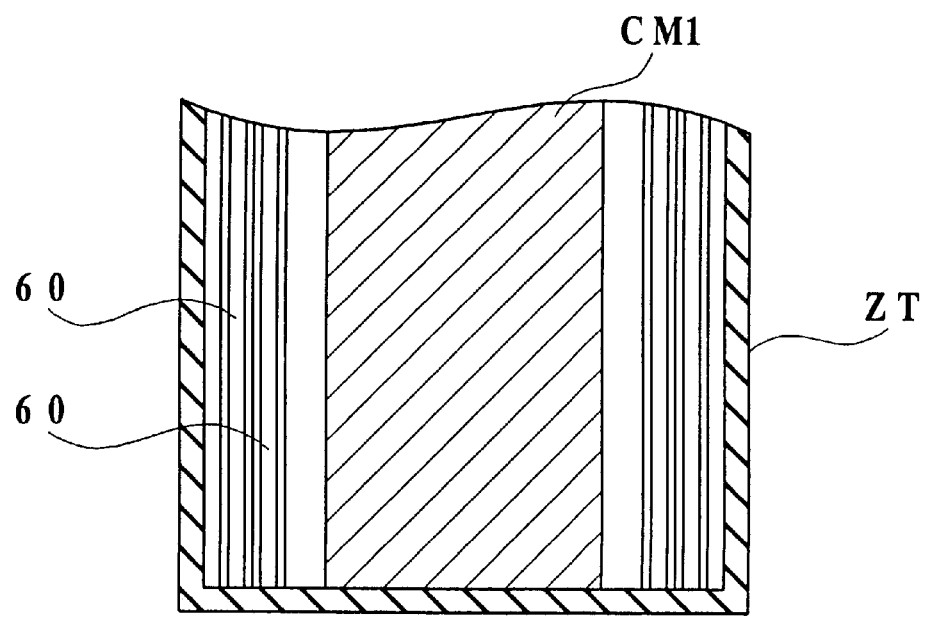
FIG. 4B is a sectional view of the sensing part shown in FIG. 3.

FIG. 4C is a sectional view of the sensing part 10 taken on the line VIB—VIB in FIG. 4A. A cylinder shaped core CM1 for electrodes is in center of the sensing part 10, and the flexible board 60 is formed so as to surround the core. Also, external surface of the flexible board 60 is covered with the insulation tube ZT. In this case, the flexible board 60 is formed in a cylindrical shape so as to expose the electrode TE1, the electrode TE2, the electrode TE3. FIG. 4B shows a transverse cross view of a lower part of the sensing part. As it is clear from the figure, lowermost part of the sensing part 10 is closed by the insulation tube ZT. Formation of the electrodes requires less work, since the electrodes are arranged as patterns on the flexible board 60. Also, measuring objects which may affect the measurement such as oil etc. do not adhere on each of the electrodes, because external surface of the flexible board 60 is covered with the insulation tube ZT. So that, it is not necessary to conduct adjustment of the electrodes for every measurement. It is therefore possible to measure level of the measuring object.

Next, an operation of the level sensor 100 will be described as follows. In the description, it is assumed that the sensing part 10 of the level sensor 100 shown in FIG. 3 is installed in the tank 40. At first, initial values (capacitance) are detected before the measuring object is put into the tank 40 to be measured. In order for detecting initial values, capacitance detection signals are outputted from the control part 35 to the switching means SW20 through the control signal line 9 (see FIG. 3). The capacitance detection signals are the signals that make the switches installed in the switching means SW20 to switch under the timing shown in FIG. 7 for detecting capacitance between electrodes provided adjacently. On receipt of the capacitance detection signals from the control part 35, the switching means SW20 switches the switches consecutively so as to detect capacitance between adjacent electrodes.

Figure 6:
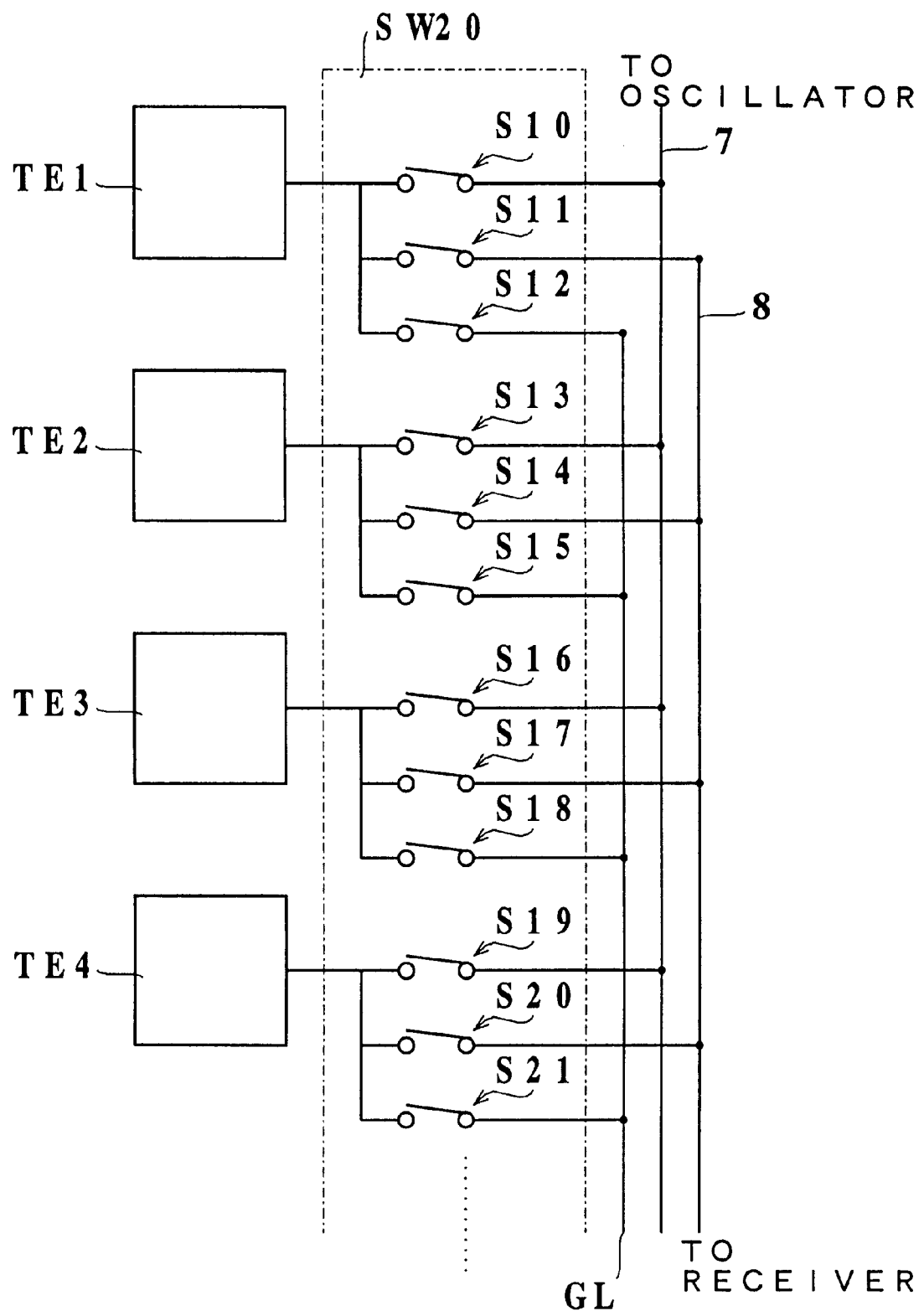
FIG. 6 is a view illustrating operation of switches connected to the electrodes.

Switching operation of the switches for detecting initial value (capacitance) will be described as below with reference to FIG. 6 and FIG. 7. FIG. 6 shows total of four electrodes such as the electrodes. TE1 to TR4, a plurality of switches such as switches S10 to switch S21 each of which is connected to the each of electrodes installed in the switching means SW20, the measurement signal line 7, the receiving signal line 8 and the ground line GL. When initial value (capacitance) between the electrode TE1 and the electrode TE2 is detected, the switching means SW20 controls the switches in accordance with the capacitance detection signals from the control part 35 as follows. Only the switch S10 is closed among the switch S10, the switch S11 and the switch S12 connected with the electrode TE1, and rest of the switches are open. At that time, the switching means SW20 controls so as to close only the switch S14 among the switch S13, the switch S14 and the switch SIS, and to open the outstanding switches.

Figure 7:
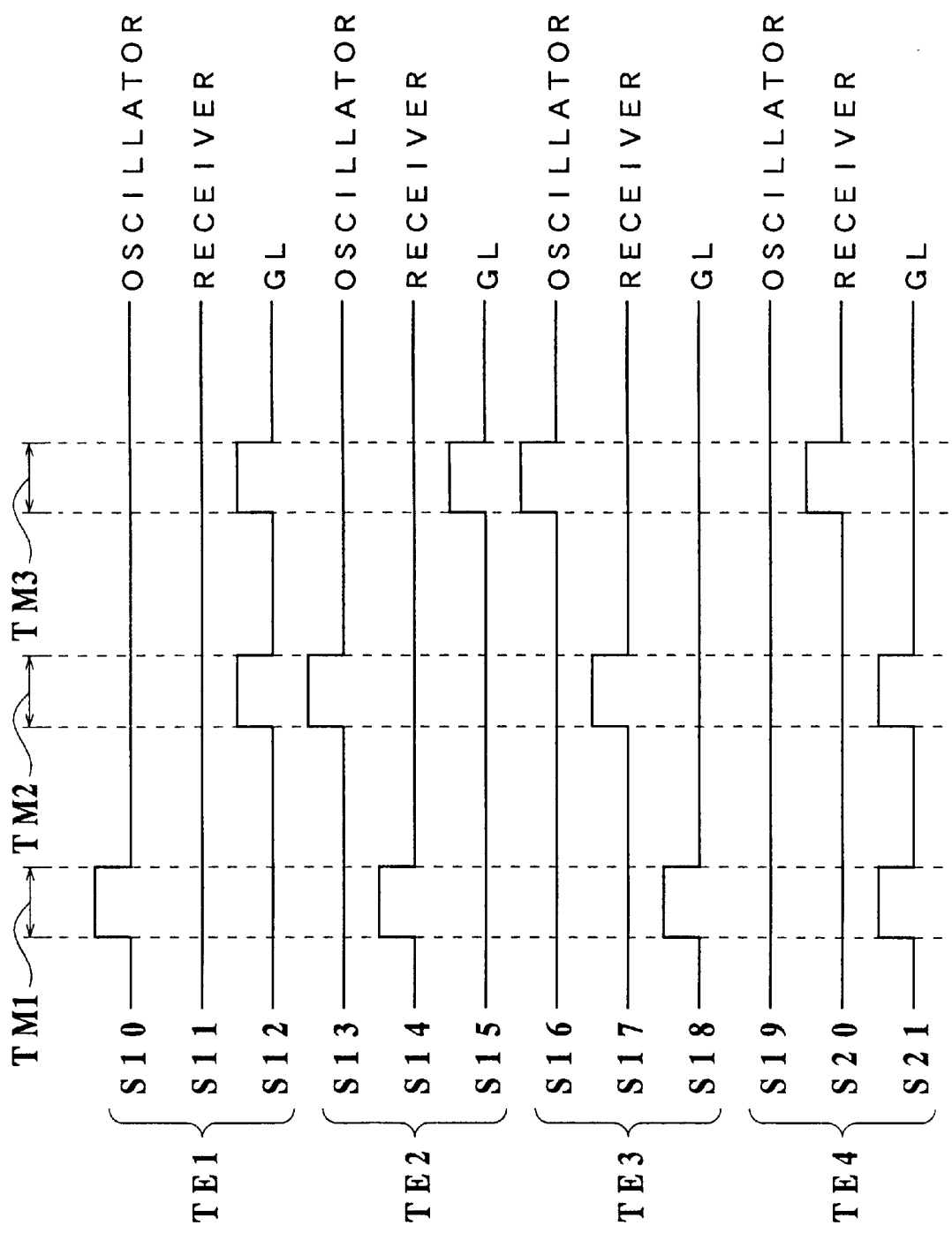
FIG. 7 is a timing chart showing switching time for each of switches shown in FIG. 6.

FIG. 7 is a timing chart showing switching time for the switch S10 to the switch S21 shown in FIG. 6. As it is clear from the FIG. 7, the electrode TE3 and the electrode TE4 both not used for detection are connected to the ground line GL when initial value between the electrode TE1 and the electrode TE2 is detected (at a timing TM1 in FIG. 7).

By conducting the above described operation, measuring signals outputted from the oscillator 15 reaches to the electrode TE1 via the measurement signal line 7 and the switch S10, and then the measuring signals is received by the electrode TE2 through the liquid 33. Then the measuring signals thus received at the electrode TE2 is inputted to the receiver 25 via the switch S14 and the receiving signal line 8. Capacitance between the electrode TE1 and TE2 is detected with the receiver 25 by detecting a Voltage (analog signal) corresponding a current flow through the electrode TE1 and electrode TE2. The analog signal thus detected is converted into a digital signal. Upon the conversion, the digital signal is outputted to the storing part 30 and stored therein.

In the storing part 30, the measured capacitance and a combination of the two electrodes (the combination being the two electrodes used for measurement of the capacitance therebetween, hereinafter referred to as a "combination") are stored respectively. FIG. 8 shows a view illustrating a storing condition of capacitance in the storing part 30. For instance, a combination of the electrode TE1 and the electrode TE2 is assumed as combination A1, initial value 500 pF measured between the electrode TE1 and the electrode TE2 is stored together with the combination A1 as shown in FIG. 8. On completing the storage, storing completion signals are outputted to the control part 35 by the storing part 30.

Figure 9:
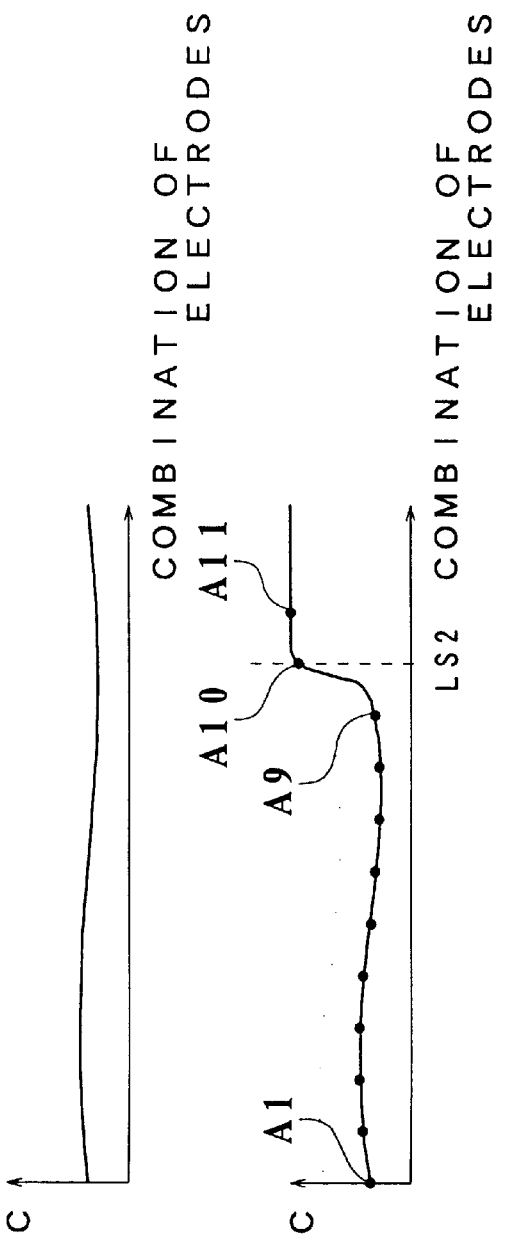
FIG. 9A, FIG. 9B, FIG. 9C and FIG. 9D are graphs illustrating capacitance measured by the level sensor.

The control part 35 which receives the storing completion signals outputs another capacitance detection signals for detecting capacitance (initial value) between the electrode TE2 and the electrode TE3 to the switching means 20. The switching means SW20 controls the switches as described in the above to detect the capacitance between the electrode TE2 and the electrode TE3 in accordance with the capacitance detection signals at a timing TM2 (see FIG. 7). And the detected capacitance is stored into the storing part 30 together with combination A2. Such detection of initial value is conducted consecutively to a combination of the electrode TEn−1 and TEn, and initial values thus detected are stored in the storing part together with each of combinations (FIG. 8). FIG. 9A shows a graph illustrating the initial values thus detected.

Also, the control part 35 compares each of the initial values stored adjacently in the storing part 30. When the control part finds more than a certain (predetermined) difference between adjacent initial values (for instance more than 10% of the adjacent initial value), the control part 35 outputs warning signals. It is assumed that initial value of the combination A1 is stored as 500 pF and initial value of the combination A2 equals to 580 pF. In this case, difference between the initial value of the combination A1 and that of the combination A2 is more than 10% of the initial vale 500 pF of the combination A1.

When the control part 35 finds more than the predetermined difference, the warning signals are outputted from the control part 35. In accordance with the warning signals, either or both of a display and a warning sound alarm displays and outputs the warning signs which indicates that detection can not be conducted.

In other words, the warning signs are displayed (and or outputted) when accurate detection of capacitance can not be conducted by reason of adherence of oil on the insulation tube ZT and corrosion of electrodes themselves which cause sharp increase of capacitance. Owing to such display and/or output of warning signs, an operator of the level sensor can recognizes these irregularities prior to conducting level measurement. Thus, it is possible to conduct level measurement with stability by carrying out countermeasures such as exchange of the electrodes and/or remove the oil from the insulation tube ZT.

In the above embodiment, although the control part 35 compares the initial values for each electrode combination stored adjacently in the storing part 30, and the control part 35 outputs the warning signals when the control part finds more than predetermined difference between the adjacent initial values. Any other method can be applied to the above embodiment, once the method can detect irregularity of the adjacent electrodes. For instance, it is possible to apply a method described below. The control part calculates an average of the initial values stored in the storing part 30, then the control part 35 compares the average of initial value with initial values of each electrode combination. The control part outputs the warning signals when the control part finds more than predetermined difference between the average of initial value and the initial values of each electrode combination. In this method, it is also possible to conduct level measurement with stability by carrying out the countermeasures because of previous notice of irregularity on the electrodes.

Upon comparing each of the initial values stored adjacently, correction values for the initial values shown in FIG. 8 are calculated. The correction values are figured out by calculating an average of all the initial values stored in the storing part 30 and then calculating differences between the averaged initial value and the initial values of each electrode combination (see FIG. 8).

It is assumed that the averaged initial value of all the electrode combinations is calculated as 505 pF, the correction values are figured out by subtracting each of initial value from the averaged initial value of all the electrode combinations. For instance, correction value +5 calculated by subtracting the initial value 500 pF of the combination A1 from the averaged initial value 505 pF of all the electrode combinations is stored as a correction value of the combination A1. In the same manner, correction values for each electrode combination are calculated by subtracting the initial value of each electrode combination from the averaged initial value of all the electrode combination, and storing in the storing part 30 (see FIG. 8). The reason for calculating the correction values of initial values is to minimize following influences such as errors in actual measurement caused by electrodes themselves, oil adherence on the insulation tube, shape of the tank and apparatuses in the tank. Therefore, it is possible to conduct level measurement with certain accuracy and stability by reducing these influences.

Figure 10:
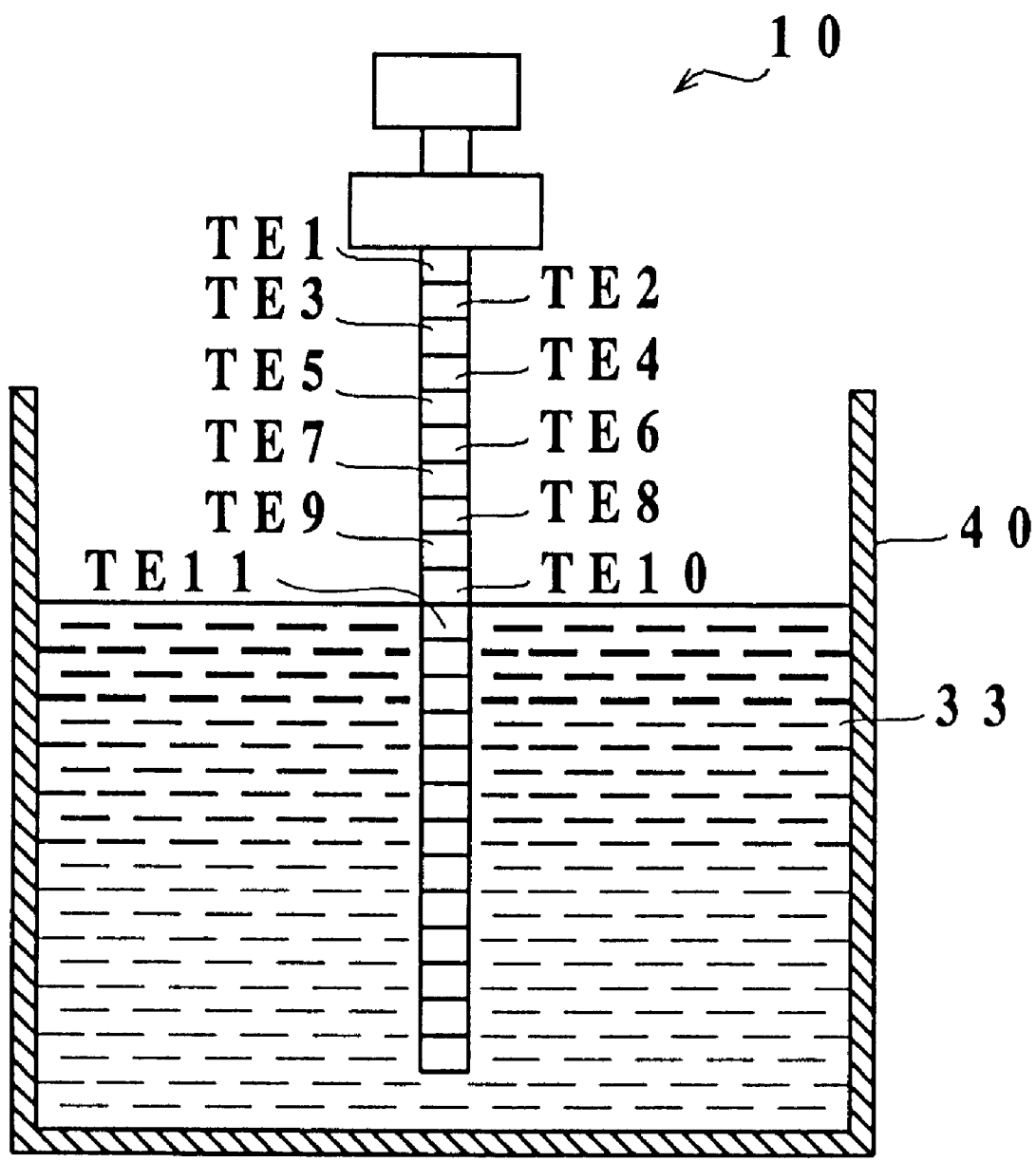
FIG. 10 is a side view illustrating measurement of liquid level for the liquid stored in a tank using the level sensor shown in FIG. 3

Next, an operation of level sensor 100 for measuring level of measuring object will be described. Level measurement of the measuring object is conducted when liquid 33 (measuring object) is stored in the tank 40. At this time, capacitance between two electrodes provide adjacently is detected as detection of initial values, and level of the measuring object is measured in accordance with the detected capacitance. It is assumed that level of the liquid 33 is measured by the level sensor 100 in this embodiment as shown in FIG. 10.

The control part 35 outputs the capacitance detection signals and the switching means SW20 which receives the capacitance detection signals carries out the switching operation as described in the above. In other words, the control part 35 controls the switching means SW20 to switch only two electrodes both of which are used for the detection of capacitance (see FIG. 6, FIG. 7). Actual values (capacitance) detected by the switching operation is stored into the storing part 30 together with combination of electrode (as combination B) (see FIG. 8). At this time, the control part 35 controls to store the actual values away from the initial values when it recognizes that detection of all the initial value is completed.

Upon completion of storage in the storing part 30, the control part 35 outputs another capacitance detection signals for detecting capacitance of next electrode combination to the switching means SW20. The switching means SW20 controls the switches as described in the above to detect the capacitance. That is, the switching means SW20 conduct the same switching operation in all the electrode combinations of electrodes, and then the capacitance of all the electrode combinations (combination B1 and so on) are stored in the storing part 30 (FIG. 8).

Also, the control part 35 compares each of the actual values stored closely in the storing part 30. The control part 35 outputs the warning signals when the control part detects variety of the capacitance stored closely in the storing part, in both positive and negative directions as well as finding more than a certain (predetermined) difference among the capacitance.

For instance, it is assumed that actual of the combination B1 is stored as 500 pF, actual value of the combination B2 equals to 460 pF and actual value of the combination B3 is stored as 510 pF. In this case, the actual value of the combination B2 and the combination B3 varies in both positive and negative directions against the actual value of the combination B1 which is stored closely in the storing part 30. Also, it is assumed that the predetermined value for variation in both positive and negative directions are 10% of the actual value of combination B1. Although the difference between the actual value of the combination B1 and that of the combination B2 is less than the predetermined value such as 40 pF, the difference between the actual value of the combination B1 and that of the combination B3 equals to the predetermined value such as 50 pF. So that, the warning signals are outputted from the control part 35.

In accordance with the warning signals, either or both of a display and a warning sound alarm displays and outputs the warning signs which indicates that detection can not be conducted. In other words, the warning signs are displayed (and or outputted) when accurate detection of capacitance can not be conducted by reason of occurrence for electrodes used in the detection. Therefore, it is possible to conduct level measurement with stability by carrying out appropriate countermeasures for irregular electrodes such as removing the oil from the insulation tube ZT.

In the above embodiment, although the control part 35 compares the actual values of electrode combinations stored closely in the storing part 30, and outputs the warning signals when the control part detects variety of the capacitance detected by the electrodes provided closely in both positive and negative directions with finding more than the predetermined difference among the capacitance. Any other method can be applied to the above embodiment, once the method can detect irregularity of the electrodes provided closely. For instance, it is possible to output the warning sign when the control part calculates an average of the actual values stored in the storing part 30, and then detects variety of the capacitance in both positive and negative directions with finding more than the predetermined difference among the capacitance. In this method, it is also possible to conduct level measurement with stability by doing the countermeasures described in the above.

Next, the actual values are corrected in accordance with the correction values. The actual values detected as above is corrected by utilizing the correction values (calculated) which correspond to each of the actual values. For instance, actual value 502 pF of the combination B1 is corrected by the correction value +5 correspond to the combination B1 (FIG. 8). That is, add the correction value +5 to the actual value 502 pF. So that, corrected actual value 507 pF is obtained. In the same manner, actual value 506 pF of the combination B2 is corrected by the correction value −3 correspond to the combination B2. That is, the correction value is subtracted from the actual value 506 pF. So that, corrected actual value 503 pF is obtained. Thus, the correction described in the above is carried out for all the actual values, and corrected actual values thus obtained are stored in the storing part 30.

FIG. 9B is a graph illustrating variety of the corrected actual values. In the graph, level of the measuring object 33 stored in the tank 40 is measured as a line LS2 stands at the most sharp increase of the corrected actual values stored in the storing part 30. In other words, level of the measuring object is measured as between an electrode TE10 and an electrode TE11 in FIG. 10 and it corresponds to between the combination A10 and the combination A11 in FIG. 8. Thus, the part varies most sharply in the graph is judged as level of the measuring object. So that, it is possible to conduct level measurement. Level of the measuring object 33 thus measured is outputted to the outside of the level sensor 100 for controlling of pump for liquid supply (not shown) or the like.

Figure 11A:
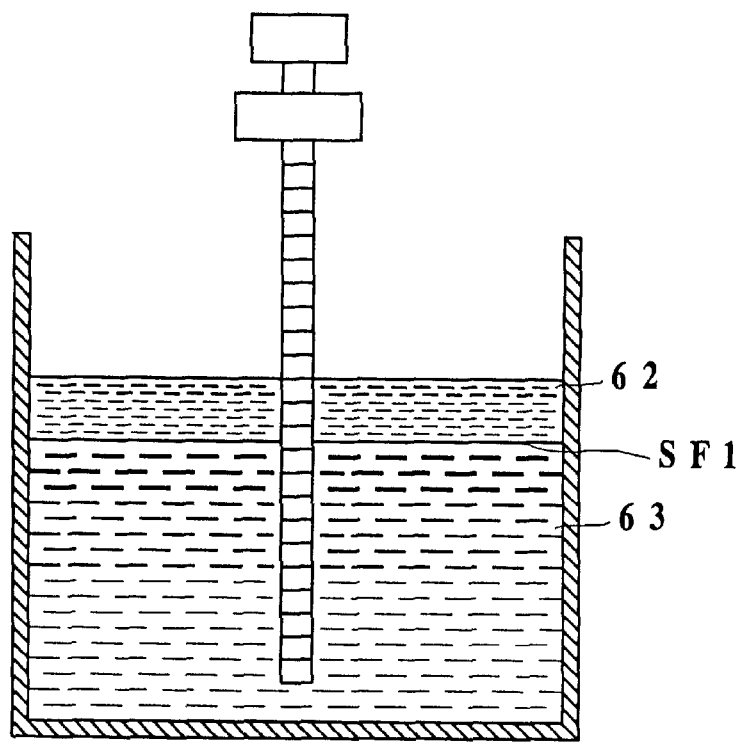
FIG. 11A shows a sectional view when measuring objects stored in the tank are oil and water.

As described in the above, level of the liquid 33 is measured by detecting capacitance between electrodes provided adjacently in this embodiment. So that, it is possible to measure interface SF1 even when the measuring objects are oil 62 and water 63 as shown in FIG. 11A. Here, the interface SF1 between the oil 62 and the water 63 is measured as a line LS3 stands at the second sharp increase of the capacitance shown in FIG. 9C. Therefore, it is possible to remove the oil separately from the water by a pump or the like in accordance with the interface SF1 thus measured, when it is required to remove the oil.

Figure 11B:
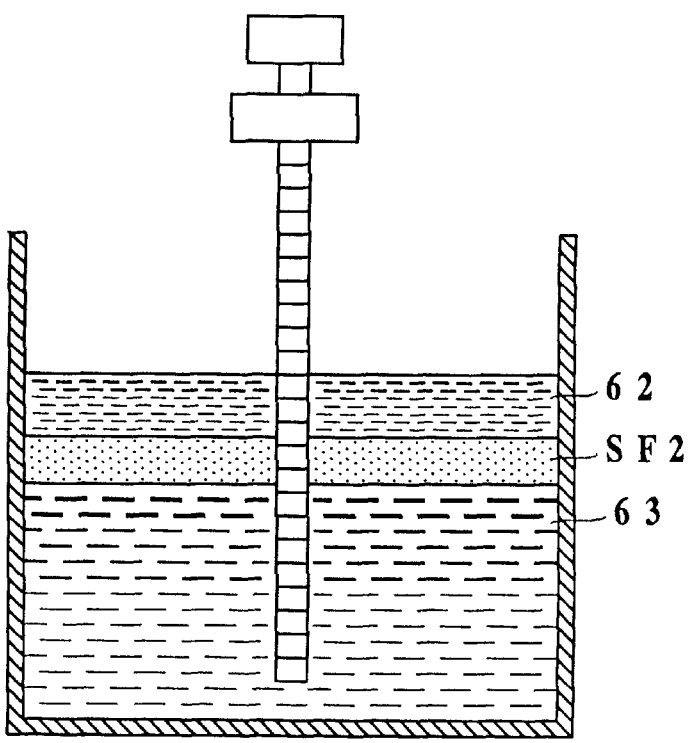
FIG. 11B shows a sectional view when emulsion is formed between the measuring objects.

Further to the above, even when the interface SF2 of the oil and the water is under emulsion as shown in FIG. 11B, it is possible to measure the interface with stability by detecting width for variation of detected capacitance. Here, the interface of the liquid under emulsion is illustrated as width WD1 in FIG. 9D. Therefore, it is possible to measure the interface with stability even when vicinity of the interface is under emulsion.

In the first embodiment described in the above, although level of the liquid is measured by detecting capacitance between the electrodes provided adjacently. However, it is not necessary to use the electrodes provided adjacently for measurement. Instead, capacitance detected between every other electrodes can be used for Level measurement of the liquid 33. For instance, capacitance detected between the electrode TE1 and the electrode TE3 or the electrode TE2 and the electrode TE4 can be used for the measurement. Also, it is possible to conduct level measurement of the measuring object 33 by detecting capacitance between an electrode group consist of a plurality of electrodes (such as the electrode TE1 and the electrode TE2) and the other electrode group consist of a plurality of electrodes (such as the electrode TE3 and the electrode TE4) all of which belong to the sensing part 10.

Figure 12:
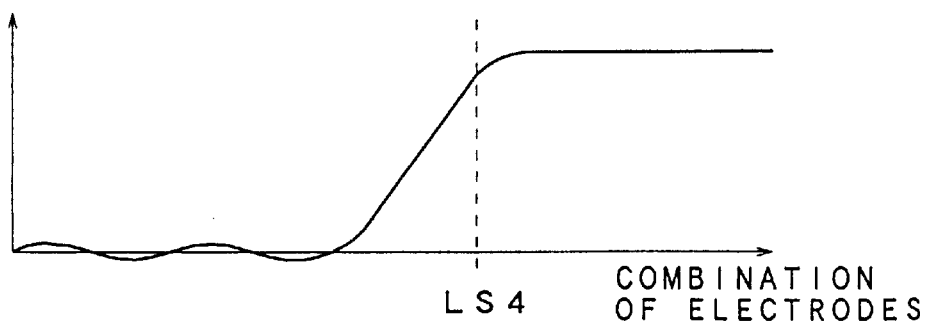
FIG. 12A is a view illustrating a storing condition of capacitance in the storing part in the first embodiment.
FIG. 12B is a graph showing a variation of capacitance stored in the storing part.

Further, the first embodiment described in the above, at first, average of the initial values (averaged initial value) is calculated and then the correction values correspond to each electrode combination are figured out by subtracting the initial value of each electrode combination from the averaged initial value. Further, the corrected actual values are calculated by correcting actual values of each electrode combination in accordance with each of the correction values. Any other method can be applied to the above embodiment, as long as the method can conduct accurate level measurement. For instance, it is possible to take a following method described in below. At first, the initial values are detected and then the actual values are detected. In this case, any correction of the actual values is conducted. Instead of that, varied values are calculated by subtracting the initial values from the actual values. Level measurement can be conducted in accordance the varied values. FIG. 12A shows is a storing condition of values (capacitance) in the storing part 30 in this case, and FIG. 12B is a graph showing a variation of the varied values. In the graph, level of the liquid 33 is measured as a line LS4 stands at the most sharp increase of the varied values. In other words, level of the liquid is measured as between the electrode TE10 and the electrode TE11 in FIG. 10 as measured in the above embodiment (see FIG. 8), and it corresponds to between the combination A10 and the combination A11 in FIG. 12.

As described in the above, level measurement of the measuring objects is conducted in accordance with the capacitance detected between each electrode combination by the level sensor 100 in the first embodiment. Therefore, it is possible to conduct level measurement with stability by reducing influences such as shape of the tank 40 and the tank itself between each of the electrodes. In other words, in the present invention, level measurement can be conducted with accuracy without receiving influence of different dielectric constant caused by temperature difference between upper part and lower part of the liquid stored in the tank 40.

The Second Embodiment

Next, the second embodiment of the present invention will be described. In the first embodiment described in the above, the distance to the electrode which is covered with surface of the measuring object is measured as a level of the liquid (see FIG. 9B, FIG. 10). However, in the second embodiment, level of measuring object itself is measured accurately, instead of the distance to the electrode covered with the surface.

Figure 13A:
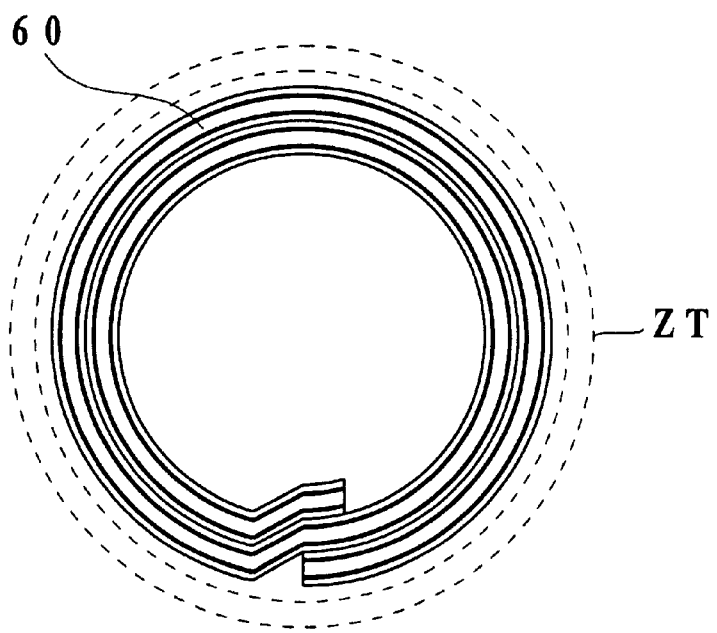
FIG. 13A shows a sectional view from the top of electrodes used in the second embodiment of the present invention.
Figure 13B:
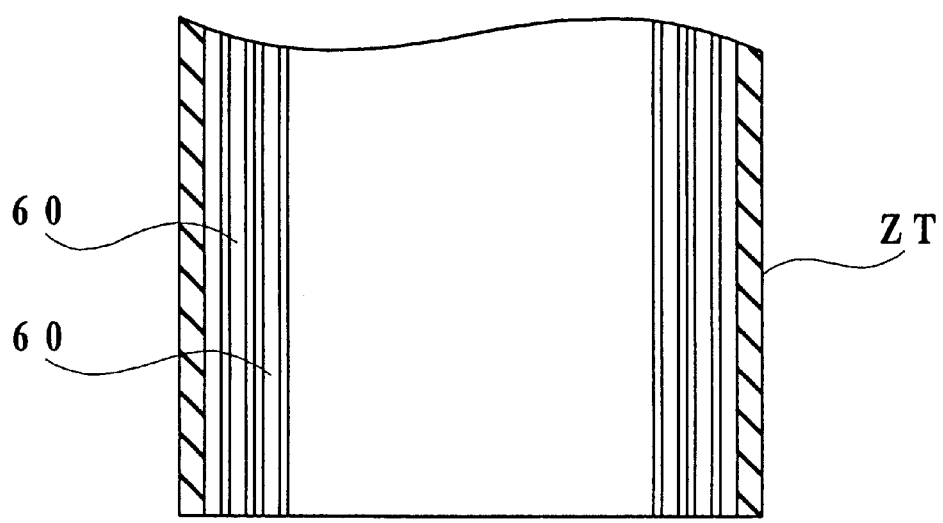
FIG. 13B shows a transverse cross view of a lower part of the electrodes used in the second embodiment of the present invention.
Figure 13C:
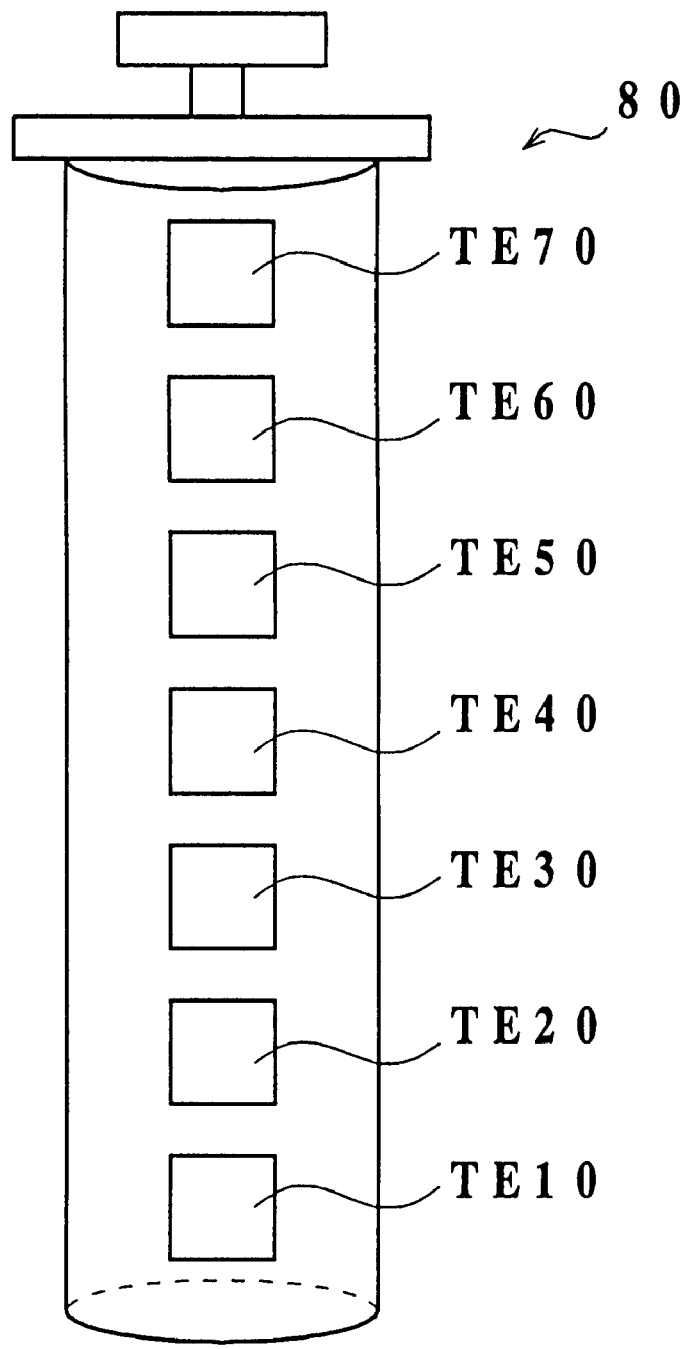
FIG. 13C is a view illustrating exterior of the electrode of the electrodes used in the second embodiment of the present invention.

FIG. 13A shows a sectional view from the top of electrode assembly 80 used in the second embodiment and FIG. 13B shows a transverse cross view of a lower part of the electrode assembly 80. Both of FIG. 13A and FIG. 13B correspond to FIG. 4B and FIG. 4C in the first embodiment. Lower end of the electrode assembly 80 is open and it does not have the core in the center. In this embodiment, a total of 7 pieces of electrodes such as the electrode TE10 to the electrode TE70 are provided on the electrode assembly 80 for reason of convenience as shown in FIG. 13C, the electrode assembly 80 which would be used in actual form has more electrodes. The electrode assembly 80 can be formed by a midair pipe made of insulation material which has a plurality of electrode on inner wall or outside wall.

Figure 14:
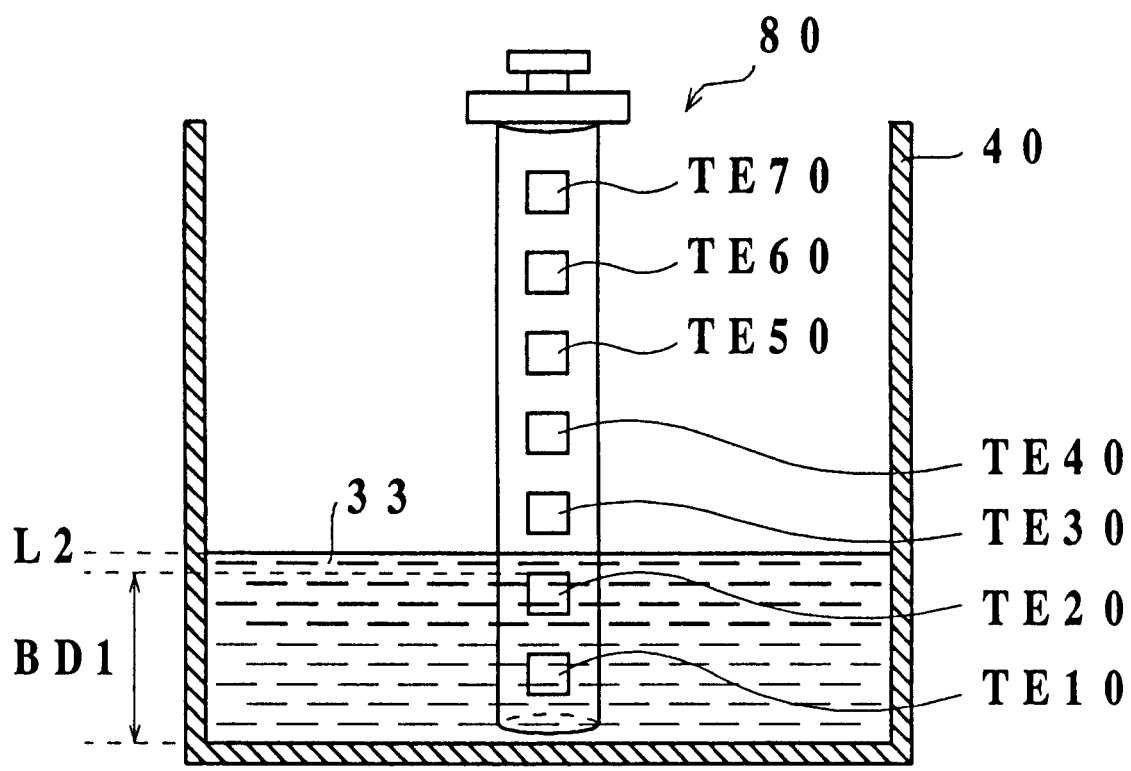
FIG. 14 is a side view showing measurement for level of measuring object stored in the tank under level L2 by utilizing the electrodes shown in FIG. 13A, FIG. 13B and FIG. 13C.

Level measurement of the measuring object 33 stored under level L2 in the tank is conducted by the level sensor 100 using the electrode assembly 80 (FIG. 14). Since the lower end of the electrode assembly 80 is open, so that, the measuring object 33 is guided into the inside of the electrode assembly 80. That is, in this embodiment, the measuring object 33 exists both inside and outside of the electrode assembly 80 (see FIG. 14). Therefore, difference of capacitance detected between a part where the measuring object exists and another part where measuring object does not exist becomes larger than when the measuring object surrounds outside of the electrode assembly 80. Thus, it is possible to conduct level measurement with accuracy and stability. Detail description of level measurement in the second embodiment will be described below. In this embodiment, it is assumed that the detection of initial values as described in the first embodiment and other related operations have been completed.

A level measurement described below can also be conducted by utilizing the electrodes shown in FIG. 4A which has closed lower end. Similarly, the level measurement described in the first embodiment can also be conducted by utilizing the electrode assembly 80 shown in FIG. 13A to FIG. 13C.

Switching operation of the switching means SW20 in this embodiment is conducted in accordance with the capacitance detection signals outputted from the control part as described in the first embodiment. For instance, capacitance between each of electrodes is detected consecutively from lower side of the electrode assembly 80. In other words, capacitance between an electrode being completely under the measuring object 33 and an electrode covered with surface of the measuring object is detected, and stored in the storing part 30.

Figure 15:
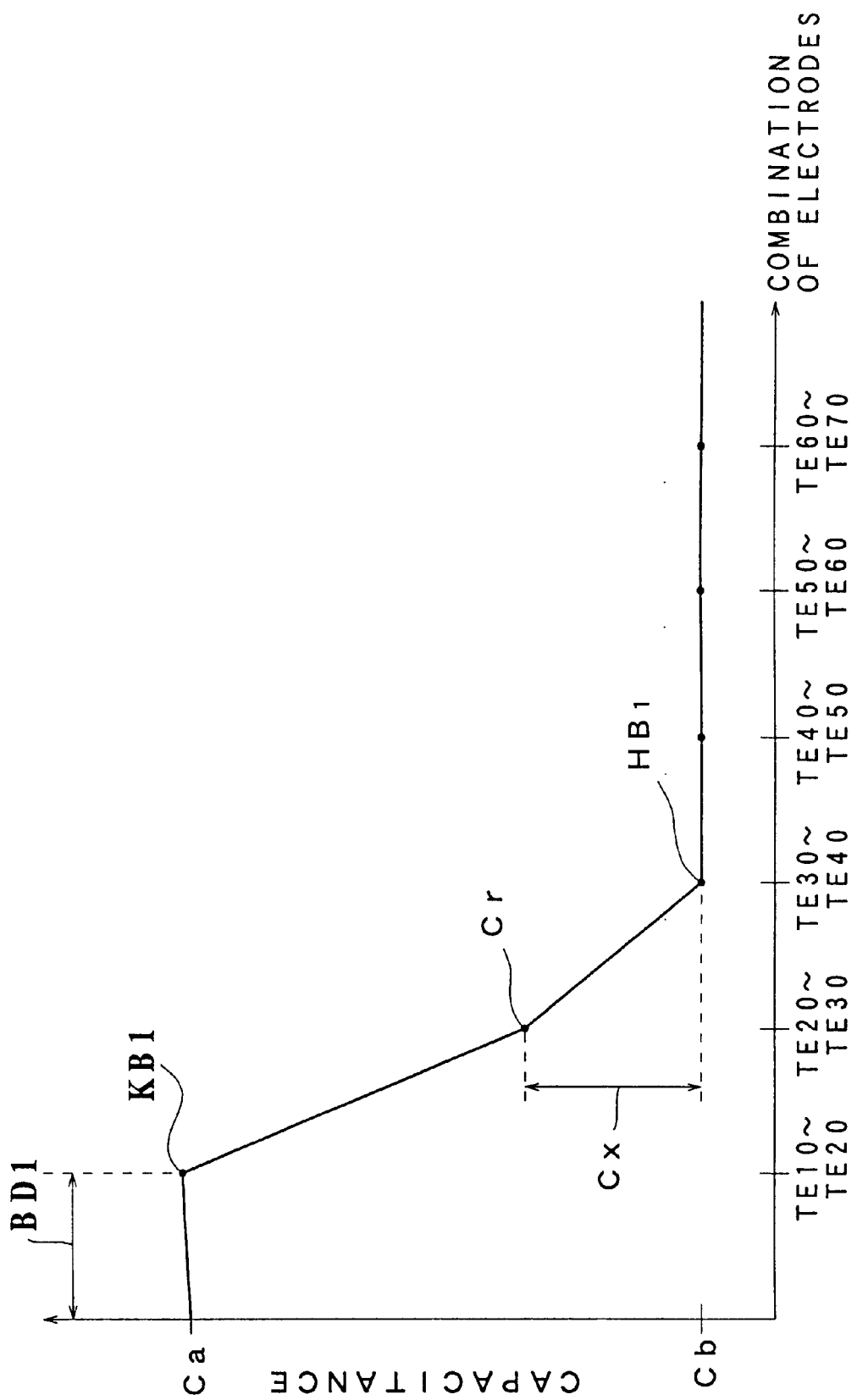
FIG. 15 shows a graph showing a variation of capacitance between each of the electrodes when the measuring object is stored in the tank under level L2.

Now referring to FIG. 15 which shows a graph illustrating a variation of detected capacitance between each of the electrodes when the measuring object is stored in the tank 40 under level L2. At first, the control part 35 calculates a distance (hereinafter referred to as buried distance) from lower end of the electrode assembly 80 to the uppermost electrode (hereinafter referred to as remarked electrode) among the electrodes being completely under the measuring object 33 (see FIG. 14). As it is clear from FIG. 15, capacitance detected between the electrodes (the electrode TE10 to the electrode TE20) both of which being completely under the measuring object is relatively high. On the other hand, capacitance detected between the electrodes (the electrode TE30 to the electrode TE40, the electrode TE40 to the electrode TE50 and so on) each of which being completely exposed in the air is relatively low. Further to above, capacitance detected between the electrodes one of which being completely under the measuring object and the other electrode being completely exposed in the air is between the above capacitances. So that, a distance between lower end of the electrode assembly 80 to upper end of the electrode TE20 is measured as the buried distance BD1 by the control part 35.

Upon measurement of the buried distance, a distance (hereinafter referred to as surface distance) from lower end of the remarked electrode to the surface of the measuring object is measured by the control part 35. Thereafter, level of the measuring object 33 itself is measured accurately by adding the surface distance thus calculated to the buried distance which has already been figured.

Figures 16A, 16B:
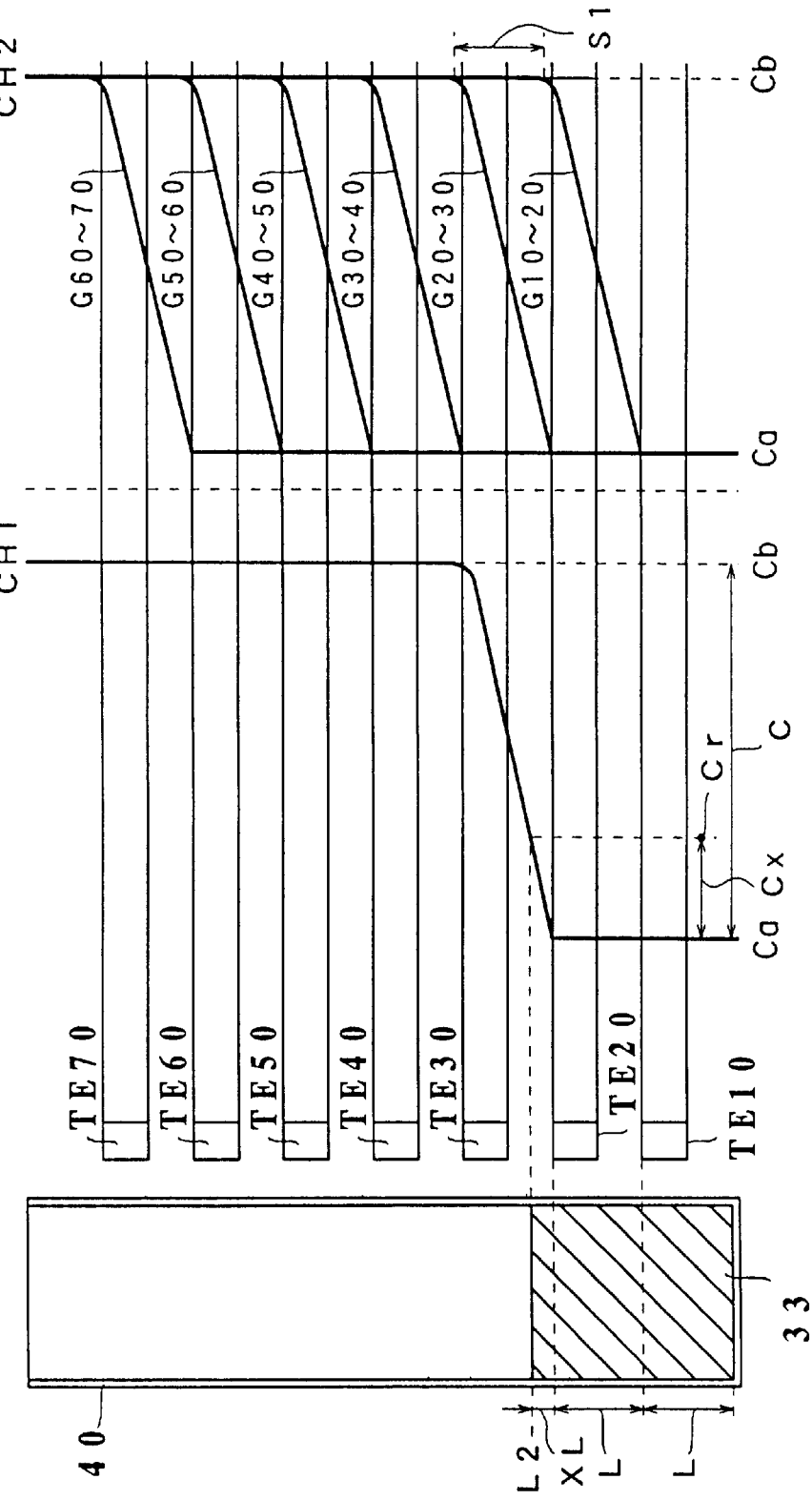
FIG. 16A show a view illustrating a relationship between the measuring object 33 stored in the tank 40 and the electrodes.
FIG. 16B shows a graph illustrating capacitance measured between each of the electrodes, particularly the capacitance measured between the electrodes provided adjacently.

Calculation for the surface distance will be described in below. Referring to FIG. 16A which shows a view illustrating a relationship between the electrode combination and the measuring object, and a graph illustrating capacitance detected between each of the electrode combinations when the measuring object is stored in the tank 40 under level L2. Also, at left hand side of FIG. 16A, the tank 40 which stores the measuring object 33 under level L2 is illustrated. Further, a plurality of the electrode TE10 to the electrode TE70 are shown in right hand side of the tank 40.

Here, a graph CH1 illustrated at right hand side of the electrodes shows a variation of detected capacitance between liquid surface and the electrode TE20 to the electrode TE30 when the measuring object 33 stored in the tank 40 is an object having high dielectric constant (such as water etc.). A graph CH2 illustrated at right hand side of the graph CH1 shows a variation of capacitance detected between liquid surface and each of the electrodes such as the electrode TE10 to the electrode TE70. In the graph, capacitance detected between the electrode TE10 and the electrode TE20 is illustrated as G10 to G20, G20 to G30 shows that of detected between the electrode TE20 and the electrode TE30, G30 to G40 shows that of detected between the electrode TE30 and the electrode TE40, G40 to G50 shows that of detected between the electrode TE40 and the electrode TE50, G50 to G60 shows that of detected between the electrode TE50 and the electrode TE60 and G60 to G70 shows that of detected between the electrode TE60 and the electrode TE70 respectively.

In FIG. 16A, capacitance detected between the electrodes both of which being completely under the measuring object 33 is shown as "Ca", and capacitance detected between the electrodes both of which being exposed in the air is shown as "Cb". In other words, the graph CH1 which shows a variation of capacitance detected between liquid surface and the electrode TE20 to the electrode TE30 keeps capacitance "Ca" until level of the measuring object exceeds upper end of the electrode TE20, and the graph CH1 does not change its capacitance to capacitance "Cb" until upper end of the electrode TE30 is covered with the measuring object 33. Beside, capacitance "Cr" shows actual capacitance detected between the remarked electrode (the electrode TE20) and the lowermost electrode (TE30) among the electrodes being exposed in the air, and "L" shows a pitch length of each of the electrodes in vertical direction.

FIG. 16B shows a storing condition of capacitance measured between each of the electrodes when the measuring object 33 is stored in the tank 40 under level L2. The control part 35 searches a capacitance which is not in capacitance "Cb" sequentially from the capacitance detected between the electrodes located upper side of the electrode assembly 80. By that search, it is judged that all the capacitance detected between the electrode TE60 and the electrode TE70, the electrode TE40 and the electrode TE50 and the electrode TE30 and the electrode TE40 are in capacitance "Cb" by the control part 35.

Next, the surface distance is calculated in accordance with capacitance ("Cr") detected between the uppermost electrodes (the electrode TE20 and the electrode TE30) among the electrodes whose capacitance are not capacitance "Cb". It is understood that the electrode TE20 is completely under the measuring object 33, since capacitance detected between the electrode TE10 and the electrode TE20 is in capacitance "Ca". Thus, the buried distance of the measuring object in this measurement is figured out as 2L equals to twice as much distance of the pitch length L of each of the electrodes (see FIG. 16A). Upon calculating the buried distance, the surface distance is calculated in accordance with the capacitance which is in capacitance "Cr" detected between the electrode TE20 and the electrode TE30. The surface distance XL in this calculation corresponds to the capacitance "Cr", and it is formularized under following equation.

$$XL-L+Cx/C \qquad \text{Equation 1}$$

It is assumed that C=Ca−Cb, Cx=Cr−Cb, and capacitance "Ca" equals to capacitance detected between the electrodes both of which being completely under the measuring object, capacitance "Cb" equals to capacitance detected by the electrodes being exposed in the air, capacitance "Cr" equals to actual capacitance detected between the remarked electrode and the lowermost electrode among the electrodes being exposed in the air, and length L shows a pitch length of each of the electrodes in vertical direction.

In other words, the surface distance XL is calculated by multiplying the pitch length of each of the electrodes in vertical direction by a result of dividing capacitance "Cx" shown in FIG. 16A with capacitance "C". As it is clear form the above equation, a value calculated by subtracting capacitance "Cb" detected between the electrodes both of which being exposed in the air from capacitance "Ca" detected between the electrodes both of which being completely under the measuring object 33 is capacitance "C". And a value calculated by subtracting capacitance "Cb" from actual capacitance ("Cr") detected between the remarked electrode and the electrodes being exposed in the air is capacitance Cx. The surface distance XL of when the measuring object 33 is stored under level L2 can be calculated by substituting actual values into "equation 1".

Thereafter, buried distance BD1 (structural distance from edge of the electrode assembly 80 to the electrode TE20) is added to the surface distance thus calculated described in the above by the control part 35. It is possible to conduct level measurement in the same manner as described in the above even when the measuring object 33 is stored under other level in the tank 40. When the measuring object 33 is stored under a level equals to the pitch of an electrode (see FIG. 16A), a distance to the pitch is measured as the level 1 of the measuring object.

Thus, it is possible for the level sensor 100 (see FIG. 3 and FIG. 13) using the electrode assembly B0 in this embodiment to measure the level of the measurement object itself. Therefore, more accurate and stable level measurement can be conducted.

Figures 17A, 17B:
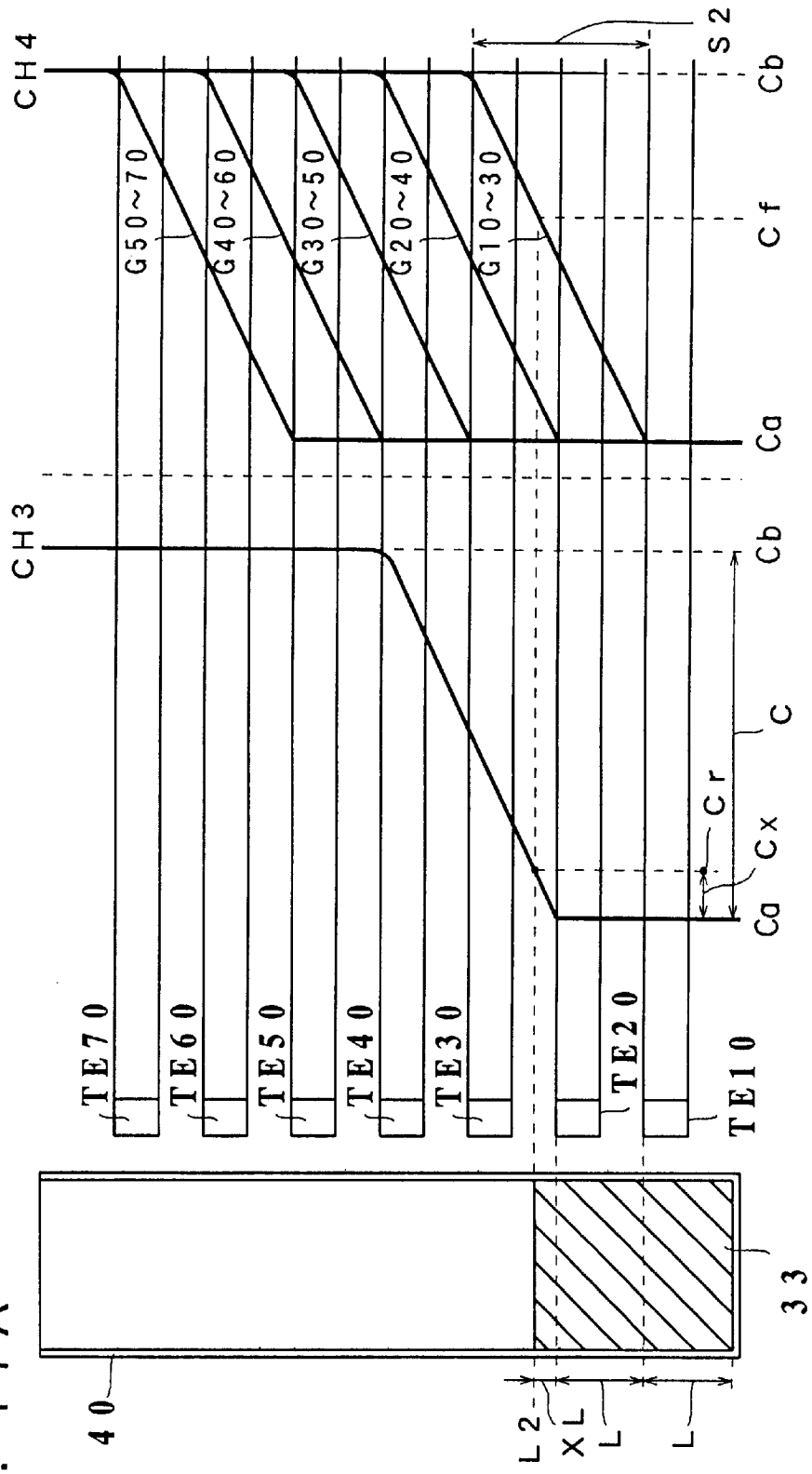
FIG. 17A show a view illustrating a relationship between the measuring object 33 stored in the tank 40 and the electrodes.
FIG. 17B shows a graph illustrating capacitance measured between each of the electrodes, particularly the capacitance measured between the electrodes provided one other electrode.

Referring to FIG. 17A which shows a view illustrating a relationship between the measuring object 33 stored in the tank 40 and the electrodes, and a graph illustrating a variation of capacitance detected between each of the electrodes when the measuring object is stored in the tank 40 under level L2 as shown In FIG. 16A. FIG. 17A shows a graph showing capacitance detected between every other electrodes. FIG. 17B shows a storing condition of capacitance measured between every other electrodes shown in FIG. 17A.

The control part 35 searches a capacitance which is not in capacitance "Cb" sequentially from the capacitance detected between the electrodes located upper side of the electrode assembly 80, and the surface distance is calculated in accordance with capacitance ("Cr") detected between the uppermost electrodes among the electrodes whose capacitance are not in capacitance "Cb".

Here, a graph CH3 illustrated at right hand side of the electrode TE10 to the electrode TE70 shown in FIG. 17A shows a variation of detected capacitance between liquid surface and the electrode TE20 to the electrode TE40 when the measuring object 33 stored in the tank 40 is an object having high dielectric constant. A graph CH4 shows a composed capacitance detected between every other electrodes among the electrode TE10 to the electrode TE70 when the measuring object 33 stored in the tank 40 is an object having high dielectric constant. In the graph, capacitance detected between the electrode TE10 and the electrode TE30 is illustrated as G10 to G30, G20 to G40 shows that of detected between the electrode TE20 and the electrode TE40, G30 to G50 shows that of detected between the electrode TE30 and the electrode TE50, G50 to G70 shows that of detected between the electrode TE50 and the electrode TE70.

In FIG. 17A, a space S2 which represents a distance for change of capacitance "Cb" to capacitance "Ca" does not correspond to the pitch length of the electrodes, that is different from space S1 shown in FIG. 16A. So that, in order to calculate the surface distance XL, value of "L" in the "equation 1" must be substituted by value of the space S2.

In the graph shown in FIG. 16A, the space S1 represents a distance for change of capacitance "Cb" to capacitance "Ca" substantially corresponds to the pitch length "L" of the electrodes because the measuring object is an object having high dielectric constant. However, the space S1 possibly does not correspond to the pitch length "L" of the electrodes when the measuring object is an object having low dielectric constant such as kerosine, resin pellets or the like. In that case, it is possible to calculate accurate surface distance by substituting the space S1 represents a distance for change of capacitance "Cb" to capacitance "Ce" instead of the pitch length "L" of the electrodes in the "equation 1".

In the meantime, although detection of capacitance is conducted consecutively in order from the electrode positioned lower side of the electrode assembly 80 such as from the electrode TE10, the electrode TE20 and so on, when the buried distance is measured in the first and the second embodiment. Detection of capacitance can be conducted in order of the other way from the electrode positioned upper side of the electrode assembly 80 such as from the electrode TE70, the electrode TE60 and so on. Further, detection of capacitance can be conducted simultaneous from both the upper and the lower side (start from the electrode TE70 and the electrode TE10, the electrode TE60 and the electrode TE20 and so on) of the electrode assembly 80 instead of either from the upper side or the lower side of the electrode assembly 80 (see FIG. 14).

Figure 18:
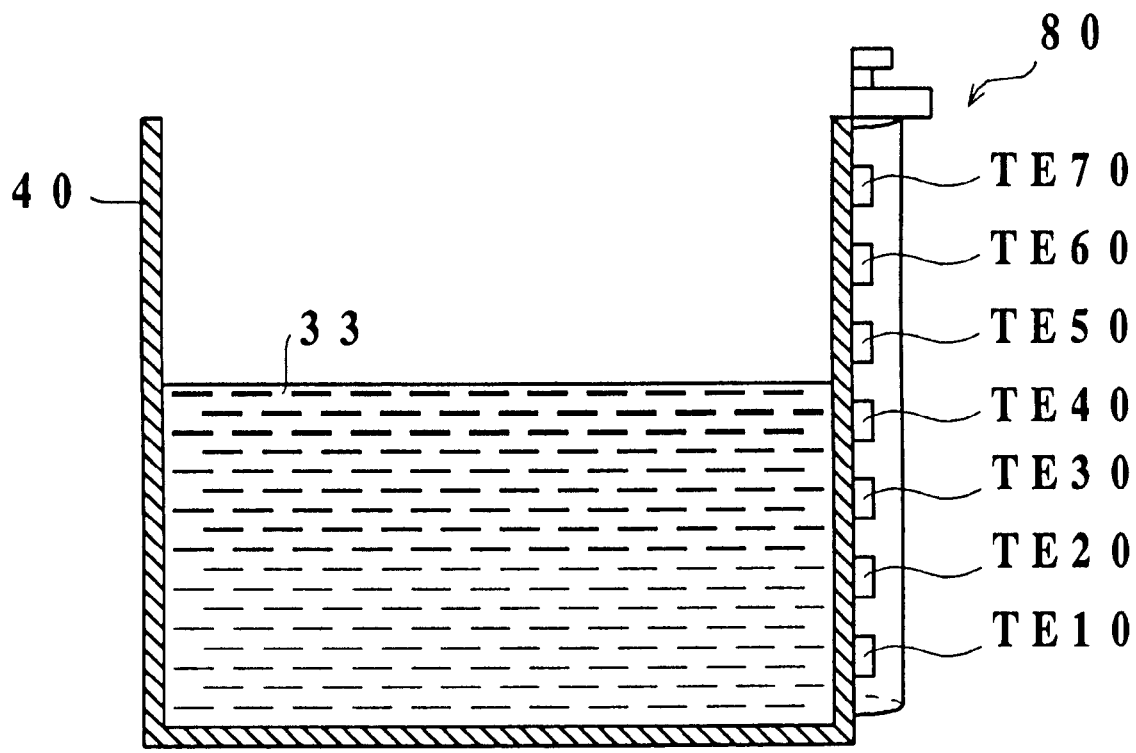
FIG. 18 show a side view illustrating that the electrodes shown in FIG. 13A, FIG. 13B

Although, level measurement of the second embodiment is conducted by utilizing the electrode assembly 80 which allows the measuring object 33 to comes in it, and the electrode assembly 80 is installed in the tank 40 which stores the measuring object 33. However, level measurement can be conducted by attaching the electrode assembly 80 on an outer wall of a nonconducting tank and then detection of capacitance is conducted as shown in FIG. 18. Once the electrode assembly 80 is attached on the side wall of the tank 40, the measuring object never contact with each of the electrodes directly. Therefore, it is possible to conduct accurate level measurement after a long period of use as a result of avoiding oil adhesion on the electrode surface. Also, materials used for the electrode assembly 80 are not limited to specific materials, because it never contacts with the measuring object. In addition, accurate level measurement can be conducted even when the electrode assembly 80 can not be installed in the tank which stores antiseptic solution for sanitary reasons.

Further, in order to calculate the surface distance XL, capacitance C which is figured out by subtracting capacitance Cb detected between the electrodes being exposed in the air from capacitance "Ca" detected between the electrodes both of which being completely under the measuring object is used in the second embodiment (FIG. 15). Any other method can be applied to the above embodiment, as long as the method can conduct accurate level measurement. For instance, the surface distance XL can be calculated by substituting an average value of capacitance detected between the electrodes (from the electrode TE10 to the electrode TE20) each of which being completely under the measuring object instead of capacitance "Ca", and an average value of capacitance detected between the electrode (from the electrode TE30 to the electrode TE70) each of which being exposed in the air instead of capacitance "Cb", in "equation 1".

Further, although both the average value of capacitance detected between the electrodes being completely under the measuring object and that of detected between the electrodes being exposed in the air are used for calculation of the surface distance XL. However, other capacitance can be used for calculating the surface distance XL instead of these averaged values, for instance capacitance detected between the electrodes at least one of which being the nearest one from surface of the measuring object and both of which being completely under the measuring object (correspond to capacitance KB1 shown in FIG. 15) for the capacitance "Ca", and a capacitance detected between the electrodes at least one of which being the nearest one from surface of the measuring object and both of which being exposed in the air (correspond to capacitance HB1 shown in FIG. 15) for the capacitance "Cb".

Still further, the control part 35 judges that variety of the capacitance detected in both positive and negative directions caused by adherence of conductive extraneous objects on part of the electrodes (especially at the electrodes located at near the liquid surface) does not correspond to surface of the measuring object 33 when capacitance is detected between the electrodes. That is, for instance, it is assumed that capacitance detected between the electrode TE10 and the electrode TE20 and between the electrode TE20 and the electrode TE30 varies in both positive and negative directions as shown in FIG. 19. The control part 35 judges that the variation of detected capacitance PN1 and adjacent capacitance in both positive and negative directions caused by adherence of extraneous objects on the electrodes does not correspond to surface of the measuring object 33. In other words, the control part 35 recognizes variation of detected capacitance in negative direction as surface of the measuring object 33 such as capacitance detected between the electrode TE30 and the electrode TE40 as shown in FIG. 19. Thus, even when variation of detected capacitance in both positive and negative directions caused by oil adhesion on the electrode surface is detected, the control part 35 never recognizes the variation as surface of the measuring object. As a result, it is possible to conduct level measurement with accuracy.

Figure 20A:
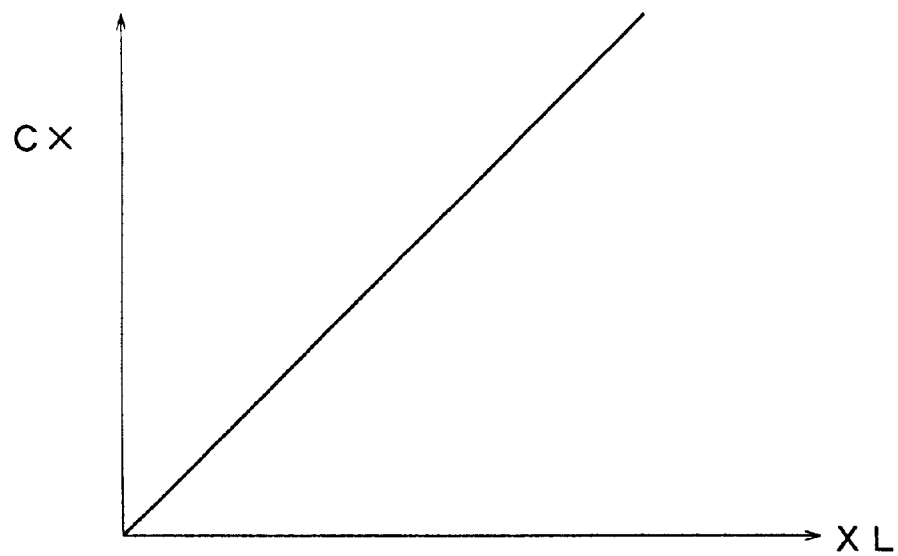
FIG. 20A and FIG. 20B show graphs illustrating a relationship between variety of capacitance and distance to the surface.
Figure 20B:
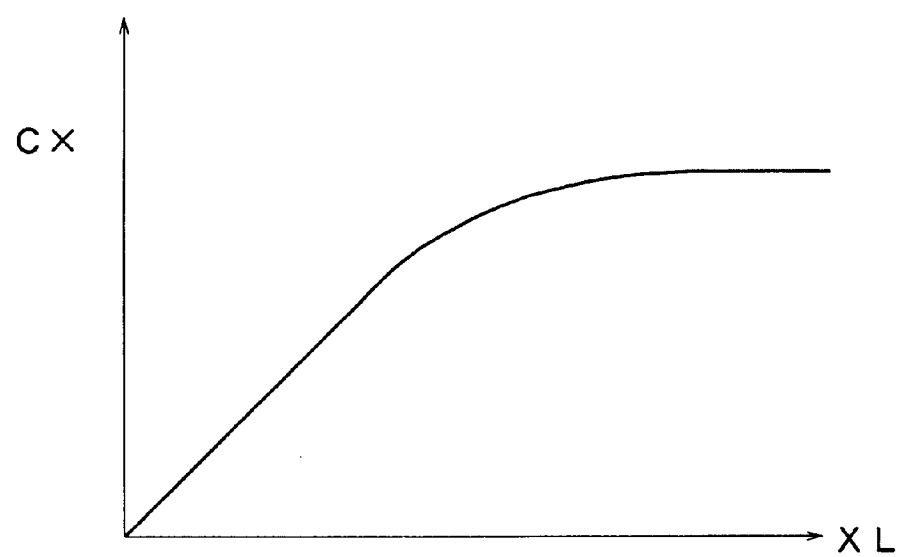

In this embodiment, capacitance "Cx" varies linearly as shown in FIG. 15. FIG. 20A shows a graph illustrating a relationship between variety of capacitance "Cx" and the surface distance XL. Capacitance Cx does not vary linearly all the time, variation can be occurred in curved line caused by discrepancies of dielectric constant between temperature at upper part and lower part of the measuring object as shown in FIG. 20B. In that case, level measurement can be conducted accurately by calculating the surface distance XL which is obtained in consideration of a relationship between capacitance "Cx" and the surface distance XL.

In the meantime, in the first and the second embodiment described in the above, the initial value (capacitance) are detected in prior to store the measuring object into the tank, and the initial values are corrected to obtain the correction values. In addition, level measurement of the measuring object is conducted in accordance with the corrected actual value calculated by correcting the actual values (capacitance) with the correction values thus obtained. In other words, the initial values are corrected for accurate level measurement.

However, the capacitance (corrected initial value) detected between each of the electrodes does not become identical even when the electrodes are installed in the tank which stores a measuring object formed uniformly. The reason of that is considered as variety of detectability among the electrodes caused by lack of accuracy for formation and misalignment of the electrodes in the electrode assembly 80 or the sensing part 10.

In this embodiment, correction coefficient numbers are calculated to equalize detectability for each of the electrodes, and the actual values are corrected in accordance with the correction coefficient numbers. By carrying out the correction, accurate level measurement in consideration of lack of accuracy and misalignment of the electrodes can be conducted.

Detail description for calculating the correction coefficient numbers will be described in below. At first, initial vales between each of the electrodes are detected in the same manner as described in the first and the second embodiment. Secondly, provisional measured values (capacitance) between each of the electrodes are detected by installing all the electrodes of the electrode assembly 80 or the sensing part 10 in the tank which stores a measuring object (which has uniform capacitance) formed in uniform component and thermal distribution, and then the provisional measured values are stored in the storing part. Thereafter, span capacitance values for each of the electrodes are calculated by subtracting the initial values from the provisional measured values. Then, provisional average value is calculated by averaging all the span capacitance values after detecting the calculated span capacitance values for all over the electrodes. Upon calculating the provisional average value, correction coefficient numbers for each of the electrodes are calculated.

For instance, it is assumed that initial value between certain electrodes is detected as 520 pF and provisional measured value is detected as 900 pF. In this case, 380 pF which is calculated by subtracting the initial value 520 pF from the provisional measured value 900 pF correspond to the span capacitance value. Provisional average value is a value calculated by averaging all the span capacitance values which is detected the span capacitance values for all over the electrodes. When the provisional average value is calculated as 400 pF, correction coefficient number in this case is figured out by dividing 380 pF represents the span capacitance value with 400 pF correspond to the provisional averaged value such as 0.95.

The correction coefficient number thus obtained is used for correcting measurement error of capacitance detected between each of the electrodes. In other words, corrected capacitance values for each of the electrodes are calculated. In this case, corrected capacitance values for electrodes are calculated by multiplying 1/correction coefficient number to a number which is figured out by subtracting the initial value from the provisional measured value. That is, the corrected capacitance value is figured out by multiplying 1/0.95 to 380 pF which is a result of subtracting 520 pF correspond to the initial value from 900 pF represents the provisional measured value. Result of calculation is shown as 400 pF corresponds to a capacitance value detected between the electrodes. Thus, it is possible to conduct more accurate level measurement by utilizing correction coefficient for detection of capacitance between each of the electrodes. Actual measured values detected between other electrodes are corrected by the correction coefficient calculated in the same manner described in the above.

Although the provisional measured values (capacitance) are detected and stored after installing all the electrodes into the tank which stores a measuring object having uniform capacitance in the above embodiment. However, it takes lot of work to install the sensing part 10 or the electrode assembly 80 to a proper location in the tank when the sensing part 10 or the electrode assembly 80 are formed in large scale. Also, it is not easy to detect the provisional measured values in the above described manners when the measuring object is a toxic material. To avoid such installation just for correction procedure, the provisional measured values are detected by sliding a dummy measuring object GK1 which increases capacitance between adjacent electrodes than that of the air with a space DS1 from the sensing part 10 (or the electrode assembly 80) toward a direction of arrow 140. By doing that, it is possible to detect the provisional measured values (capacitance) to be detected between adjacent electrodes. It is therefore possible to detect accurate provisional measured values which correspond to dielectric constant of the measuring object easily without actual work for installation of sensor part 10 (or the electrode assembly 80).

There are two ways to realize that by using the dummy measuring object GK1. One of which is to simulate dielectric constant of the measuring object by positioning the dummy measuring object GK1 made of a material having higher dielectric constant (a material having similar dielectric constant is preferable) than the air between adjacent electrodes. So that, capacitance between simulated measuring object and the electrodes can be detected. Dielectric constant of the simulated measuring object can be adjusted by changing the space DS1 and size of the dummy measuring object GK1. The materials having similar dielectric constant such as polyester etc. and materials having high dielectric constant for instant barium titanate, titanate, PZT, metaniobate can be used for the dummy measuring object GK1. Beside these materials, any other materials having similar or higher dielectric constant to the measuring object can be used for the dummy measuring object GK1 as long as it may form the shape of it.

The other way of realization by using the dummy measuring object GK1 is to simulate dielectric constant of the measuring object by shorten the distance between adjacent electrode electrically. In other words, the dummy measuring object GK1 made of conductive materials such as metals is positioned near from adjacent electrodes without causing short circuit in order to shorten the distance electrically. So that, capacitance between simulated measuring object and the electrodes can be detected. As a result of that, it is possible to detect the provisional measured values easily without actual work for installation of sensor part 10 (or the electrode assembly 80). In this case, surface of the dummy measuring object GK1 is covered with resins or the like to avoid short circuit and corrosion of the dummy measuring object GK1.

Following conductive materials such as metals for instance steel, copper, brass, aluminum, stainless steel, titan can be used for the dummy measuring object GK1. Any other conductive materials can be used for the dummy measuring object GK1 as long as it may form the shape of it. Also, following resins can be used to cover the dummy measuring object GK1 such as vinyl chloride, polyethylene, polypropylene, fluoride resins. In case of making the dummy measuring object GK1 by the metals which tolerates corrosion or other factors, such as stainless steel or titan, it is not necessary to cover it with resin. It is logical to combine both of the above described ways in the dummy measuring object GK1.

Thus, it is possible to measure the provisional measured values without dipping all the electrodes of the sensing part 10 or the electrode assembly 80 into the measuring object having uniform capacitance by sliding the dummy measuring object GK1 which increases capacitance between adjacent electrodes than that of the air.

Figure 21A:
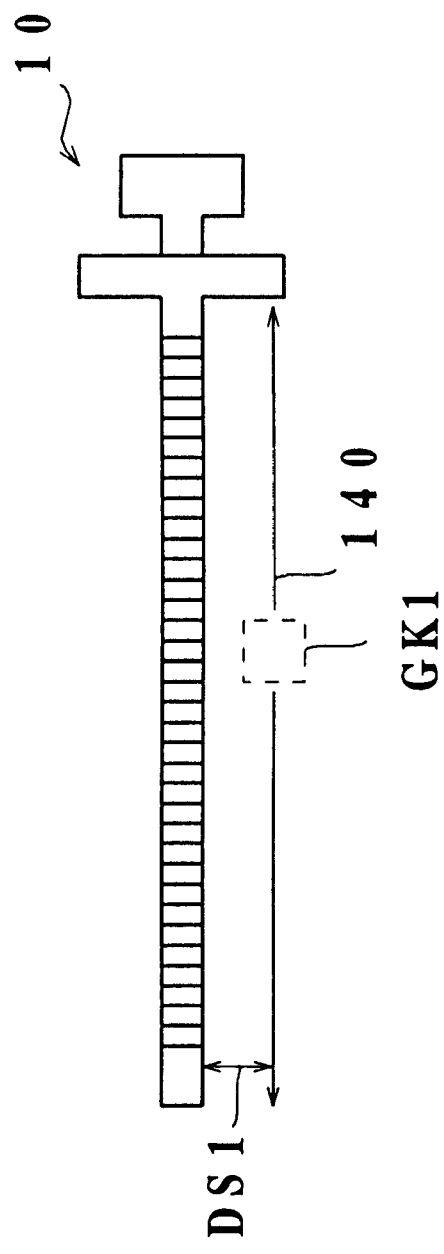
FIG. 21A and FIG. 21B show side views illustrating measurement of both provisional and actual capacitance using a dummy measuring object and a ring shaped dummy measuring object.
Figure 21B:
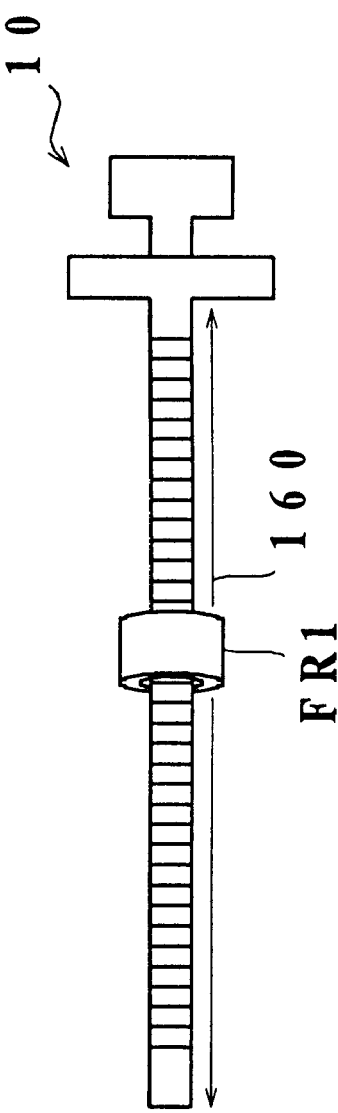

Also, FIG. 21B shows a side view illustrating the dummy measuring object GK1 being formed as a cylinder shaped dummy measuring object FR1. In this case, provisional measured values (capacitance) can easily be detected by sliding the cylinder shaped dummy measuring object FR1 toward a direction of arrow 160 using a rope or the like linked with the cylinder shaped dummy measuring object FR1. Thus, it is possible to detect accurate provisional measured values easily without dipping all the electrodes into uniform measuring object at the place where the sensing part being installed.

On the other hand, there is a case that the cylinder shaped dummy measuring object FR1 is used to detect actual measured values. For instance, actual measured values between the electrode and the cylinder shaped dummy measuring object FR1 are measured by floating the cylinder shaped dummy measuring object FR1 on the measuring object 33 when the measuring object 33 has lower dielectric constant. The cylinder shaped dummy measuring object FR1 is made of the same materials and the same structure as the dummy measuring object GK1 so as to float on the measuring object 33. In this case, since the cylinder shaped dummy measuring object FR1 directly contact with the measuring object, surface of it is covered with resins or the like to avoid corrosion.

The level sensor and the method for measuring level in the present invention is characterized in that comprises an electrode assembly having a plurality of electrodes positioned substantially vertically from surface of a measuring object, and a part of the electrode assembly being dipped into the measuring object, a measuring circuit for measuring capacitance between two adjacent electrodes or a couple of electrodes apart from each other in more than one electrode consecutively, and a level detection circuit for detecting level of the measuring object in accordance with variations of the capacitance measured between each electrodes by the measuring circuit.

Also, the level sensor in the present invention is characterized in that comprises an electrode assembly having a plurality of electrodes positioned substantially vertically from surface of a measuring object, and a part of the electrode assembly being dipped into the measuring object, a measuring circuit for measuring capacitance between a first electrode group having at least one electrode in the electrode assembly and a second electrode group having at least one electrode which does not belong to the first electrode group consecutively, and a level detection circuit for detecting level of the measuring object in accordance with variations of the capacitance measured between each electrodes by the measuring circuit. So that, it is possible to conduct level measurement with reducing influences caused by shape of the tank etc. even when the measuring objects such as oil adheres on the electrodes regardless of the measuring object. Therefore, level measurement with accuracy and stability can be conducted. Therefore, level measurement with accuracy and stability can be conducted.

The level sensor in the present invention is characterized in that the sensor further comprises a storing circuit for storing capacitance detected by said measuring circuit, and a Judging circuit for Judging capacitance stored in the storing circuit having largest variation between adjacent capacitance as level of the measuring object. Therefore, level measurement can be conducted with accuracy.

Further, the level sensor in the present invention is characterized in that initial values are measured by detecting capacitance of the each electrode consecutively in prior to store said measuring object into a tank, and wherein level of the measuring object is detected by correcting the capacitance values detected between the each electrode with the initial values with said level detecting circuit. So that, it is possible to conduct level measurement with certain accuracy and stability by reducing the influences caused by the tank.

Still further, the level sensor in the present invention is characterized in that capacitance between two adjacent electrodes or a couple of electrodes apart from each other in more than one electrode are measured either from upper side or lower side of said electrode assembly by said level detection circuit, and an electrode positioned on surface of said measuring object is defined as a remarked electrode, and wherein level of said measuring object is detected in detail in accordance with capacitance values detected between the remarked electrode and the electrodes being under the measuring object with said level detecting circuit. So that, it is possible to calculate not only the buried distance, but also the surface distance represents a distance from lower end of the remarked electrode to the surface of the measuring object Therefore, accurate level measurement can be conducted.

The level sensor in the present invention is characterized in that level of said measuring object is detected by adding surface distance to the buried distance with said level detecting circuit, and the buried distance is calculated by detecting an uppermost electrode among the electrodes being completely under the measuring object and calculate a distance from lower end of said electrode assembly to the uppermost electrode, and the surface distance represents a distance from lower end of said remarked electrode to the surface of said measuring object. So that, it is possible to calculate not only the buried distance, but also the surface distance represents a distance from lower end of the remarked electrode to the surface of the measuring object. Therefore, accurate level measurement can be conducted.

Also, the level sensor in the present invention is characterized in that the capacitance "Ca" represents capacitance detected between the electrodes at least one of which being the nearest one from the surface of said measuring object and both of which being completely under the measuring object, and wherein the capacitance "Cb" equals to capacitance detected between the electrodes at least one of which being the nearest one from surface of the measuring object and both of which being exposed in the air. Also, capacitance "Ca" equals to an average value of capacitance detected between the electrodes each of which being completely under the measuring object and said capacitance "Cb" represents an average value of capacitance detected between the electrodes each of which being exposed in the air. So that, capacitance detected at the remarked electrode is corrected by the average value of capacitance detected between the nearest electrodes from the remarked electrode, or that of detected between either the electrodes both of which being completely under the measuring object or the electrodes both of which being exposed in the air. Therefore, it is possible to conduct level measurement with accuracy.

Further, the level sensor in the present invention is characterized in that the electrode assembly is made as a pattern on a flexible board formed in cylinder shape. So that, formation of the electrodes requires less work, it is not necessary to conduct adjustment of the electrodes for every measurement. It is therefore possible to measure level of the measuring object with stability and accuracy.

Still further, the level sensor in the present invention is characterized in that lower end of said cylinder shaped flexible board is opened and said measuring object is guided into the flexible board. So that, the measuring object exists both inside and outside of the flexible board. Therefore, difference of capacitance detected between a part where the measuring object exists and another part where measuring object does not exist becomes larger than when the measuring object surrounds outside of the electrode assembly 80. Therefore, it is possible to conduct level measurement with accuracy and stability.

The level sensor in the present invention is characterized in that the electrode assembly is attached to a tank which stores said measuring object. So that, the measuring object never contact with each of the electrodes directly. Therefore, it is possible to conduct accurate level measurement after a long period of use.

Also, the level sensor in the present invention Is characterized in that the warning signal output circuit outputs the warning signals as a result of detecting variety of capacitance exceed predetermined value detected between adjacent electrodes in both positive and negative directions when initial values is detected. And the warning signal output circuit outputs the warning signals when more than predetermined difference is detected between capacitance detected adjacent electrodes and average of initial values being detected between electrodes in initial state and stored. So that, prior notice can be obtained when the level sensor is not in a situation to conduct accurate level measurement. Therefore, it is possible to conduct level measurement with stability.

Further, the level sensor in the present invention is characterized in that surface of said measuring object is detected when variety of capacitance detected between adjacent electrodes is in either of positive or negative direction, and variety of capacitance in both positive and negative directions does not correspond to surface of said measuring object. So that, variety of the capacitance in both positive and negative directions caused by adhesion of oil on the electrodes is not detected as surface of the measuring object. Therefore, it is also possible to conduct level measurement with accuracy by carrying out the countermeasures.

As described in the above, it is possible for the level sensor and a method for level measurement in the present invention to conduct level sensor with accuracy and stability.

The Third Embodiment

Figure 22:
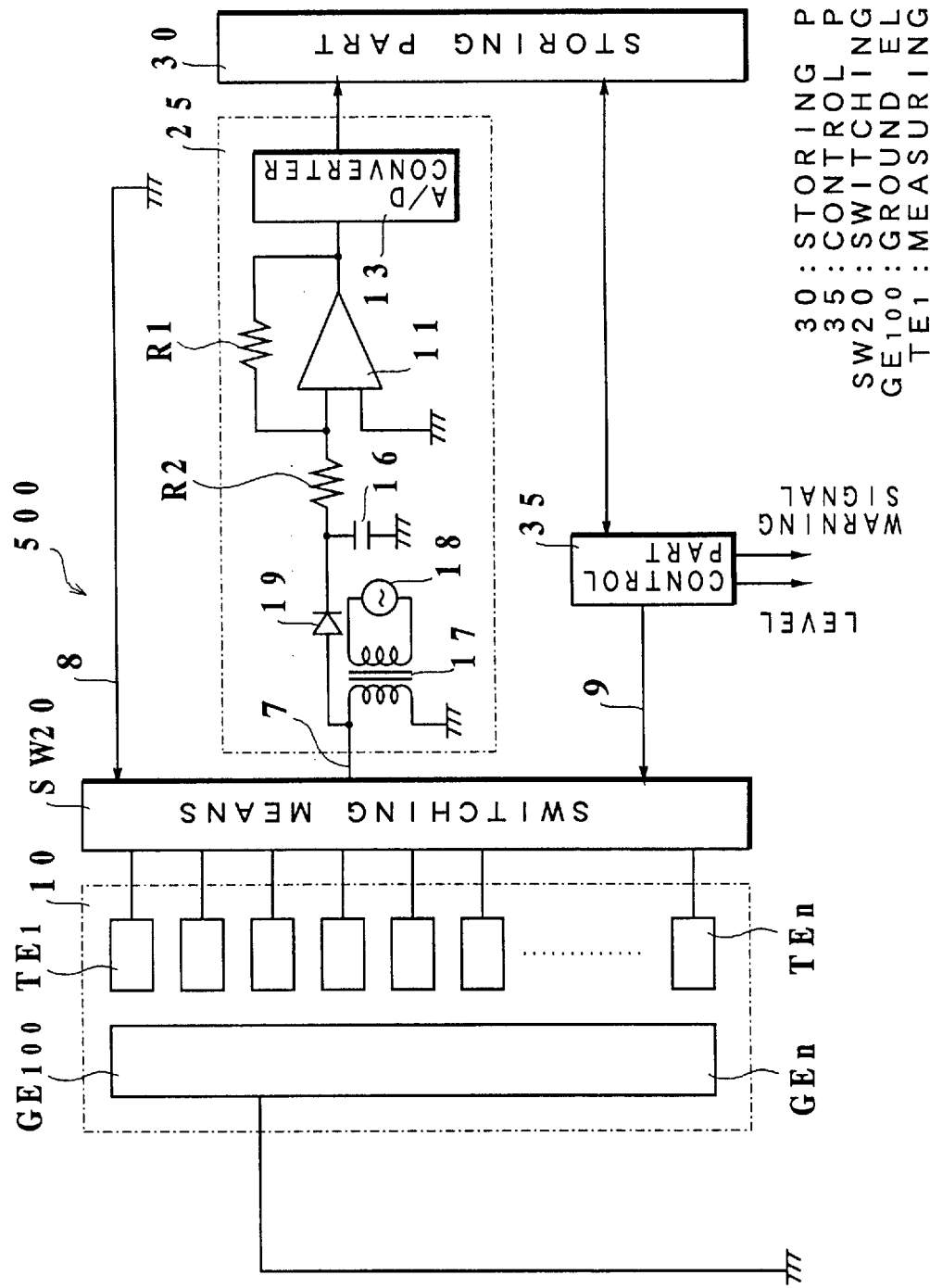
FIG. 22 is a block diagram of a level sensor of the third embodiment in the present invention.

The third embodiment of a level sensor in the present invention will be described as below with reference to figures. FIG. 22 shows a block diagram of the level sensor 500 in the present invention. The level sensor 500 comprises a sensing part 10 act as an electrode assembly as in the first and the second embodiment, switching means SW20, a receiver 25, a storing part 30 and a control part act as judging circuit and warning signal outputting part.

A total of n pieces electrodes such as an electrode TE1 to an electrode TEn are provided vertically in the sensing part 10. A ground electrode GE100 is positioned opposite to the measuring electrodes and substantially vertically from surface of a measuring object. In the third embodiment, each of the electrodes such as the electrode TE1 to the electrode TEn are connected to the switching means SW20, and the ground electrode GE100 is grounded as in the first embodiment.

Also, the switching means SW20 is connected to the control part 35 via a control signal line 9. Further, the receiver 25 comprises inductor 17, an oscillator 18, a diode 19, a capacitor 16, an operational amplifier 11, a plurality of resistor R1, resistor R2 and an analog/digital converter 13. In the third embodiment, the control signal line 9 is drawn in single line for reason of convenience, actual control signal line consist of a plurality of lines.

Figure 23A:
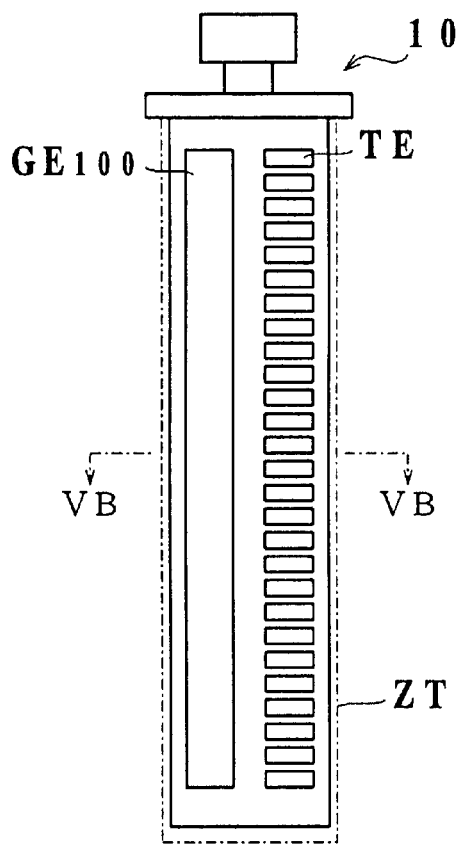
FIG. 23A is a view illustrating exterior of the electrode of the electrodes used in the third embodiment of the present invention.
Figure 24A:
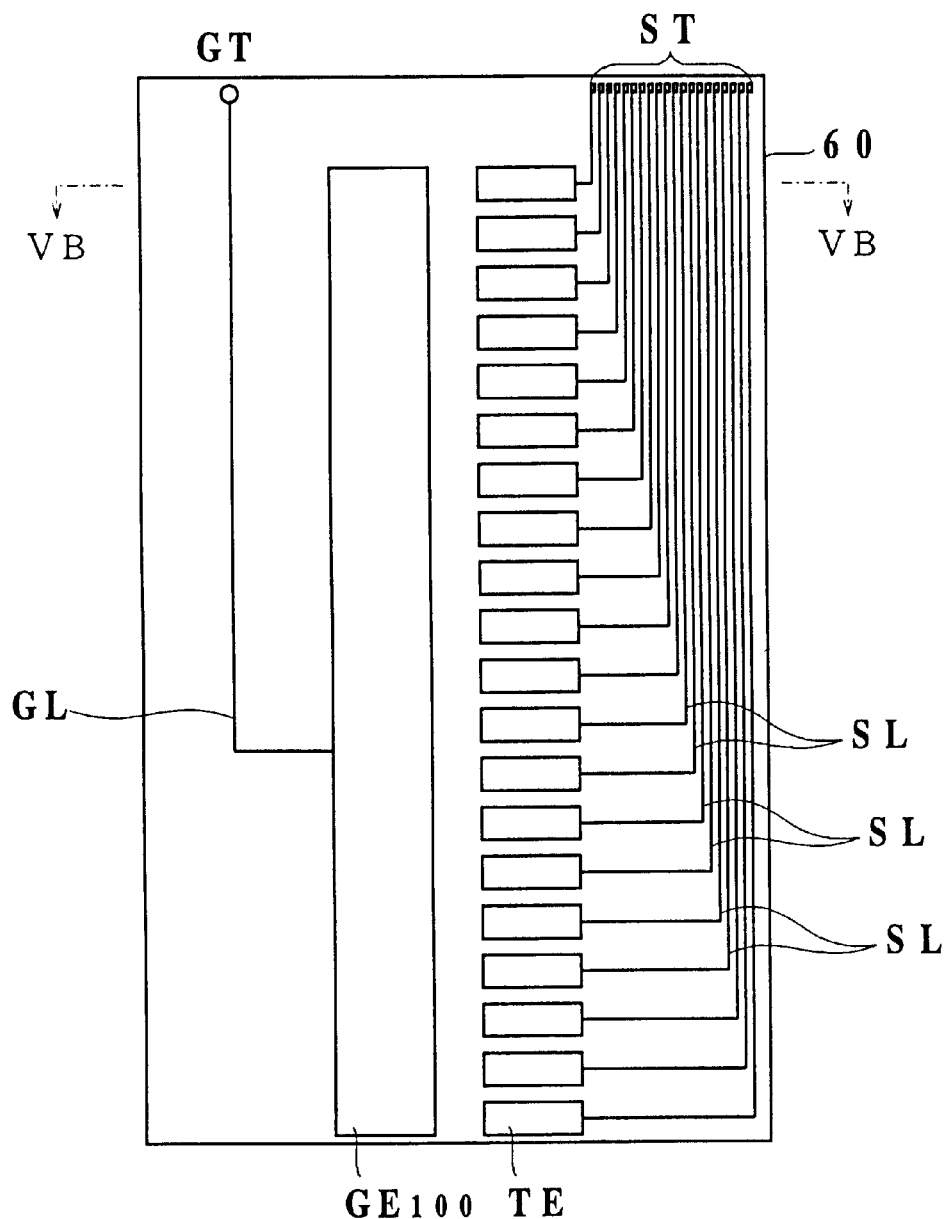
FIG. 24A and FIG. 24B are detailed views of the electrode and a flexible board for the sensing part shown in FIG. 23A, FIG. 23B and FIG. 23C.
Figure 24B:
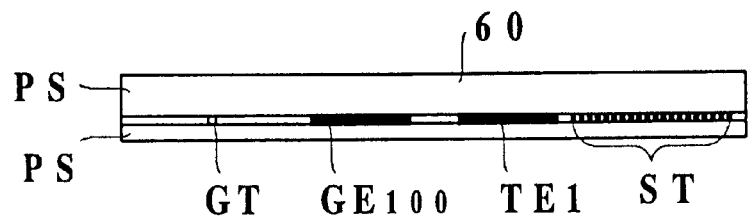

FIG. 23A is a view illustrating exterior of the sensing part 10 in the third embodiment. The sensing part 10 is formed so as to position the measuring electrodes such as the electrode TE1, the electrode TE2, the electrode TE3 so on to the electrode TEn and the ground electrode oppositely, and the ground electrode is provided consecutively. As in the first and the second embodiment, both of the measuring electrodes and the ground electrode are arranged as patterns on the flexible board 60. Also, the sensing part 10 is formed in a cylinder shape and the sensing part 10 is covered with an insulation tube ZT. Both of FIG. 24A and FIG. 24B show detailed expansion views of the flexible board 60. FIG. 24A shows a relationship among both of the electrodes, signal lines and ground lines patterned on the flexible board 60. The electrode TE1, the electrode TE2 the electrode TE3, the electrode TEn are arranged with predetermined space as patterns on the flexible board 60. Also, the signal lines SL are wired from the electrode TE1, the electrode TE2, the electrode TE3 and the electrode TEn respectively, and the ground line GL is wired from the ground electrode G100.

FIG. 24B shows a plane view of a portion of the flexible board 60 taken on the line VB—VB of FIG. 24A. In the third embodiment, the flexible board 60 consists two polyimide insulation layers PS having the measuring electrodes, the ground electrode, the signal lines and the ground line which is different from the first and the second embodiment. Terminals ST are provided to each of the signal lines SL, and the terminals ST are connected to the switching means SW20.

Figure 23B:
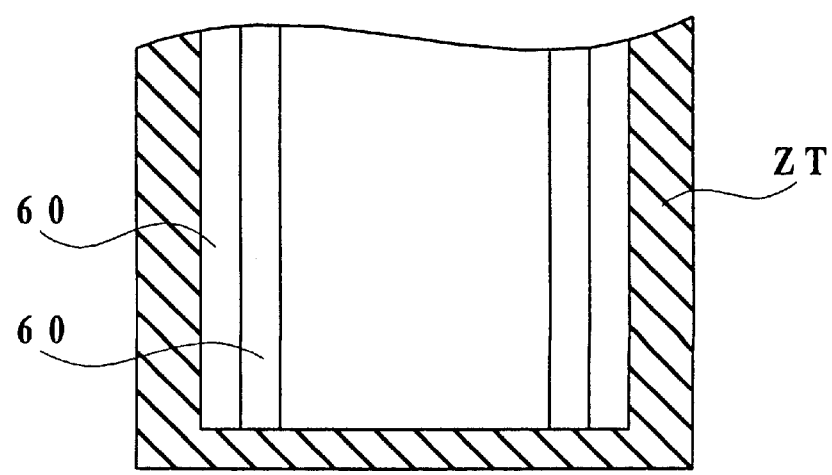
FIG. 23B shows a transverse cross view of a lower part of the electrodes used in the third embodiment of the present invention.
Figure 23C:
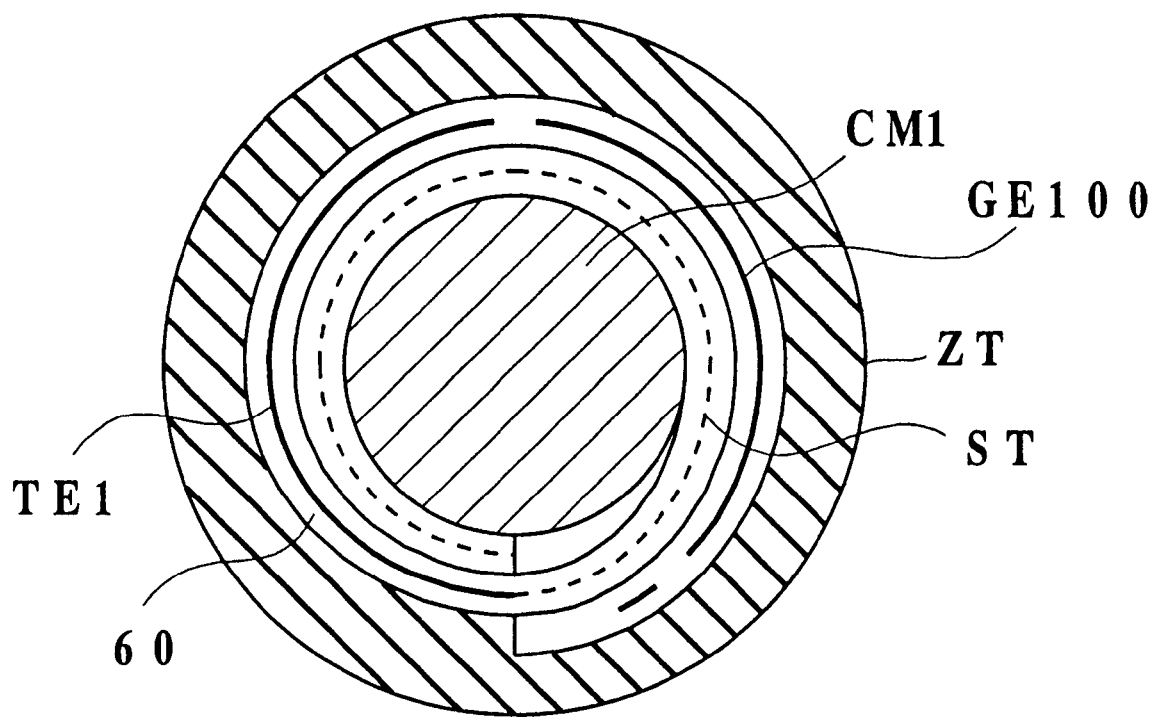
FIG. 23C shows a sectional view from the top of electrodes used in the third embodiment of the present invention.

FIG. 23B shows a transverse cross view of a lower part of the sensing part 10 shown in FIG. 23A. Also, FIG. 23C shows a sectional view from top of the sensing part 10. As in the first embodiment, a cylinder shaped core CM1 for electrodes is in center of the sensing part 10, and the flexible board 60 is formed so as to surrounding the core. Also, external surface of the flexible board 60 is covered with the insulation tube ZT.

In this case, the flexible board 60 is formed in cylinder shaped so as to expose each of the electrode TE1, the electrode TE2, the electrode TE3 to the electrode TEn and the ground electrode GE100. FIG. 23B shows a transverse cross view of a lower part of the sensing part. As it is clear from the figure, lowermost part of the sensing part 10 is closed by the insulation tube ZT.

An operation of the level sensor 500 will be described as follows. In the third embodiment, it is assumed that the sensing part 10 of the level sensor 500 shown is installed in the tank 40. At first, initial values are detected in prior to store the measuring object into the tank 40. Detections of initial values are conducted in the same manners as in the first embodiment. In other words, capacitance detection signals are outputted from the control part 35 to the switching means SW20 via the control signal line 9. A plurality of switches (FIG. 25) installed in the switching means SW20 are switched in accordance with the capacitance detection signals. On receipt of the capacitance detection signals from the control part 35, the switching means SW20 switches the switches consecutively under the timing shown in FIG. 26 for capable of detecting capacitance between the measuring electrode and the ground electrode.

Figure 25:
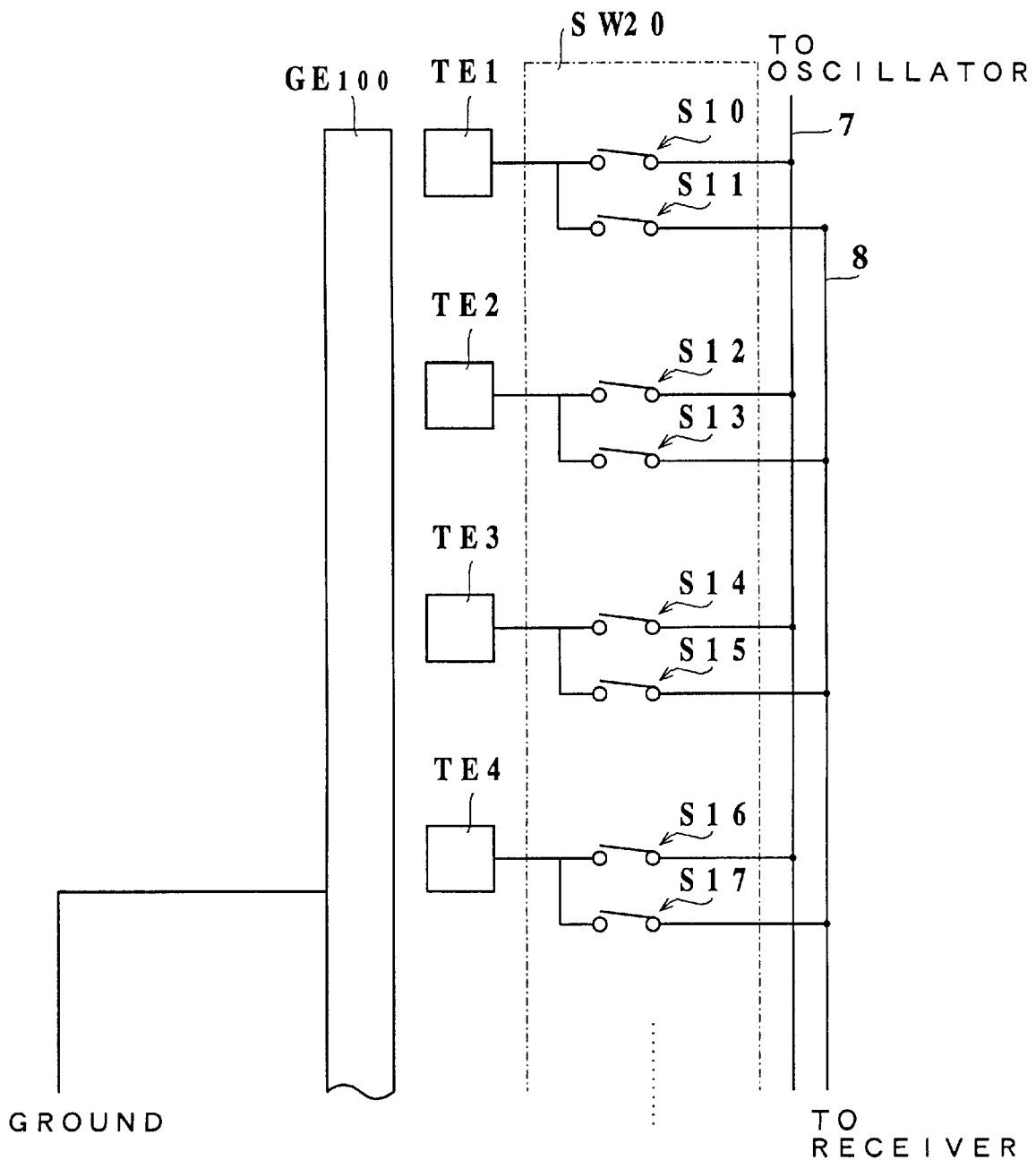
FIG. 25 is a view illustrating operation of switches connected to the electrodes.

Switching operation of the switches for detecting initial values will be described as below with reference to FIG. 25 and FIG. 26. FIG. 25 shows a part of the sensing part 10 (a total of four electrodes such as the electrode TE1 to TE4), a part of the ground electrode GE100 and a part of the switching means SW20. A plurality of switches such as switch S10 to switch S17 and a part of the ground electrode GE100 are shown as a part of the sensing part 10.

In the switching means SW20, a pair of switches are provided to each of the measuring electrodes. A part of the switches (switch S10, S12, S14 and S16 and so on) installed in the switching means SW20 are connected to a measurement signal line 7, and outstanding switches (switch S1, S13, S15 and S17 and so on) in the switching means Sw20 are grounded. Also, the ground electrode GE100 is grounded.

Next, operation for detecting initial values will be described. It is assumed that initial value (capacitance) between the measuring electrode TE1 and the ground electrode GE100 is detected. The switching means SW20 controls so as to close the switch S10 connected to the measuring electrode TE1 in accordance with capacitance detection signals from the control part 35 via the control signal line 9. Also, the switching means SW20 controls the switches as follows at almost the same time in accordance with the capacitance detection signals from the control part 35. The switch S13, the switch S15 and the switch S17 are closed and the measuring electrode TE2, TE3 and TE4 so on are grounded.

Figure 26:
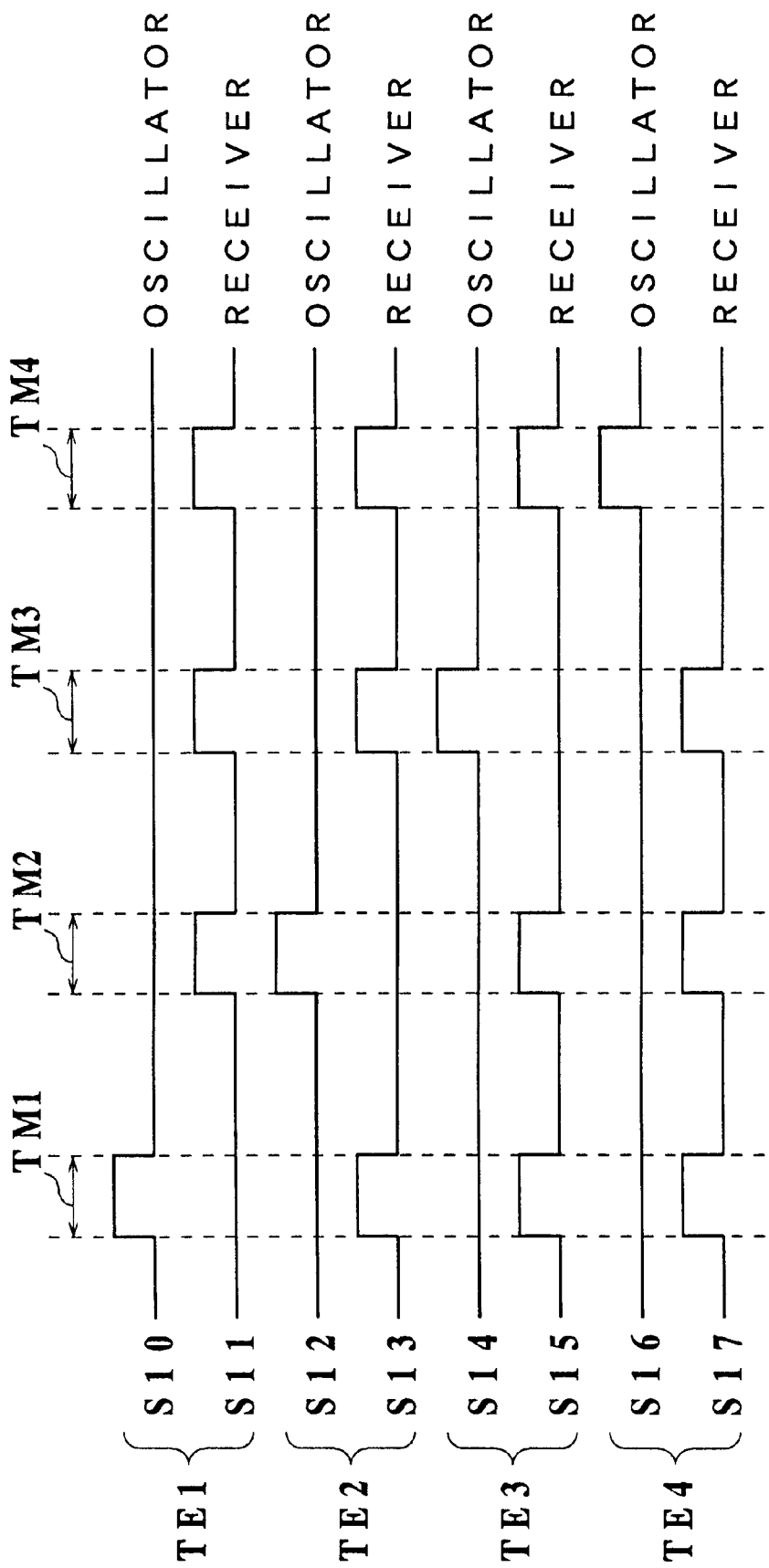
FIG. 26 is a timing chart showing switching time for each of switches shown In FIG. 25.

As it is clear from the FIG. 26, the measuring electrode TE2 to the electrode TE4 all of which are not used for detection are grounded and only the measuring electrode TE1 is connected to the receiver 25 when initial value between the measuring electrode TE1 and the ground electrode GE100 is detected (at a timing TM1 in FIG. 26).

Capacitance between the measuring electrode TE1 and the ground electrode GE100 is detected with the receiver 25 consisting of the diode 19 and the capacitor 16 by detecting a Voltage (analog signal) corresponding to a current flow passing through the measuring electrode TE1 and the ground electrode GE100. Upon the conversion, the digital signal is outputted to the storing part 30 and stored therein.

In the storing part 30, the measured capacitance and combination of the two electrodes are stored correspondently. FIG. 27 shows a view illustrating a storing condition of capacitance in the storing part 30.

On completing storage of initial value and combination P1, storing completion signals are outputted to the control part 35 by the storing part 30. Then the control part 35 which receives the storing completion signals outputs another capacitance detection signals for detecting capacitance (initial value) to the switching means 20. The switching means SW20 controls the switches as described in the above to detect the capacitance between the measuring electrode TE2 and the ground electrode GE100 in accordance with the capacitance detection signals at a timing TM2 (see FIG. 7). Thus, initial value between the measuring electrode TE2 and the ground electrode GE100 is detected and it is stored into the storing part 30 together with combination P2.

Such detection of initial value is conducted consecutively to a combination of the measuring electrode TEn and the ground electrode GE100, and initial values thus detected are stored in the storing part together with each of combinations (FIG. 27). FIG. 9A shows a graph illustrating the initial values thus detected.

Also, the control part 35 compares each of the initial values stored adjacently in the storing part 30. When the control part finds more than a certain (predetermined) difference between adjacent initial values (for instance more than 10% of the adjacent initial value), the control part 35 outputs warning signals as in the first embodiment.

The warning signs are displayed (and or outputted) when accurate detection of capacitance can not be conducted by reason of adherence of oil on the insulation tube ZT and corrosion of electrodes themselves which cause sharp increase of capacitance. Owing to such display and/or output of warning signs, an operator of the level sensor can recognizes these irregularities in prior to conduct level measurement. So that, it is possible to conduct level measurement with stability by carrying out countermeasures such as exchange of the electrodes and/or remove the oil from the insulation tube ZT.

In the third embodiment, although the control part 35 compares the initial values for each electrode combination stored adjacently in the storing part 30, and outputs the warning signals when the control part finds more than predetermined difference between the adjacent initial values. Any other method can be applied to the above embodiment, once the method can detect irregularity of the adjacent electrodes. For instance, it is possible to apply a method described below. The control part calculates an average of the initial values stored in the storing part 30, then the control part 35 compares the average of initial value with initial values of each electrode combination. The control part outputs the warning signals when the control part finds more than predetermined difference between the average of initial value and the initial values of each electrode combination. In this case, it is also possible to conduct level measurement with stability by doing the countermeasures due to previous notice of irregularity on the electrodes.

Upon comparing each of the initial values stored adjacently, correction values for the initial values shown in FIG. 27 are calculated. The correction values are figured out by utilizing the same way as in the first embodiment. The reason for calculating these correction values is exactly the same as the first embodiment.

Level measurement of the object is conducted after calculation of the correction values. An operation of level sensor 500 for measuring level of measuring object will be described. In the third embodiment, level measurement is conducted when the measuring object 33 is stored in the tank 40 by utilizing the level sensor 500.

At this time, capacitance between two electrodes provide oppositely is detected as detection of initial values, and level of the measuring object is measured in accordance with the detected capacitance.

The control part 35 outputs the capacitance detection signals, and the switching means SW20 which receives the capacitance detection signals carries out the switching operation as described in the above. In other words, the control part 35 controls the switching means SW20 to switch the electrodes both of which are used for the detection of capacitance (see FIG. 25, FIG. 26). Actual values (capacitance) detected by the switching operation is stored into the storing part 30 together with combination of electrode (as combination Q) (see FIG. 27). At this time, the control part 35 controls to store the actual values away from the initial values when it recognizes that detection of all the initial value is completed.

Upon completion of storage in the storing part 30, the control part 35 outputs another capacitance detection signals for detecting capacitance of next electrode combination to the switching means SW20. The switching means SW20 controls the switches as described in the above to detect the capacitance. That is, the switching means SW20 conduct the same switching operation in all the electrode combinations of electrodes, and then the capacitance of all the electrode combinations (combination Q1 and so on) are stored in the storing part 30 (FIG. 27).

In the third embodiment the control part 35 further compares each of the actual values detected between the electrodes provided oppositely stored in the storing part 30 as in the first embodiment. The control part 35 outputs the warning signals when the control part detects variety of the capacitance stored closely in the storing part, in both positive and negative directions as well as finding more than a certain (predetermined) difference among the capacitance. In accordance with the warning signals, either or both of a display and a warning sound alarm displays and outputs the warning signs which indicates that detection can not be conducted.

It is possible to output the warning sign when the control part calculates an average of the actual values stored in the storing part 30, and then detects variety of the capacitance in both positive and negative directions with finding more than the predetermined difference among the capacitance as in the first embodiment. By carrying out above operation, it is also possible to conduct level measurement with stability because of previous notice of irregularity on the electrodes.

Next, the actual values are corrected in accordance with the correction values (see FIG. 27). The actual values detected as above is corrected by utilizing the correction values (calculated) which correspond to each of the actual values. The correction described in the above is carried out for all the actual values, and corrected actual values thus obtained are stored in the storing part 30.

Figure 28:
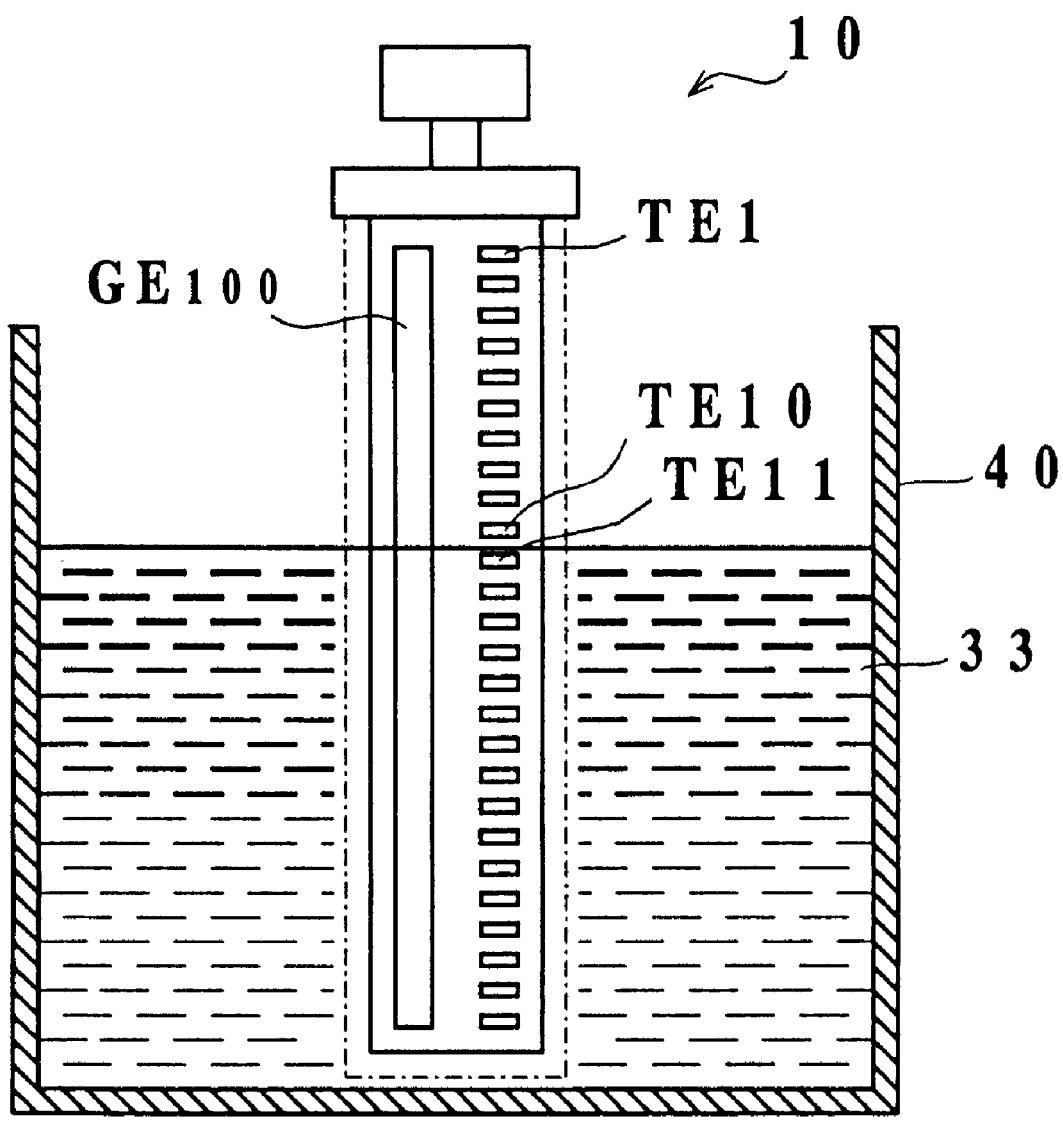
FIG. 28 is a side view illustrating measurement of liquid level for the liquid stored in the tank using the level sensor shown in FIG. 22.

FIG. 9B is a graph illustrating variety of the corrected actual values. In the third embodiment, level of the measuring object 33 stored in the tank 40 is measured as a line LS2 stands at the most sharp increase of the corrected actual values stored in the storing part 30. In other words, level of the measuring object is measured as between an measuring electrode TE10 to the ground electrode GE100 and an electrode TE11 to the ground electrode GE100 in FIG. 28 and it corresponds to between the electrode combination P10 and the electrode combination P11 in FIG. 27. Thus, the part varies most sharply in the graph is judged as level of the measuring object. So that, it is possible to conduct stable level measurement. Level of the measuring object 33 thus measured is outputted to the outside of the level sensor 500 for controlling of a pump for liquid supply (not shown) or the like.

Figure 29A:
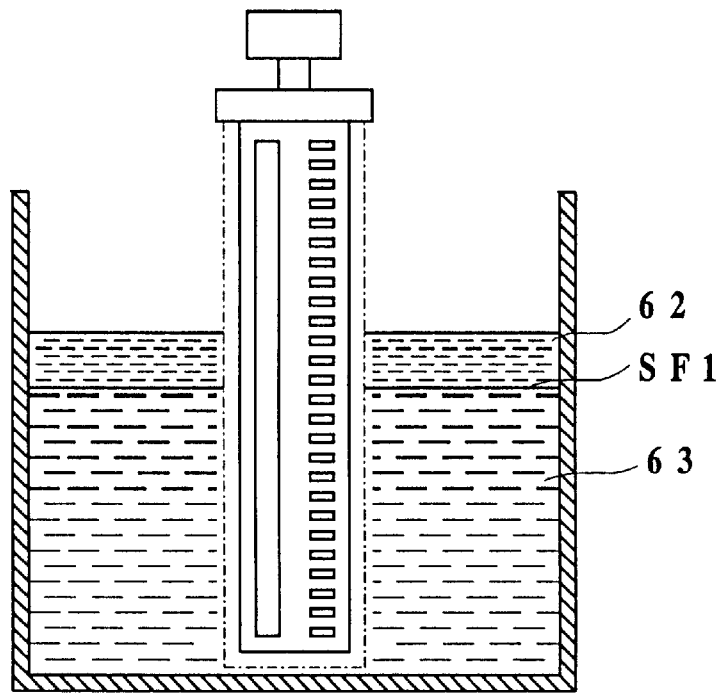
FIG. 29A shows a sectional view when measuring objects stored in the tank are oil and water.
Figure 29B:
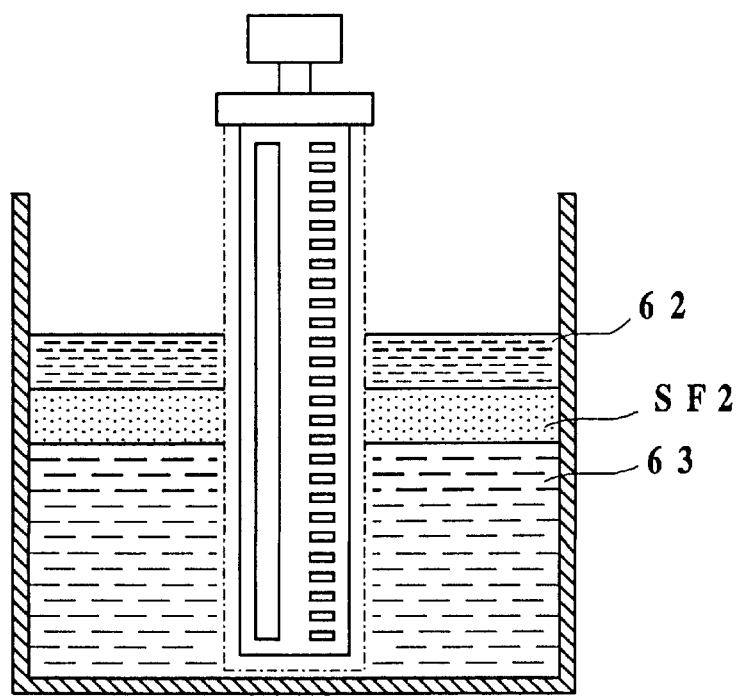
FIG. 29B is a sectional view when emulsion is formed between the measuring objects.

As described in the above, level of the measuring object 33 is measured by detecting capacitance between electrodes provided oppositely in the second embodiment. So that, it is possible to measure interface SF1 even when the measuring objects are oil 62 and water 63 as shown in FIG. 29A. Here, the interface SF1 between oil 62 and water 63 is measured as a line LS3 stands at the second sharp increase of the capacitance shown in FIG. 9C. It is therefore possible to remove the oil separately from the water by a pump or the like in accordance with the interface SF1 thus measured, when it is required to remove the oil.

Further to the above, even when the interface SF2 of the oil 62 and the water 63 is under emulsion, it is possible to measure the interface with stability by detecting width for variation of detected capacitance. Here, the interface of the liquid under emulsion is illustrated as width WD1 in FIG. 9D. Therefore, it is possible to measure the interface with stability even when vicinity of the interface is under emulsion.

Figures 30A, 30B:
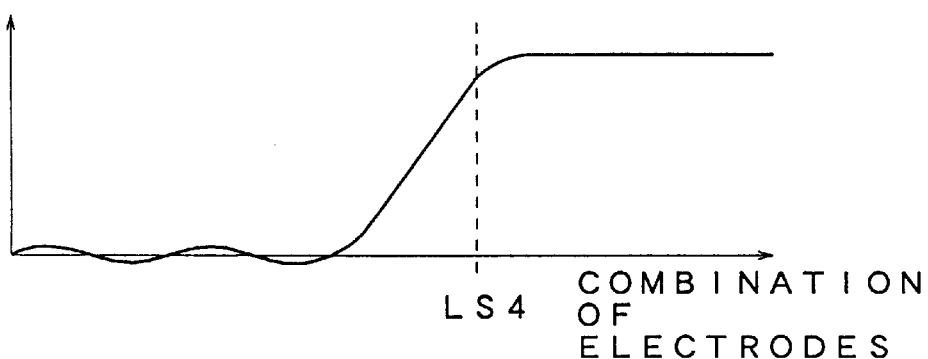
FIG. 30A is a view illustrating a storing condition of capacitance in the storing part in the third embodiment.
FIG. 30B is a graph showing a variation of capacitance stored in the storing part.

In the third embodiment, an average of the initial values (averaged initial value) is calculated and then the correction values correspond to each electrode combination are figured out by subtracting the initial value of each electrode combination from the averaged initial value. Further, the corrected actual values are calculated by correcting actual values of each electrode combination in accordance with each of the correction values. Any other method can be applied to the third embodiment, as long as the method can conduct accurate level measurement. For instance, it is possible to take a following method described in below. At first, the initial values are detected and then the actual values are detected. In this case, any correction of the actual values is conducted. Instead of that, varied values are calculated by subtracting the initial values from the actual values. Level measurement can be conducted in accordance the varied values. FIG. 30A shows a storing condition of values (capacitance) in the storing part 30 in this case, and FIG. 30B is a graph showing a variation of the varied values. In the graph, level of the liquid 33 is measured as a line LS4 stands at the most sharp increase of the varied values.

As described in the above, level measurement of the measuring objects is conducted in accordance with the capacitance detected between each measuring electrode and the ground electrode by the level sensor 500 in the third embodiment. Therefore, it is possible to conduct level measurement with stability by reducing influences such as shape of the tank 40 and the tank itself between each of the electrodes. In other words, in the present invention, level measurement can be conducted with accuracy without receiving influence of different dielectric constant caused by temperature difference between upper part and lower part of the liquid stored in the tank 40.

The Fourth Embodiment

Next, the fourth embodiment of the present invention will be described. In the third embodiment described in the above, the distance to the electrode which is covered with surface of the measuring object is measured as level of the liquid (see FIG. 9B, FIG. 28). However, in the fourth embodiment, level of measuring object itself is measured accurately, instead of the distance to the electrode covered with the surface.

Figure 31A:
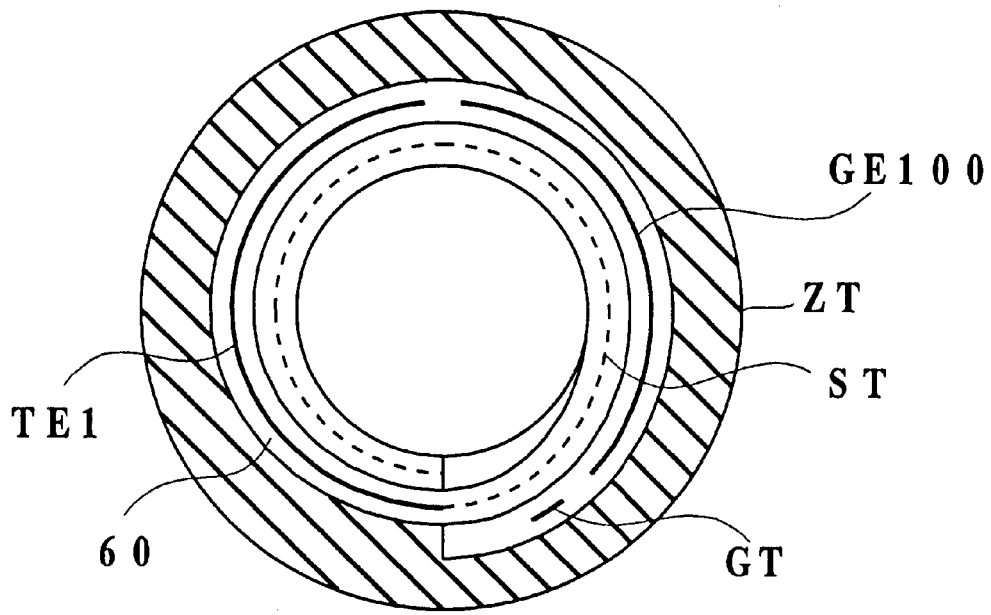
FIG. 31A shows a sectional view from the top of electrodes used in the third embodiment of the present invention.
Figure 31B:
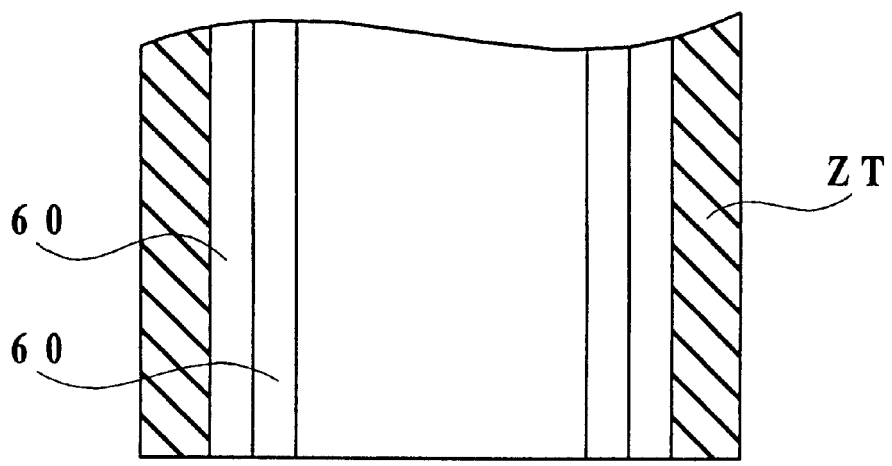
FIG. 31B shows a transverse cross view of a lower part of the electrodes used in the third embodiment of the present invention.

FIG. 31A shows a sectional view from the top of an electrode assembly 90 used in the fourth embodiment, and FIG. 31B shows a transverse cross view of a lower part of the electrode assembly 90. Both of FIG. 31A and FIG. 31B correspond to FIG. 23B and FIG. 23C in the third embodiment. Lower end of the electrode assembly 90 is open and it does not have the core in the center.

Figure 31C:
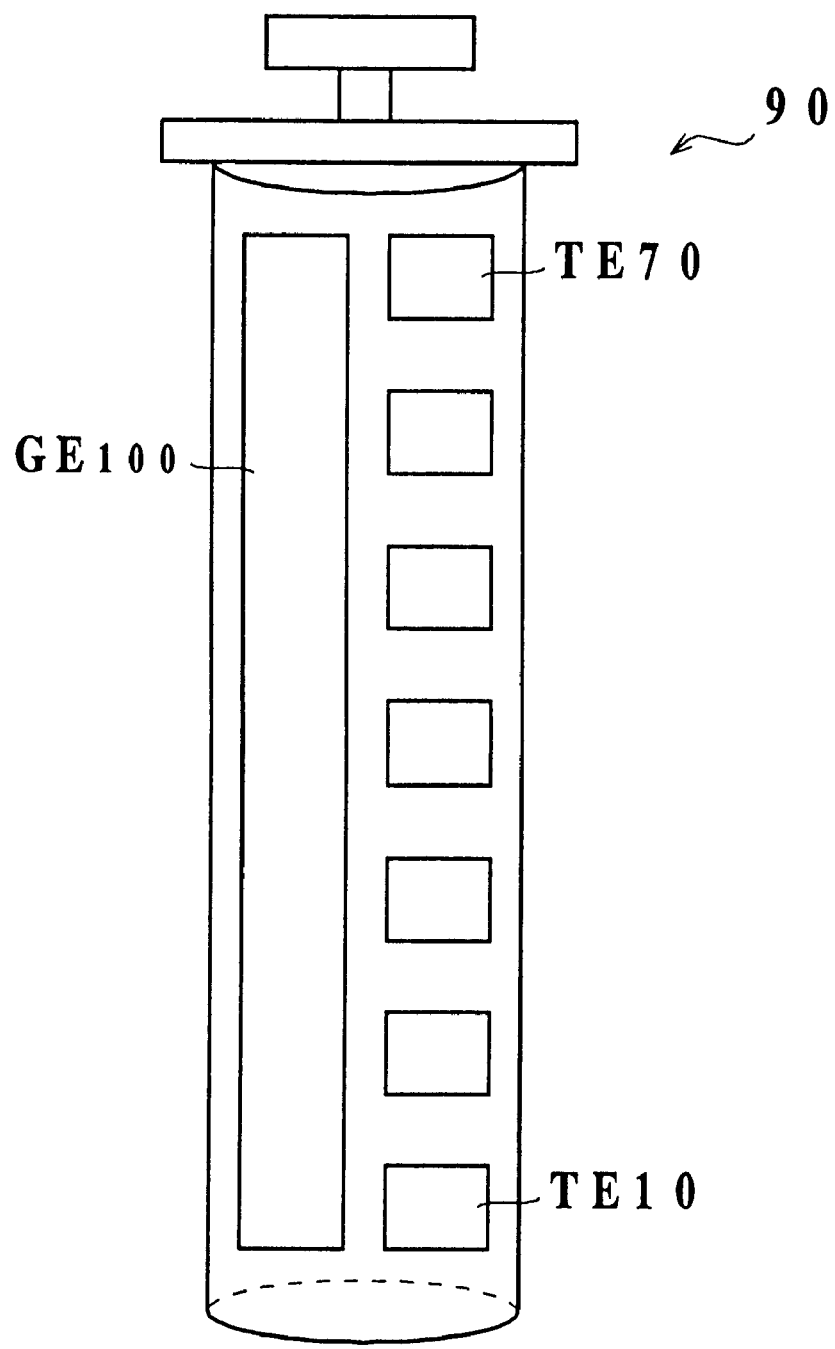
FIG. 31C is a view illustrating exterior of the electrode of the electrodes used in the third embodiment of the present invention.

In this embodiment, a total of 7 pieces of electrodes such as the electrode TE10 to the electrode TE70 are provided on the electrode assembly 90 for reason of convenience as shown in FIG. 31C, the electrode assembly 90 which would be used in actual form has more electrodes. The electrode assembly 90 can be formed by a midair pipe made of insulation material which has a plurality of electrode on inner or outside wall.

Figure 32:
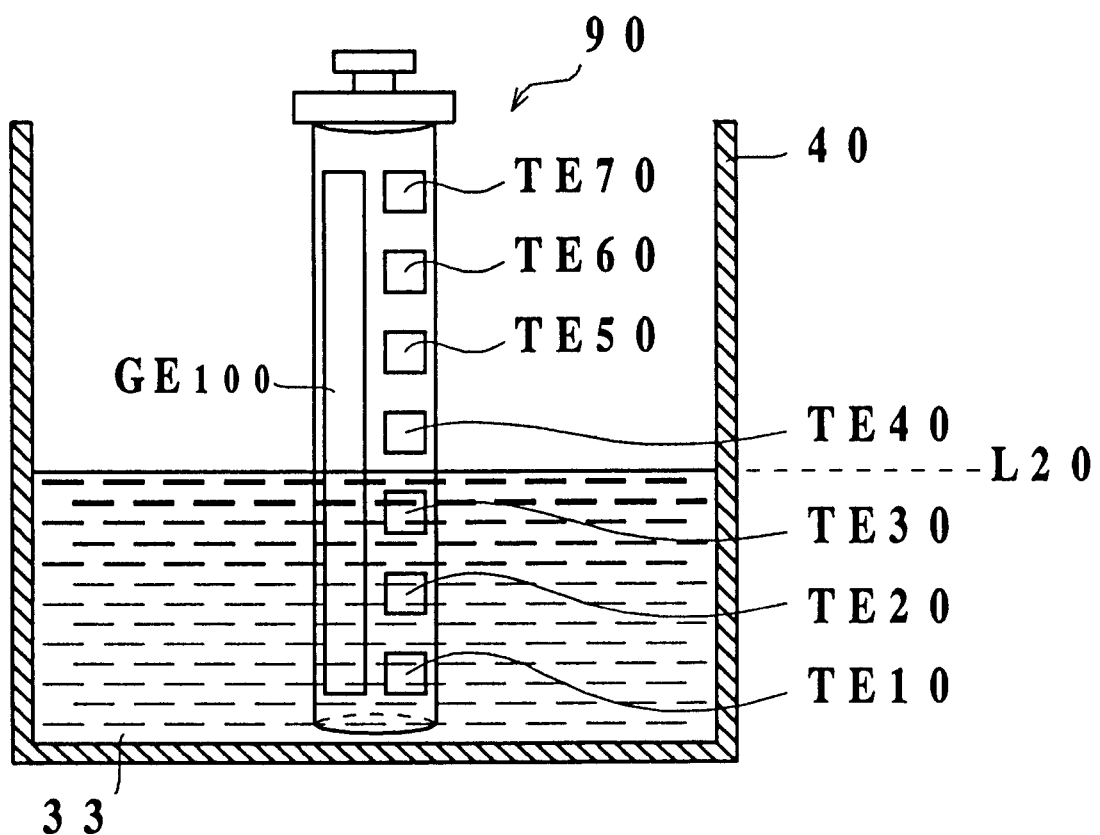
FIG. 32 is a side view showing measurement for level of measuring object stored in the tank under level L20 by utilizing the electrodes shown in FIG. 31A, FIG. 31B and FIG. 31C.

Level measurement of the measuring object 33 stored under level L20 in the tank 40 is conducted by using the electrode assembly 90 (FIG. 32).

In the fourth embodiment, the lower end of the electrode assembly 90 formed by a flexible board 60 is also open, so that, the measuring object 33 is guided into the inside of the flexible board 60.

That is, difference of capacitance detected between a part where the measuring object exists and another part where measuring object does not exist becomes larger than when the measuring object surrounds outside of the electrode assembly 90. Thus, it is possible to conduct level measurement with accuracy and stability. In this embodiment, it is assumed that the detection of initial values as described in the above embodiments and other related operations have been completed.

A level measurement described below can also be conducted by utilizing the electrodes shown in FIG. 23A which has closed lower end. Similarly, the level measurement described in the third embodiment can also be conducted by utilizing the electrode assembly 90 shown in FIG. 31A to FIG. 31C.

Switching operation of the switching means SW20 in this embodiment is conducted in accordance with capacitance detection signals outputted from the control part 35 as described in the third embodiment. That is, for instance, capacitance between a measuring electrode and a ground electrode is detected consecutively from lower side of the electrode assembly 90 (between the measuring electrode TE10 and the ground electrode GE100) to upper side of that, and the capacitance of all the combinations are stored.

The first electrode combination which has detected capacitance exceeds initial value of the combination is recognized as remarked combination electrodes by the control part 35 when the control part 35 searches detected capacitance of all the electrode combinations from the upper end of the electrode assembly 90 in order. Further, both the capacitance between the measuring electrode and the ground electrode being completely under the measuring object 33 and the capacitance between the measuring electrode and the ground electrode being exposed in the air are detected by the control part 35. And then the detected capacitance are stored.

Figure 33:
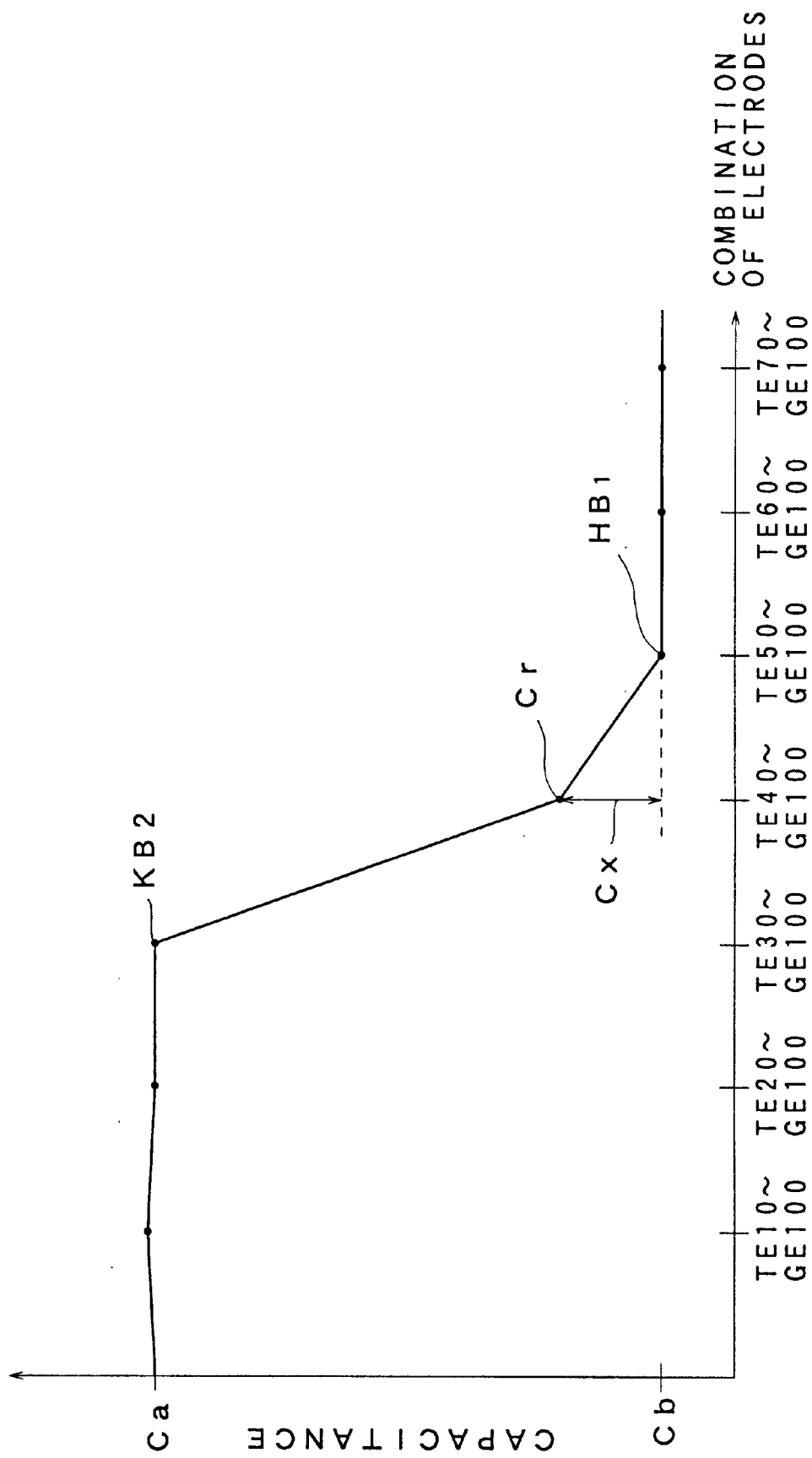
FIG. 33 shows a graph showing a variation of detected capacitance between each of the electrodes when the measuring object is stored in the tank under level L20.

Now referring to FIG. 33 which shows a graph illustrating a variation of capacitance detected between the measuring electrode and the ground electrode when the measuring object 33 is stored in the tank 40 under level L20. As described in the above, the remarked combination electrodes are the uppermost electrode combination in the electrode assembly 90 having higher value than the initial value of the combination.

As it is clear from FIG. 33, capacitance detected between the electrodes (the measuring electrode TE30 to the ground electrode GE100) both of which being completely under the measuring object is relatively high. On the other hand, capacitance detected between the electrodes (the measuring electrode TE50 to the ground electrode GE100, the measuring electrode TE60 to the ground electrode GE100 and so on) both of which being exposed in the air is relatively low.

In this embodiment, the uppermost electrode combination in the electrode assembly having higher value than the initial value of the combination is the combination of the measuring electrode TE40 to the ground electrode GE100. As a result, the combination of the measuring electrode TE40 and the ground electrode GE100 is correspond to the remarked combination electrodes.

A distance between the lower end of the electrode assembly 90 to the upper end of the measuring electrode positioned right under the remarked combination electrodes is obtained as a buried distance by the control part 35.

Upon measuring the buried distance, a distance (hereinafter referred to as surface distance) from the upper end of the measuring electrode positioned right under the remarked combination electrodes (the combination of the measuring electrode TE40 to the ground electrode GE100). Thereafter, level of the measuring object 33 itself is measured accurately by adding the surface distance thus calculated to the buried distance which has already been figured.

Figures 34A, 34B:
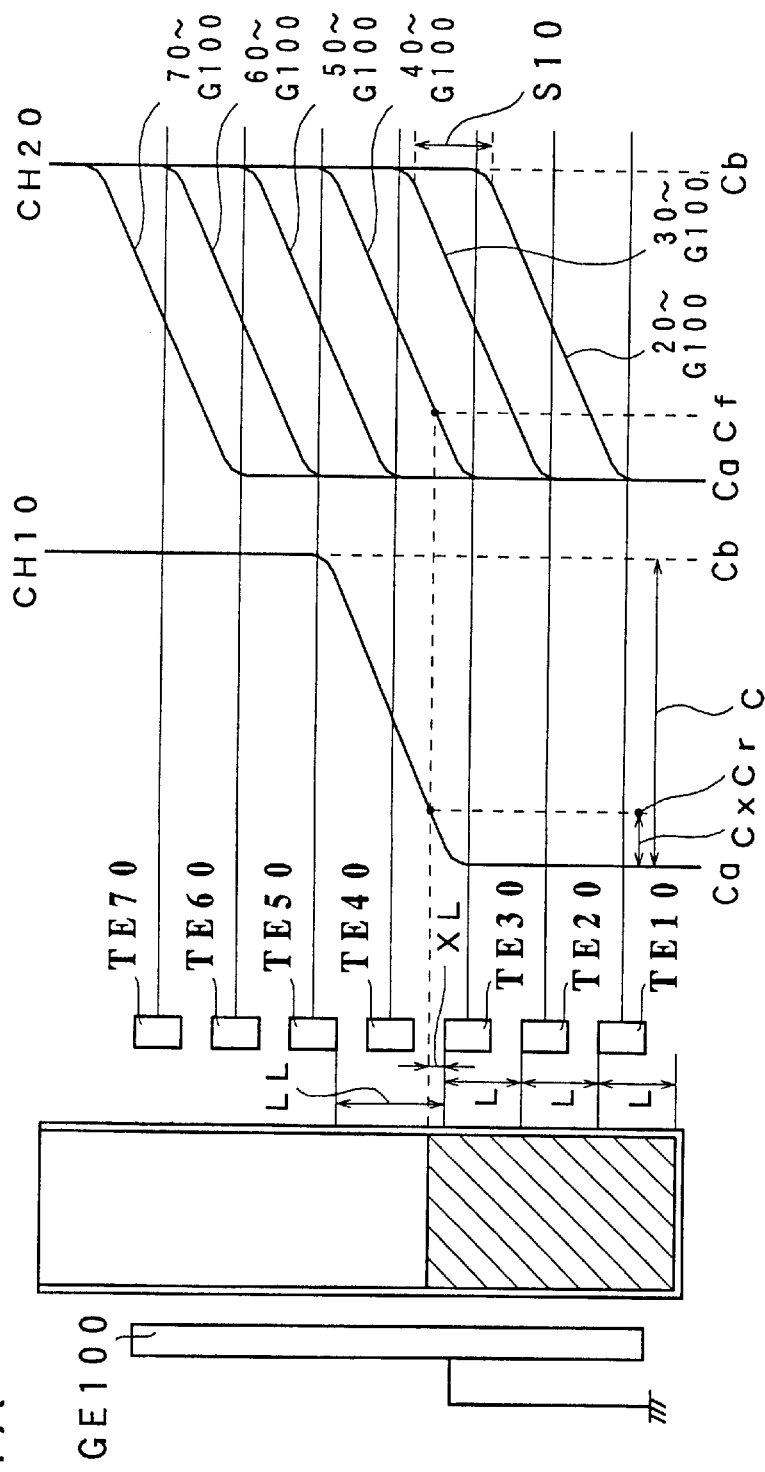
FIG. 34A show a view illustrating a relationship between the measuring object 33 stored in the tank 40 and the electrodes.
FIG. 34B shows a graph illustrating capacitance measured between each of the electrodes, particularly the capacitance measured between the electrodes provided adjacently.

Calculation for the surface distance is conducted as in the same manners of the third embodiment. Referring to FIG. 34A which shows a view illustrating a relationship between the electrode combination and the measuring object, and a graph illustrating capacitance detected between each of the electrode combinations when the measuring object is stored in the tank 40 under level L20.

Also, at left hand side of FIG. 34A, the tank 40 which stores the measuring object 33 under level L20 is illustrated. Further, a plurality of the measuring electrode TE10 to the electrode TE70 are shown in right hand side of the tank 40 as well as the ground electrode GE100 provided in left hand side of the tank 40.

Here, a graph CH10 illustrated at right hand side of the measuring electrodes shows a variation of capacitance detected between the measuring electrode TE40 and the ground electrode GE100 when the measuring object 33 stored in the tank 40 is an object having high dielectric constant (such as water etc.). A graph CH20 illustrated at right hand side of the graph CH10 shows a variation of capacitance detected between the measuring electrodes from TE20 to TE70 and the ground electrode GE100.

In the graph CH20, capacitance detected between the measuring electrode TE20 to the ground electrode GE100 is illustrated as 20 to G100, 30 to G100 shows that of detected between the measuring electrode TE30 to the ground electrode GE100, 40 to G100 shows that of detected between the measuring electrode TE50 to the ground electrode GE100, 50 to G100 shows that of detected between the measuring electrode TE50 to the ground electrode GE100, also 60 to G100 shows that of detected between the measuring electrode TE60 to the ground electrode GE100 and 70 to G100 shows that of detected between the measuring electrode TE70 to the ground electrode GE100 respectively.

In FIG. 34A, capacitance detected between the electrode combination which being completely under the measuring object 33 is shown as "Ca", and capacitance detected between the electrode combination which being exposed in the air is shown as "Cb". Further, "Cr" shows actual capacitance detected between the remarked combination electrodes (the measuring electrode TE40 and the ground electrode GE100), and "LL" represents a length from the upper end of the measuring electrode positioned right under the remarked combination electrodes to the lower end of the measuring electrode positioned right above the remarked combination electrodes.

FIG. 34B shows a storing condition of capacitance measured between each of electrode combinations when the measuring object 33 is stored in the tank 40 under level L20. The control part 35 searches capacitance which is not in capacitance "Cb" sequentially from the capacitance detected among the electrode combinations located upper side of the electrode assembly 90. By that search, it is judged that all the capacitance detected between the measuring electrode TE60 and the ground electrode GE100, and the measuring electrode TE50 and the ground electrode GE100 are in capacitance "Cb" by the control part 35.

Next, the surface distance is calculated in accordance with capacitance ("Cr") detected between the uppermost electrode combination (the measuring electrode TE40 to the ground electrode GE100) which exceeds initial value ("Cb") of the combination. It is understood that the combination of the measuring electrode TE20 to the ground electrode GE100) is completely under the measuring object 33, since capacitance detected between electrode combination of the measuring electrode TE10 to the ground electrode GE100 until electrode combination of the measuring electrode TE30 to the ground electrode GE100 are in capacitance "Ca" or capacitance "Cf" (see FIG. 34A).

The surface distance is calculated in accordance with the capacitance which is in capacitance "Cr" detected between electrode combination of the measuring electrode TE40 to the ground electrode GE100. The surface distance XL in this calculation corresponds to the capacitance "Cr", and formularized by the "equation 1" shown in the first and the second embodiment. It is assumed that capacitance "Ca" equals to capacitance detected between electrode combination of the measuring electrode to the ground electrode both of which being completely under the measuring object, capacitance "Cb" equals to capacitance detected between electrode combination of the measuring electrode to the ground electrode both of which being exposed in the air, capacitance "Cr" equals to actual capacitance detected between the remarked electrode combination, and length LL shows a length from the upper end of the measuring electrode positioned right under the remarked combination electrodes to the lower end of the measuring electrode positioned right above the remarked combination electrodes (see FIG. 34A).

In other words, the surface distance XL in the fourth embodiment is calculated by multiplying the length LL which represents length from the upper end of the measuring electrode positioned right under the remarked combination electrodes to the lower end of the measuring electrode positioned right above the remarked combination electrodes by a result of dividing capacitance "Cx" shown in FIG. 34A with capacitance "C". The surface distance XL of when the measuring object 33 Is stored under level L20 can be calculated by substituting actual values into "equation 1".

Thereafter, buried distance (structural distance from the lower end of the electrode assembly 90 to the upper end of the electrode combination of the measuring electrode TE30 to the ground electrode GE100) is added to the surface distance thus calculated by the control part 35 as in the first and the second embodiment.

In the graphs CH10 and CH20 shown in FIG. 34A both of which illustrate variety of capacitance, a space S10 (see FIG. 34A) which represents the distance for change of capacitance "Cb" to capacitance "Ca" is almost equal to a pitch length L of the measuring electrodes because the measuring object 33 stored in the tank 40 is an object having high dielectric constant. However, the space S10 possibly does not correspond to the pitch length L of the measuring electrodes when the measuring object is an object having low dielectric constant such as kerosine, resin pellets or the like. In that case, it is possible to calculate accurate surface distance by substituting the space S10 represents a distance for change of capacitance "Cb" to capacitance "Ca" detected between the remarked combination electrodes instead of the pitch length L of the electrodes in the "equation 1".

In the meantime, although detection of capacitance is conducted consecutively in order from the electrode combination positioned lower side of the electrode assembly 90 such as from the combination of the measuring electrode TE10 to the ground electrode GE100, then the measuring electrode TE20 to the ground electrode GE100 and so on, when the buried distance is measured in the fourth embodiment. Detection of capacitance can be conducted in order of the other way from the electrode combination positioned upper side of the electrode assembly 90 such as from the measuring electrode TE70 to the ground electrode GE100, then the measuring electrode TE60 to the ground electrode GE100 and so on. Further, detection of capacitance can be conducted simultaneous from both the upper and the lower side (start from the electrode combination of the measuring electrode TE70 to the ground electrode GE100, then the measuring electrode TE60 to the ground electrode GE100 and so on, as well as start from the electrode combination of the measuring electrode TE10 to the ground electrode GE100, then the measuring electrode TE20 to the ground electrode GE100 and so on) of the electrode assembly 90 instead of either from the upper side or the lower side of the electrode assembly 90 (see FIG. 32).

Figure 35:
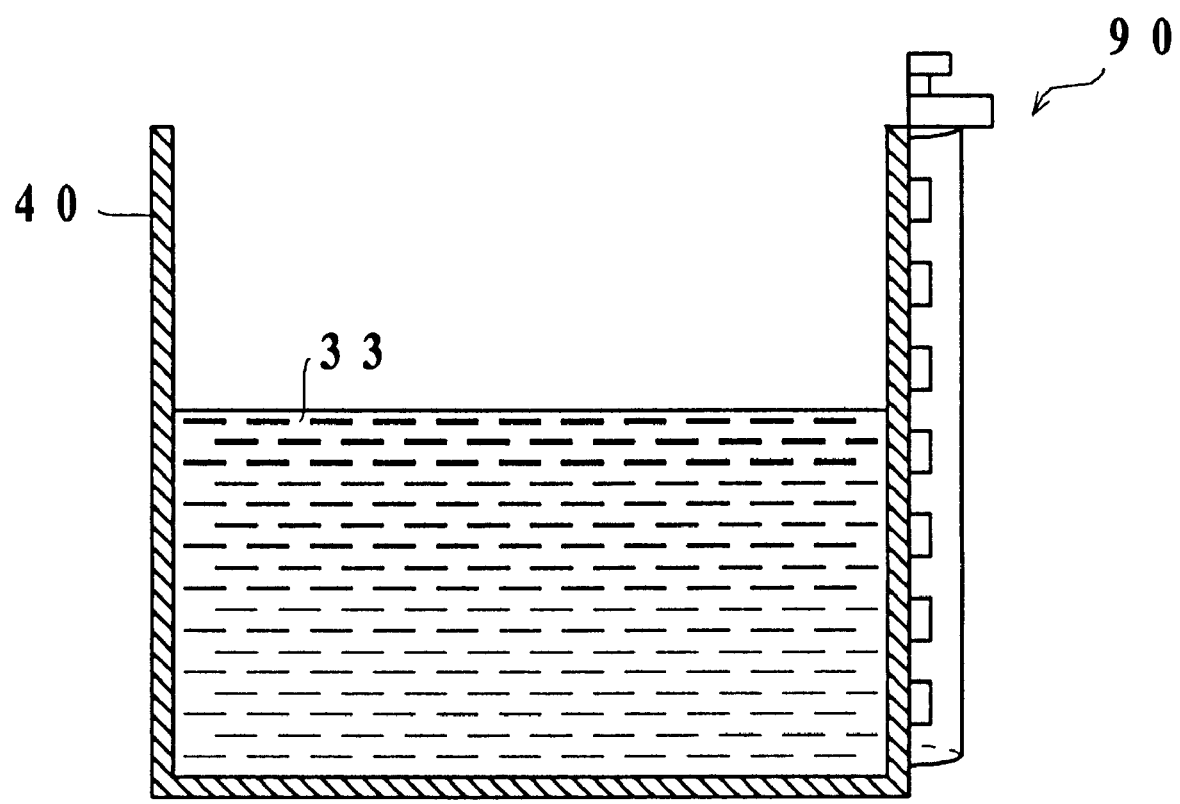
FIG. 35 is a side view illustrating that the electrodes shown in FIG. 31A, FIG. 31B
Figure 36:
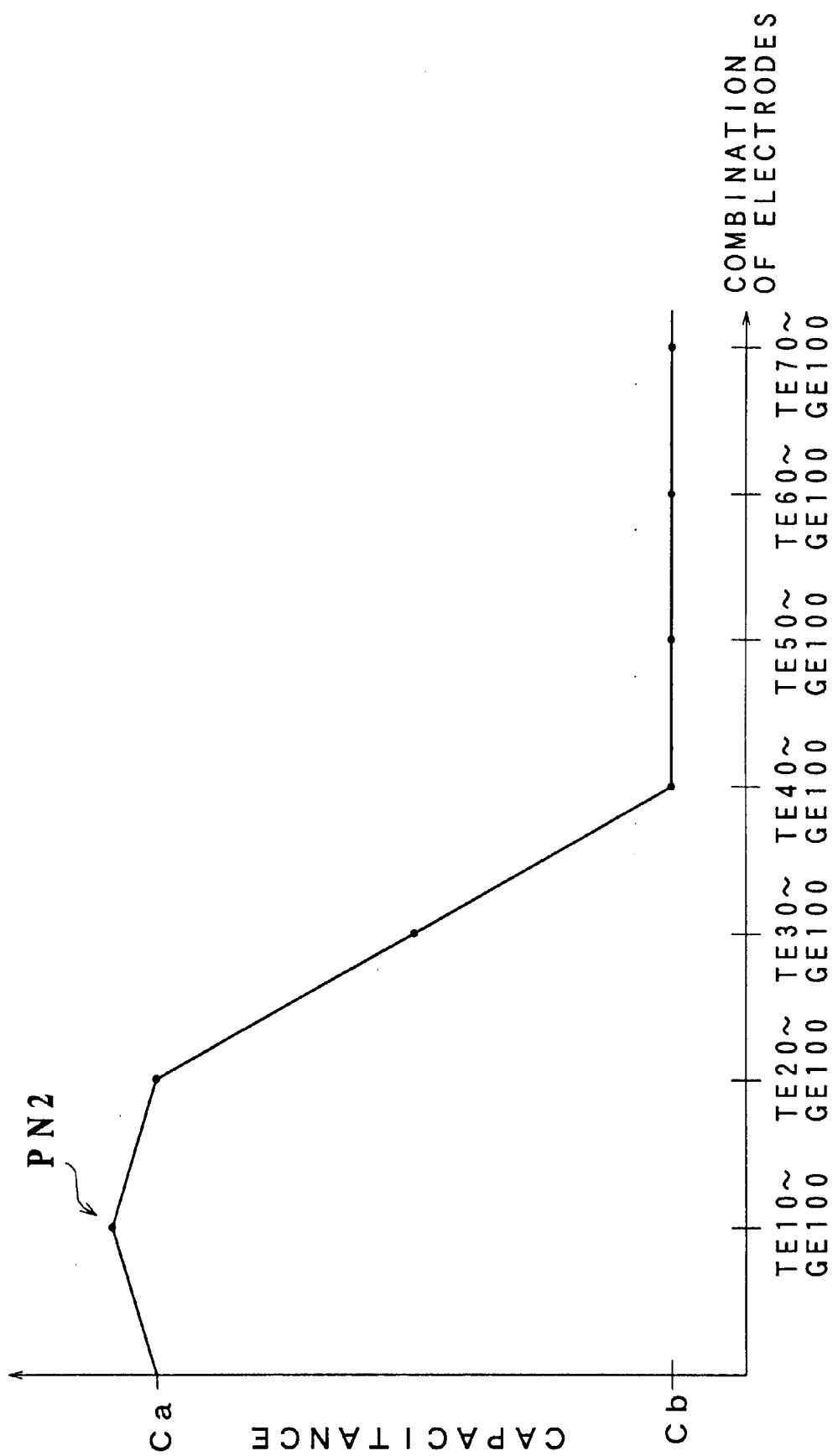
FIG. 36 shows a graph illustrating variety of capacitance measured between each of the electrodes to both positive and negative direction caused by adherence of extraneous objects on the electrodes.

Although, level measurement is conducted by utilizing the electrode assembly 90 which allows the measuring object 33 to comes in it, and the electrode assembly 90 is installed in the tank 40 which stores the measuring object 33. However, level measurement can be conducted by attaching the electrode assembly 90 on an outer wall of a nonconducting tank and then detection of capacitance is conducted as shown in FIG. 35. Once the electrode assembly 90 is attached on the side wall of the tank 40, the measuring object never contact with both the measuring electrodes and the ground electrode directly. Also, materials used for the electrode assembly 90 are not limited to specific materials, because it never contacts with the measuring object. In addition, accurate level measurement can be conducted even when the electrode assembly 90 can not be installed in the tank which stores antiseptic solution for sanitary reasons.

In addition, in order to calculate the surface distance XL, capacitance C which is figured out by subtracting capacitance "Cb" detected between the electrode combination both of which being exposed in the air from capacitance "Ca" detected between the electrode combination both of which being completely under the measuring object is used in the fourth embodiment (see FIG. 33). Any other method can be applied to the fourth embodiment, as long as the method can conduct accurate level measurement. For instance, the surface distance XL can be calculated by substituting an average value of capacitance detected between the electrode combinations (from electrode combination of the measuring electrode TE10 to the ground electrode GE100 until the electrode combination of the measuring electrode TE30 to the ground electrode GE100) each of which being completely under the measuring object instead of capacitance "Ca", and an average value of capacitance detected between the electrode combinations (from electrode combination of the measuring electrode TE50 to the ground electrode GE100 until the electrode combination of the measuring electrode TE70 to the ground electrode GE100) each of which being exposed in the air instead of capacitance "Cb", in "equation 1".

Further, although both the average value of capacitance detected between the electrode combinations each of which being completely under the measuring object and that of detected between the electrode combinations each of which being exposed in the air are used for calculation of the surface distance XL. However, other capacitance can be used for calculating the surface distance XL instead of these averaged values, for instance capacitance detected between the electrode combination which being the nearest combination from surface of the measuring object and both of which being completely under the measuring object (correspond to capacitance KB2 shown in FIG. 33) instead of the capacitance "Ca", and capacitance detected between the electrode combination which being the nearest combination from surface of the measuring object and both of which being exposed in the air (correspond to capacitance HB1 shown in FIG. 33) for the capacitance "Cb".

Still further, the control part 35 judges that variety of the capacitance detected in both positive and negative directions caused by adherence of conductive extraneous objects on part of the electrodes (especially at the electrodes located at near the liquid surface) does not correspond to surface of the measuring object 33 when capacitance is detected between the electrode combinations. That is, for instance, it is assumed that capacitance detected between the electrode combination of the measuring electrode TE10 to the ground electrode GE100 and the measuring electrode TE30 to the ground electrode GE100 varies in both positive and negative directions. In this case, the control part 35 judges that variety of capacitance PN2 detected in both positive and negative directions caused by adherence of extraneous objects on the electrodes does not correspond to surface of the measuring object 33. That is, the control part 35 recognizes only the variation of detected capacitance in positive to negative direction such as capacitance detected between the electrode combination of the measuring electrode TE30 to the ground electrode GE100 and the measuring electrode TE40 and the ground electrode GE100 as surface of the measuring object 33. Thus, even when variation of detected capacitance in both positive to negative, negative to positive directions caused by oil adhesion on the electrode surface is detected, the control part 35 never recognizes the variation as surface of the measuring object. As a result, it is possible to conduct level measurement with accuracy.

In this embodiment, capacitance "Cx" varies linearly as shown in FIG. 33. FIG. 20A shows a graph illustrating a relationship between variety of capacitance "Cx" and the surface distance XL. Capacitance Cx does not vary linearly all the time, variation can be occurred in curved line caused by discrepancies of dielectric constant between temperature at upper part and lower part of the measuring object as shown in FIG. 20B. In that case, level measurement can be conducted accurately by calculating the surface distance XL which is obtained in consideration of a relationship between capacitance "Cx" and the surface distance XL.

The Fifth Embodiment

Further, the fifth embodiment of the present invention will be described. Level measurement in the third and the fourth embodiment is conducted by detecting capacitance between the measuring electrode and the ground electrode provided in the sensing part 10 shown in FIG. 22, FIG. 23 and the electrode assembly 90 shown in FIG. 31.

However, capacitance detected by the sensing part 10 or the electrode assembly 90 is inputted into the receiver 25 through the switching means SW20 and the measurement signal line 7. As a result of that structure, stray capacitance is accumulated in the lines etc. which connects the electrodes and the receiver 25. So that, capacitance detected by the measuring electrodes can not maintain its value as detected. Therefore, it is not possible to conduct accurate level measurement because the detected capacitance itself can not be inputted in the receiver 25.

Figure 37:
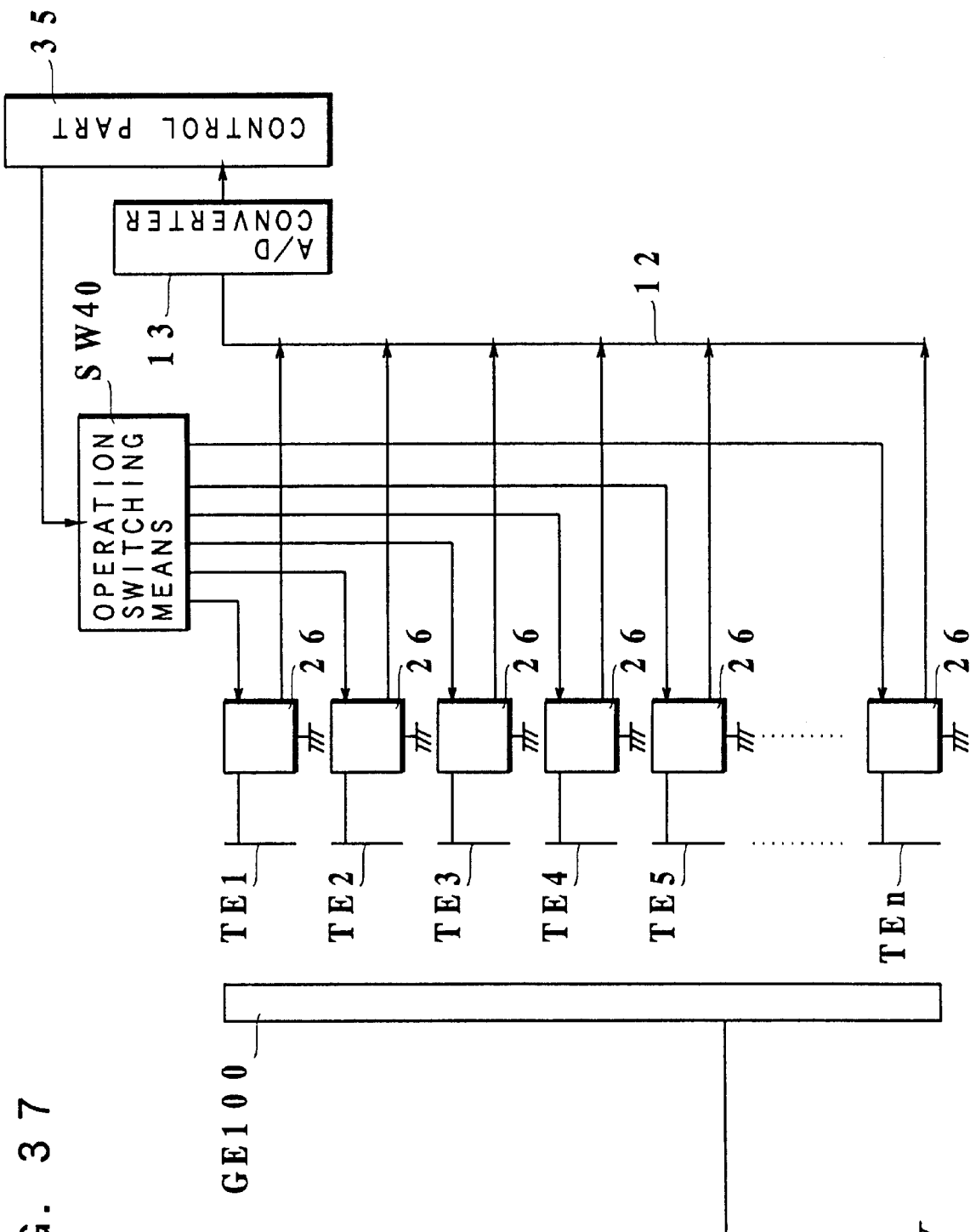
FIG. 37 shows a block diagram illustrating a level sensor of the fifth embodiment in the present invention.

To resolve the problems, receivers 26 (not include the A/D converter 13) exclusive for the measuring electrodes are provided to each of the measuring electrodes to shorten electrical distance between the measuring electrodes and the receivers 26 as shown in FIG. 37. Thus, capacitance equivalent to the detected capacitance itself is inputted in the receivers 26, because stray capacitance is not accumulated in the line between the measuring electrodes and the receivers 26. Therefore, it is possible to conduct accurate level measurement even when dielectric constant of the measuring object is relatively low. In addition to the fifth embodiment, the receivers 26 may be provided to each of the measuring electrodes in the third and fourth embodiment to shorten electrical distance between the measuring electrodes and the receivers 26. The receivers 26 are operated by switching oscillators (not shown) installed in the receivers 26 to ON/OFF states. That is, the receivers 26 are operated by controlling oscillation of the oscillators.

The capacitance values (detected signals) detected at the receivers 26 are inputted to the A/D converter 13 via a common signal line 12 (FIG. 37). The detected signals converted into digital signals are outputted to both the control part 35 and the storing part (not shown).

In the meantime, in the fourth embodiment described in the above, the initial value (capacitance) are detected in prior to store the measuring object into the tank 40, and the initial values are corrected to obtain the correction values. In addition, level measurement of the measuring object is conducted in accordance with the corrected actual value calculated by correcting the actual values (capacitance) with the correction values thus obtained. In other words, the initial values are corrected for accurate level measurement.

However, the capacitance (corrected initial value) detected between each of the electrode combination does not become identical even when the electrodes are installed in the tank which stores a measuring object formed uniformly. That is, each electrode combination has own detectability. The reason of that is considered as lack of accuracy for formation of the electrodes and misalignment of the measuring electrodes in the electrode assembly 90 or the sensing part 10. Therefore it is difficult to conduct level measurement accurately.

In this embodiment, correction coefficient numbers are calculated to equalize detectability for each of the electrode combinations, and the actual values are corrected in accordance with the correction coefficient numbers. By carrying out the correction, accurate level measurement in consideration of lack of accuracy and misalignment of the measuring electrodes can be conducted. Detail description for calculating the correction coefficient numbers will be described in below. At first, initial vales between each of the electrode combinations are detected in the same manner as described in the third and the fourth embodiment. Secondly, provisional measured values (capacitance) between each of the electrode combinations are detected by dipping all the measuring electrodes and the ground electrode of the electrode assembly 90 or the sensing part 10 into a measuring object (which has uniform capacitance) formed in uniform component and thermal distribution, and then the provisional measured values are stored in the storing part. Thereafter, span capacitance values for each of the electrode combinations are calculated by subtracting the initial values from the provisional measured values. Then, provisional averaged value is calculated by averaging all the span capacitance values after detecting the calculated span capacitance values for all over the electrode combinations. Upon calculating the provisional averaged value, correction coefficient numbers for each of the electrode combinations are calculated by dividing the provisional measured values with the provisional averaged value.

For instance, it is assumed that initial value between certain electrode combination is detected as 520 pF and provisional measured value is detected as 900 pF. In this case, 380 pF which is calculated by subtracting the initial value 520 pF from the provisional measured value 900 pF correspond to the span capacitance value. Provisional averaged value is a value calculated by averaging all the span capacitance values which is detected the span capacitance values for all over the electrode combinations. When the provisional averaged value is calculated as 400 pF, correction coefficient number in this case is figured out by dividing 380 pF with 400 pF such as 0.95.

The correction coefficient number thus obtained is used for correcting measurement error of capacitance detected between each of the electrode combinations. In other words, corrected capacitance values for each of the electrode combinations are calculated. In this case, corrected capacitance values for electrode combinations are calculated by multiplying 1/the correction coefficient number to a number which is figured out by subtracting the initial value from the provisional measured value. That is, the corrected capacitance value is figured out by multiplying 1/0.95 to 380 pF which is a result of subtracting 520 pF correspond to the initial value from 900 pF represents the provisional measured value. Result of calculation is shown as 400 pF corresponds to a capacitance value detected between the electrode combination. Thus, it is possible to conduct more accurate level measurement by utilizing correction coefficient for detection of capacitance between each of the electrodes. Actual measured values detected between other electrode combinations are corrected by the correction coefficient calculated in the same manner described in the above.

Although the provisional measured values (capacitance) are detected and stored after dipping all the measuring electrodes and the ground electrode into a measuring object having uniform capacitance in fifth embodiment. However, it takes lot of work to install the sensing part 10 or the electrode assembly 90 to a proper location in the tank as well as detect the provisional is made of the same material and the same shape as in the dummy measuring object GK1 shown in FIG. 21A. So that, dielectric constant of the measuring object can be simulated by various methods as described in the second embodiment. Measured values when the sensing part 10 or the electrode assembly 90 are formed in large scale and the measuring object is a toxic material.

To avoid such problems, the provisional measured values are detected by sliding a dummy measuring object GK2 which increases capacitance between adjacent electrodes than that of the air on each of the electrode combination with a space DS2 from the sensing part 10 (or the electrode assembly 90) toward a direction of arrow 150 as described in the second embodiment (see FIG. 38A, FIG. 21A). By carrying out that, it is possible to detect accurate provisional measured values (capacitance) easily without actual work for dipping all the electrode combinations of the sensing part 10 or the electrode assembly 90 into the measuring object formed uniformly. The dummy measuring object GK2 used in this embodiment is made of the same material and the same structure as the dummy measuring object GK1 shown in FIG. 21A. So that, dielectric constant of the measuring object can be simulated by the methods as described in the second embodiment. Also, FIG. 38B shows a side view illustrating the dummy measuring object GK2 being formed as a cylinder shaped dummy measuring object FR2. In this case, provisional measured values (capacitance) can easily be detected by sliding the cylinder shaped dummy measuring object FR2 toward a direction of arrow 170 using a rope or the like linked with the cylinder shaped dummy measuring object FR2. Thus, it is possible to detect accurate provisional measured values easily without dipping all the electrode combinations into the measuring object formed uniformly at the place where the sensing part being installed.

On the other hand, there is a case that the cylinder shaped dummy measuring object FR2 is used to detect actual measured values. For instance, actual measured values between the electrode combination and the cylinder shaped dummy measuring object FR2 are measured by floating the cylinder shaped dummy measuring object FR1 on the measuring object 33 when the measuring object 33 has a lower dielectric constant. Thus, it is possible to conduct level measurement with stability even when the measuring object has a low dielectric constant. The cylinder shaped dummy measuring object FR2 is made of the same material and the same shape and the same structure as in the cylinder shaped dummy measuring object FR1 shown in FIG. 21B. So that, dielectric constant of the measuring object can be simulated by various methods as described in the second embodiment.

In this embodiment, both of the dummy measuring object GK2 and the cylinder shaped dummy measuring object FR2 are made of the same materials and shape and the same structure. In the same manner, both of them can also be made any other materials having high dielectric constant with the cover (or without the cover) in the same materials both listed in the second embodiment.

Although, both of the dummy measuring object GK1 and the cylinder shaped dummy measuring object FR1 are made of metal and covered it with resin in this embodiment. However, any other materials excluding metals having high dielectric constant and freedom to form these dummy objects can be used. For instance, these ferroelectric materials such as barium titanate, titanate, PZT, metaniobate can be used for the dummy measuring object GK1 and the cylinder shaped dummy measuring object FR1.

The level sensor and the method for measuring level in the present invention is characterized in that comprises a ground electrode, an electrode assembly having a plurality of measuring electrodes positioned opposite to the ground electrode and substantially vertically from surface of a measuring object, and a part of the electrode assembly being dipped into the measuring object, a measuring circuit for measuring capacitance between the measuring electrode of the electrode assembly and the ground electrode consecutively, and a level detection circuit for detecting level of the measuring object in accordance with variations of the capacitance measured between the measuring electrode and the ground electrode by the measuring circuit. So that, it is possible to conduct level measurement by reducing influences caused by shape of the tank etc. even when the measuring objects such as oil adheres on the electrodes regardless of the measuring object. Therefore, level measurement with accuracy and stability can be conducted.

Also, the level sensor in the present invention is characterized in that the ground electrode is sequentially provided to surface of said measuring object in vertical direction. So that, structure of the electrode assembly can be simplified. Therefore, level measurement with stability and accuracy can be conducted by preventing detection error cause with lack of accuracy for formation of the electrodes and misalignment of the measuring electrodes.

Further, the level sensor in the present invention is characterized in that a plurality of the measuring circuit are provided, and each of which is electrically positioned to each of the measuring electrodes. So that, stray capacitance is not accumulated in the line between the electrodes and the receivers 26 because capacitance equivalent to the detected capacitance itself is inputted in the receivers 26.

The level sensor in the present invention is characterized in that the level detection circuit further comprises a storing circuit for storing capacitance detected by said measuring circuit, and a judging circuit for judging capacitance stored in the storing circuit having largest variation between adjacent capacitance as level of the measuring object. Therefore, level measurement can be conducted with accuracy.

Still further, the level sensor in the present invention is characterized in that initial values are measured by detecting capacitance between each of said measuring electrodes and the ground electrode consecutively in prior to store said measuring object into a tank, and wherein level of the measuring object is detected by correcting the capacitance values detected between said each of said measuring electrodes and the ground electrode with the initial values with said level detecting circuit. So that, it is possible to conduct level measurement with certain accuracy and stability by reducing the influences caused by the tank.

The level sensor in the present invention is characterized in that capacitance between each of said measuring electrodes and said ground electrode are sequentially measured by said measuring circuit, and a first electrode combination of said measuring electrodes and said ground electrode which detects capacitance exceeds initial capacitance value detected between all the electrode combinations is defined as a remarked combination electrodes, and wherein level of said measuring object is detected in detail in accordance with capacitance values detected between the remarked combination electrodes by said level detecting circuit. So that, it is possible to calculate not only the buried distance, but also the surface distance represents a distance from lower end of the remarked electrode to the surface of the measuring object. Therefore, accurate level measurement can be conducted. Although the shape of the electrode assembly in the above described embodiment is in cylinder shape, any other shape such as prism shape, flat shape can be applied in the present invention.

Also, the level sensor in the present invention is characterized in that level of said measuring object is detected by adding surface distance to the buried distance with said level detecting circuit, and the buried distance is calculated by detecting a distance to an upper end of the measuring electrode positioned right under the remarked combination electrodes from lower end of said electrode assembly, and the surface distance represents a distance from the upper end of the measuring electrode to the surface of said measuring object. So that, it is possible to calculate not only the buried distance, but also the surface distance represents a distance from lower end of the remarked electrode to the surface of the measuring object. Therefore, accurate level measurement can be conducted.

Further, the level sensor In the present invention is characterized in that the capacitance "Ca" represents capacitance detected between the measuring electrode and the ground electrode both of which being the nearest ones from the surface of said measuring object and both of which being completely under the measuring object, and wherein capacitance "Cb" equals to capacitance detected between the measuring electrode and the ground electrode both of which being the nearest ones from surface of the measuring object and both of which being exposed in the air. Also, the capacitance "Ca" equals to an average value of capacitance detected between the measuring electrode and the ground electrode both of which being completely under the measuring object and said capacitance "Cb" represents an average value of capacitance detected between the measuring electrode and the ground electrode both of which being exposed in the air. So that, capacitance detected at the remarked combination electrodes is corrected by the average value of capacitance detected between the nearest electrodes from the remarked combination electrodes, or that of detected between either the measuring electrodes to the ground electrode both of which being completely under the measuring object or the measuring electrodes to the ground electrode both of which being exposed in the air. Therefore, it is possible to conduct level measurement with stability and accuracy.

Still further, the level sensor in the present invention is characterized in that the electrode assembly is made as a pattern on a flexible board formed in cylinder shape. So that, formation of the electrodes requires less work, it is not necessary to conduct adjustment of the electrodes for every measurement. It is therefore possible to measure level of the measuring object with stability and accuracy.

The level sensor in the present invention is characterized in that lower end of said cylinder shaped flexible board is opened and said measuring object is guided into the flexible board. So that, the measuring object exists both inside and outside of the flexible board. Therefore, difference of capacitance detected between a part where the measuring object exists and another part where measuring object does not exist becomes larger than when the measuring object surrounds outside of the electrode assembly 80. Therefore, it is possible to conduct level measurement with accuracy and stability.

Also, the level sensor in the present invention is characterized in that electrode assembly is attached to a tank which stores said measuring object. So that, the measuring object never contact with each of the electrodes directly. Therefore, it is possible to conduct accurate level measurement after a long period of use.

Further, the level sensor in the present invention is characterized in that the level sensor further comprises a warning signal output circuit outputs warning signals as a result of detecting variety of capacitance exceed predetermined value detected between the measuring electrode and the ground electrode positioned adjacently in both positive and negative directions when initial values being detected. And the warning signal output circuit outputs the warning signals when more than predetermined difference is detected between capacitance detected all the combinations of the measuring electrode to the ground electrode and average of initial values being detected between electrodes in initial state and stored. So that, prior notice can be obtained when the level sensor is not in a situation to conduct accurate level measurement. Therefore, it is possible to conduct level measurement with stability.

Still further, the level sensor in the present invention is characterized in that surface of said measuring object is detected when variety of capacitance detected between the measuring electrode and the ground electrode positioned adjacently is in either positive or negative direction, and variety of capacitance in both positive and negative directions does not correspond to surface of said measuring object, in case of measuring the surface of said measuring object. So that, variety of the capacitance in both positive and negative directions caused by adhesion of oil on the electrodes is not detected as surface of the measuring object. Therefore, it is also possible to conduct level measurement with accuracy by carrying out the countermeasures.

Thus, level measurement can be conducted with stability and accuracy by using the level sensor and the method for measuring level in the embodiment described in the above.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A level sensor, comprising:
    an electrode assembly having a plurality of electrodes positioned substantially vertically to a surface of a measuring object to form a column of electrodes, and a part of said electrode assembly being dipped into the measuring object, wherein each of said plurality of electrodes is spaced apart from an adjacent one of said electrodes such that each electrode is disposed in said column at a different height;
    a measuring circuit for measuring capacitance consecutively between pairs of said electrodes spaced apart from each other at a certain distance and storing the measurements of the capacitance in a storing part;
    signal transferring means including at least three signal lines, each of said at least three signal lines selectively connecting one of said plurality of electrodes to said measuring circuit, wherein one of said at least three signal lines is a ground line; and a level detection circuit for detecting a level of the measuring object in accordance with variations of the measurements of the capacitance stored in said storing part.

2. A level sensor, comprising:
    an electrode assembly having a plurality of electrodes positioned substantially vertically to a surface of a measuring object to form a column of electrodes, and a part of said electrode assembly being dipped into the measuring object; wherein each of said plurality of electrodes is spaced apart from an adjacent one of said electrodes such that each electrode is disposed in said column at a different height;
    a measuring circuit for measuring capacitance consecutively between a first electrode group having at least one said electrode in said electrode assembly and a second electrode group having at least one said electrode which does not belong to said first electrode group and storing the measurements of the capacitance in a storing part; and
    a level detection circuit for detecting a level of the measuring object in accordance with variations of the measurements of the capacitance stored in said storing part.

3. The level sensor in accordance with claim 1, wherein said level detection circuit includes:
    a judging circuit for judging capacitance stored in said storing part having largest variation between adjacent capacitance as a level of the measuring object.

4. A level sensor, comprising:
    an electrode assembly having a plurality of electrodes positioned substantially vertically to a surface of a measuring object to form a column of electrodes, and a part of said electrode assembly being dipped into the measuring object, wherein each of said plurality of electrodes is spaced apart from an adjacent one of said electrodes such that each electrode is disposed in said column at a different height;
    a measuring circuit for measuring capacitance consecutively between pairs of said electrodes spaced apart from each other at a certain distance and storing the measurements of the capacitance in a storing part; and
    a level detection circuit for detecting a level of the measuring object in accordance with variations of the capacitance stored in said storing part,
    wherein said measuring circuit measures initial values of the capacitance between said pairs of said electrodes consecutively prior to dipping said part of said electrode assembly into the measuring object, and
    wherein said level detection circuit detects the level of the measuring object by correcting the capacitance values detected when a part of said electrode assembly is dipped into the measuring object with the initial values.

5. The level sensor in accordance with claim 1, wherein the capacitance are measured from an end of said electrode assembly by said level detection circuit, and the uppermost electrode among said electrodes being positioned completely under the surface of the measuring object is defined as a remarked electrode, and wherein the level of the measuring object is detected in detail in accordance with capacitance values detected between said remarked electrode and said electrodes being under the measuring object with said level detection circuit.

6. The level sensor in accordance with claim 5, wherein the level of the measuring object is detected by adding a surface distance XL to a buried distance with said level detection circuit, and wherein the buried distance is calculated by detecting an uppermost electrode among said electrodes being completely under the measuring object and calculating a distance from a lower end of said electrode assembly to a lower end of said uppermost electrode, and the surface distance XL represents a distance from a lower end of said remarked electrode to the surface of the measuring object in accordance with an equation described in below, and wherein, XL=L·C/C, it is assumed that C=Ca−Cb, Cx=Cr−Cb, and capacitance "Ca" equals to capacitance detected between said electrodes both of which being completely under the measuring object, capacitance "Cb" equals to capacitance detected by said electrodes being exposed in the air, capacitance "Cr" equals to actual capacitance detected between said remarked electrode and a lowermost electrode among said electrodes being exposed in the air, and length L shows a pitch length of each of said electrodes in vertical direction.

7. The level sensor in accordance with claim 6, wherein the capacitance "Ca" represents capacitance detected between a pair of said electrodes at least one of which being the nearest one from the surface of the measuring object and both of which being completely under the measuring object, and wherein the capacitance "Cb" equals to capacitance detected between a pair of said electrodes at least one of which being the nearest one from the surface of the measuring object and both of which being exposed in the air.

8. The level sensor in accordance with claim 6, wherein the capacitance "Ca" equals to an average value of capacitance of all pairs of said electrodes each of which being completely under the measuring object and the capacitance "Cb" represents an average value of capacitance of all pairs of said electrodes each of which being exposed in the air.

9. The level sensor in accordance with claim 1, wherein said electrode assembly is made as a pattern on a flexible board formed in a cylinder shape.

10. The level sensor in accordance with claim 9, wherein a lower end of said cylinder shaped flexible board is opened and the measuring object is guided into said flexible board.

11. The level sensor in accordance with claim 1, wherein said electrode assembly is attached on an outer surface of a side wall of a tank which stores the measuring object.

12. The level sensor in accordance with claim 1, further comprising:

a warning signal output circuit for outputting warning signals as a result of detecting a variation of capacitance exceeding a predetermined value when initial values are measured by detecting capacitance between said pairs of said electrodes consecutively prior to dipping said part of said electrode assembly into the measuring object.

13. The level sensor in accordance with claim 1, wherein a surface of the measuring object is detected when the capacitance of adjacent pairs of electrodes is consecutively changed in the same direction, and the surface of the measuring object is not detected when the capacitance of adjacent pairs of electrodes is consecutively changed in different directions, in case of measuring the surface of the measuring object.

14. The level sensor in accordance with claim 1, further comprising:

a warning signal output circuit for storing an average of initial values, the initial value being measured by detecting capacitance between said pairs of said electrodes consecutively prior to dipping said part of said electrode assembly into the measuring object and outputting warning signals when more than predetermined difference is detected between capacitance detected adjacent electrodes and an average of the initial values.

15. The level sensor in accordance with claim 1, wherein each said electrode not currently used for measuring the capacitance by said measuring circuit is connected to said ground line when measuring the capacitance.

* * * * *